(12) United States Patent
Calley et al.

(10) Patent No.: US 8,994,243 B2
(45) Date of Patent: Mar. 31, 2015

(54) TRANSVERSE AND/OR COMMUTATED FLUX SYSTEMS HAVING MULTIDIRECTIONAL LAMINATIONS

(71) Applicant: Electric Torque Machines, Inc., Flagstaff, AZ (US)

(72) Inventors: David G. Calley, Flagstaff, AZ (US); John M. Dyer, Flagstaff, AZ (US); Thomas F. Janecek, Flagstaff, AZ (US); Tyler K. Williams, Flagstaff, AZ (US)

(73) Assignee: Electric Torque Machines Inc, Flagstaff, AZ (US)

( * ) Notice: Subject to any disclaimer, the term of this patent is extended or adjusted under 35 U.S.C. 154(b) by 0 days.

(21) Appl. No.: 13/671,153

(22) Filed: Nov. 7, 2012

(65) Prior Publication Data

US 2013/0113320 A1   May 9, 2013

Related U.S. Application Data

(60) Provisional application No. 61/556,985, filed on Nov. 8, 2011.

(51) Int. Cl.
*H02K 1/14* (2006.01)
*H02K 1/27* (2006.01)
(Continued)

(52) U.S. Cl.
CPC .............. *H02K 1/145* (2013.01); *H02K 21/145* (2013.01); *H02K 21/227* (2013.01); *H02K 7/06* (2013.01); *H02K 16/00* (2013.01); *H02K 2201/06* (2013.01)
USPC ......... 310/216.016; 310/156.02; 310/216.057

(58) Field of Classification Search
CPC ....... H02K 1/141; H02K 1/143; H02K 1/145; H02K 1/2773; H02K 21/145; H02K 21/227

USPC ................... 310/216.015–216.016, 216.019, 310/216.023–216.039, 216.057, 216.059, 310/216.061–216.062, 216.064, 257
See application file for complete search history.

(56) References Cited

U.S. PATENT DOCUMENTS 6,555,940 B2    4/2003  Naito et al.
7,348,707 B2 *  3/2008  Laskaris et al. ........ 310/216.007
(Continued)

OTHER PUBLICATIONS

Key to Metals Website (http://www.keytometals.com/article9.htm), "Cast Nonferrous: Nickel and Nickel Alloys", Sep. 2009.*
(Continued)

*Primary Examiner* — Quyen Leung
*Assistant Examiner* — Eric Johnson
(74) *Attorney, Agent, or Firm* — Invention To Patent Services; Alex Hobson

(57) ABSTRACT

An electrical machine stator assembly comprises: an electroconductive coil arranged circumferentially with respect to the rotational axis; a plurality of pairs of side lamination assemblies arranged circumferentially with respect to the rotational axis; a plurality of pairs of switch lamination assemblies arranged circumferentially with respect to the rotational axis and positioned adjacent ends of side lamination assemblies proximal the rotor; and at least one tooth associated with each switch lamination assembly and proximal the rotor. Each switch lamination assembly comprises a first group of laminated materials aligned generally circumferentially and generally in a first direction with respect to the rotational axis, the first direction being one selected from the group consisting of the axial and radial directions with respect to the rotational axis. Each side lamination assembly comprises a second group of laminated materials aligned generally axially and generally radially with respect to the rotational axis.

36 Claims, 31 Drawing Sheets

(51) Int. Cl.
  *H02K 21/14* (2006.01)
  *H02K 21/22* (2006.01)
  *H02K 7/06* (2006.01)
  *H02K 16/00* (2006.01)

(56) References Cited

U.S. PATENT DOCUMENTS

| | | | |
|---|---|---|---|
| 7,923,886 B2 | 4/2011 | Calley et al. | |
| 2002/0041127 A1 | 4/2002 | Naito et al. | |
| 2004/0036370 A1* | 2/2004 | Hilzinger et al. | 310/83 |
| 2005/0046414 A1* | 3/2005 | Payne et al. | 324/200 |
| 2005/0212381 A1* | 9/2005 | Gilmour et al. | 310/266 |
| 2008/0246362 A1 | 10/2008 | Hirzel | |
| 2010/0109452 A1 | 5/2010 | Calley et al. | |

OTHER PUBLICATIONS

Key to Metals Website (http://www.keytometals.com/article54.htm), "Coblat and Cobalt Alloys", Feb. 2009.*

International Search Report/Written Opinion mailed Jan. 31, 2013 in corresponding International Patent Application No. PCT/US12/63917 filed Nov. 7, 2012.

* cited by examiner

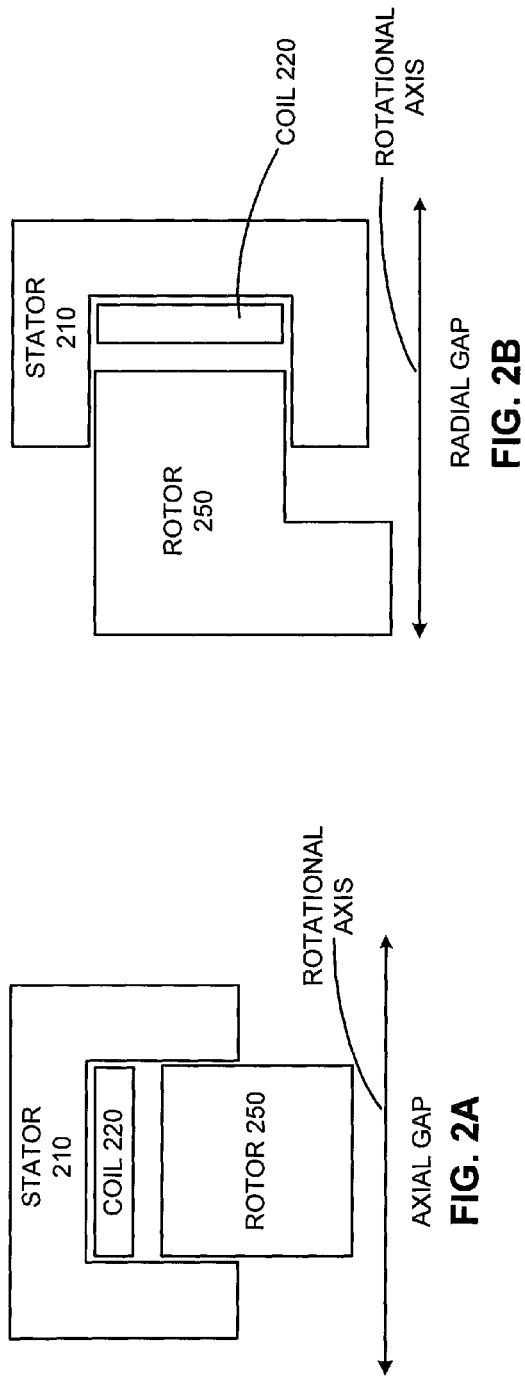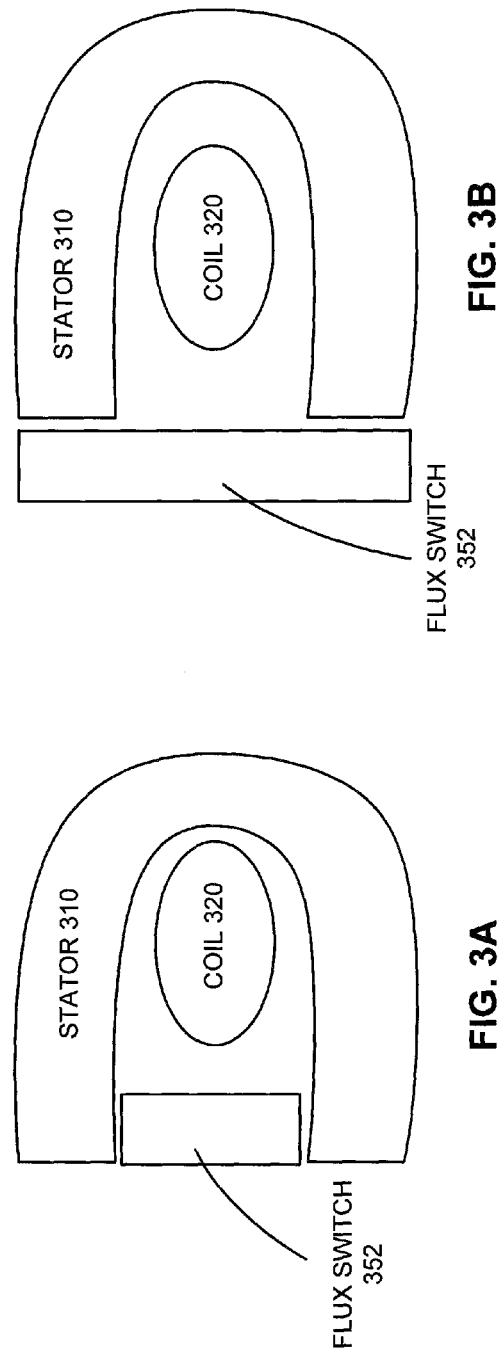

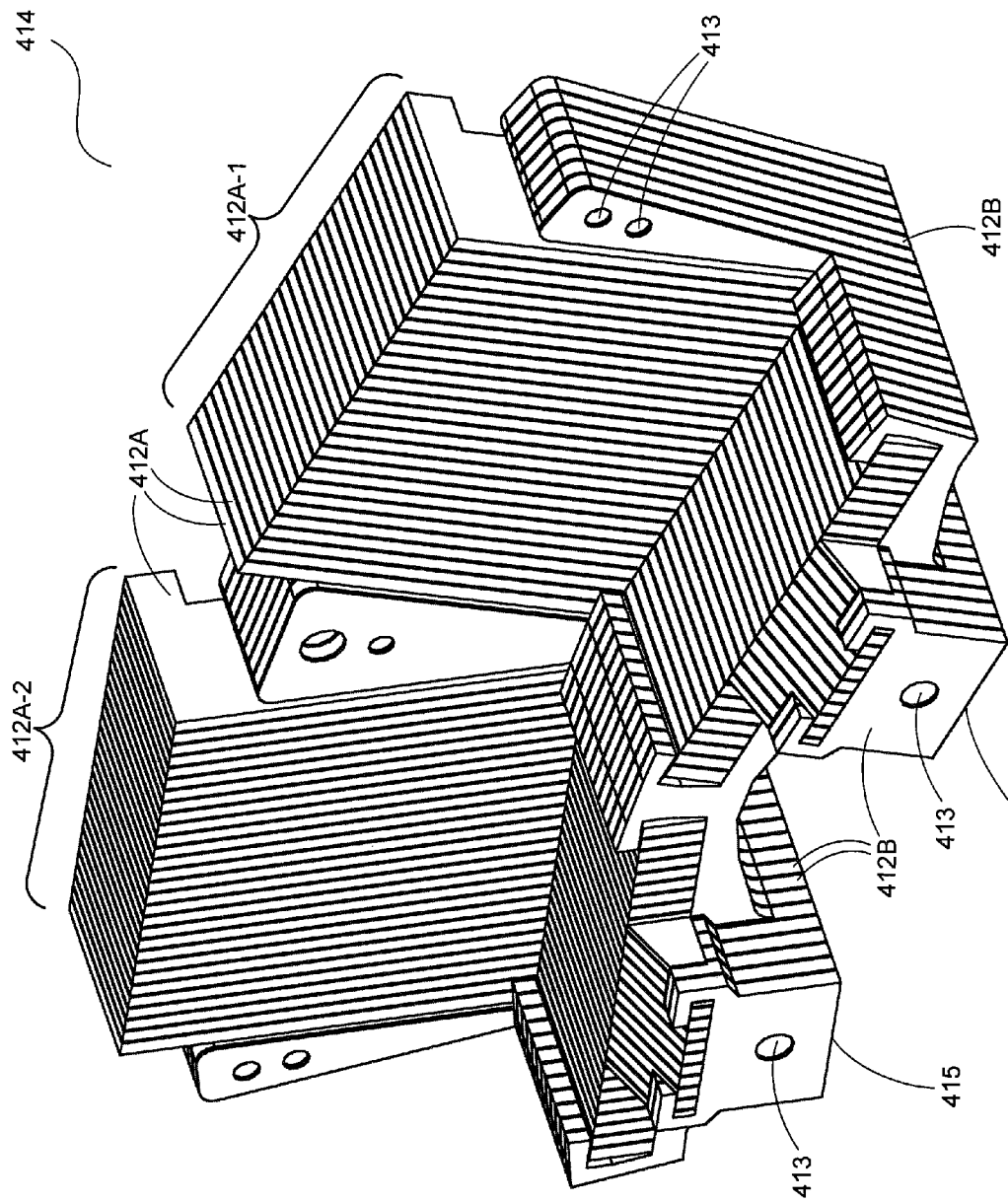

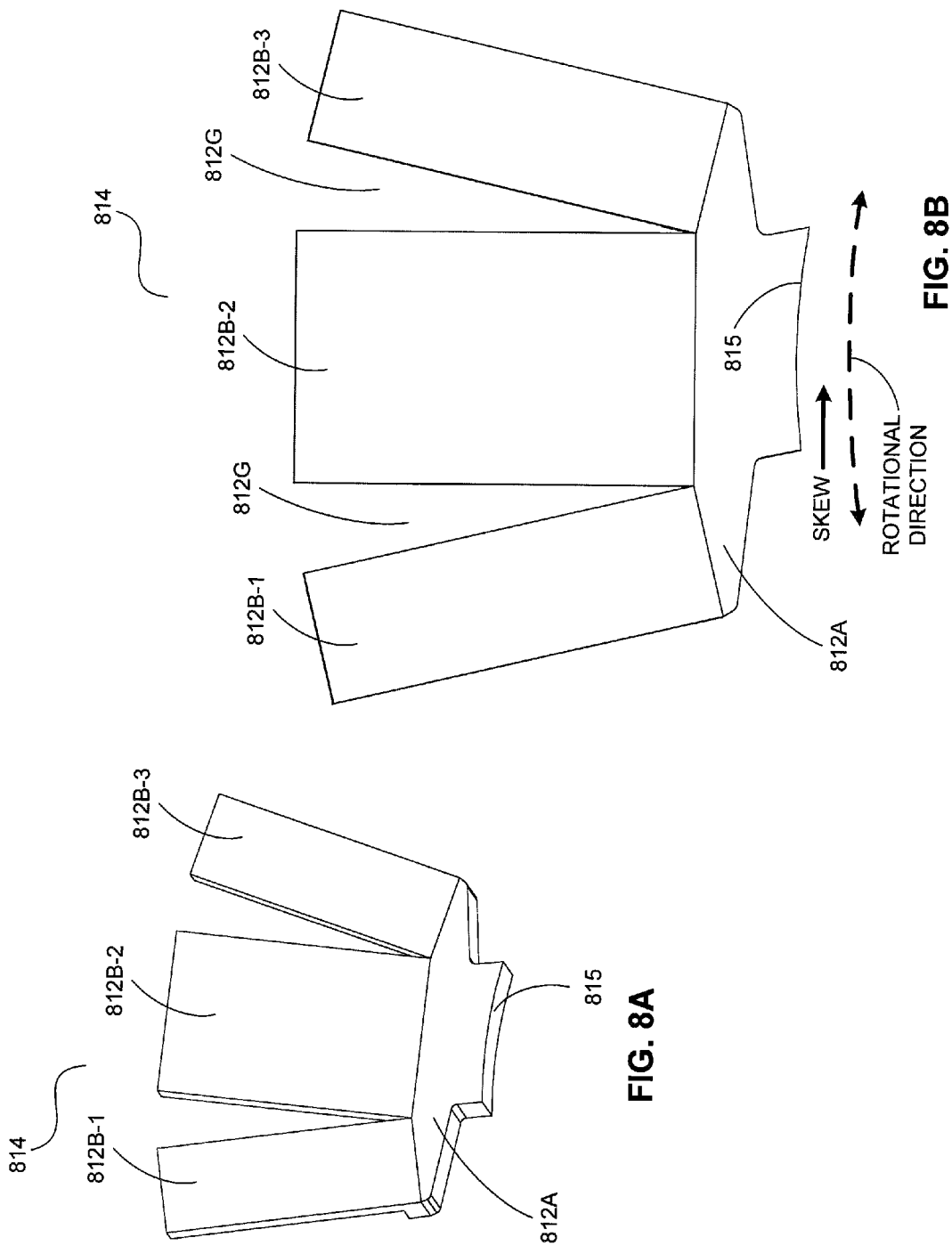

TRANSVERSE AND/OR COMMUTATED FLUX SYSTEMS HAVING MULTIDIRECTIONAL LAMINATIONS

The present application claims priority to U.S. Provisional Appln. Ser. No. 61/556,985, filed Nov. 8, 2011, the entirety of which is incorporated herein by reference.

TECHNICAL FIELD

The present disclosure relates to electrical systems, and in particular to transverse flux machines and commutated flux machines.

BACKGROUND

Motors and alternators are typically designed for high efficiency, high power density, and low cost. High power density in a motor or alternator may be achieved by operating at high rotational speed and therefore high electrical frequency. However, many applications require lower rotational speeds. A common solution to this is to use a gear reduction. Gear reduction reduces efficiency, adds complexity, adds weight, and adds space requirements. Additionally, gear reduction increases system costs and increases mechanical failure rates.

Additionally, if a high rotational speed is not desired, and gear reduction is undesirable, then a motor or alternator typically must have a large number of poles to provide a higher electrical frequency at a lower rotational speed. However, there is often a practical limit to the number of poles a particular motor or alternator can have, for example due to space limitations. Once the practical limit is reached, in order to achieve a desired power level the motor or alternator must be relatively large, and thus have a corresponding lower power density.

Moreover, existing multipole windings for alternators and electric motors typically require winding geometry and often complex winding machines in order to meet size and/or power needs. As the number of poles increases, the winding problem is typically made worse. Additionally, as pole count increases, coil losses also increase (for example, due to resistive effects in the copper wire or other material comprising the coil). However, greater numbers of poles have certain advantages, for example allowing a higher voltage constant per turn, providing higher torque density, and producing voltage at a higher frequency.

Most commonly, electric motors are of a radial flux type. To a far lesser extent, some electric motors are implemented as transverse flux machines and/or commutated flux machines. It is desirable to develop improved electric motor and/or alternator performance and/or configurability.

SUMMARY OF THE INVENTION

One aspect of the present disclosure relates to an electrical machine comprising: a rotor for rotating about a rotational axis and a stator assembly. The stator assembly comprises an electroconductive coil arranged circumferentially with respect to the rotational axis; a plurality of pairs of side lamination assemblies on opposing sides of said coil for conducting magnetic flux, the pairs of side lamination assemblies being arranged circumferentially with respect to the rotational axis; a plurality of pairs of switch lamination assemblies for conducting the magnetic flux, the pairs of switch lamination assemblies being arranged circumferentially with respect to the rotational axis and positioned adjacent ends of side lamination assemblies proximal the rotor; and at least one tooth associated with each switch lamination assembly and proximal the rotor for conducting the magnetic flux between the rotor and the switch lamination assembly. Each switch lamination assembly comprises a first group of laminated materials aligned generally circumferentially and generally in a first direction with respect to the rotational axis for conducting the magnetic flux generally circumferentially and generally in the first direction between the at least one tooth associated therewith and the adjacent side lamination assembly, the first direction being one selected from the group consisting of the axial and radial directions with respect to the rotational axis. Each side lamination assembly comprises a second group of laminated materials aligned generally axially and generally radially with respect to the rotational axis for conducting the magnetic flux generally axially and generally radially. The coil is disposed between the second groups of laminated materials of each pair of side lamination assemblies and each pair of side lamination assemblies is coupled distal the rotor for conducting the magnetic flux therebetween. The electrical machine is at least one of a transverse flux machine or a commutated flux machine.

Another aspect of the present invention relates to a stator assembly for use in the electrical machine.

Other objects, features, and advantages of one or more embodiments of the present invention will become apparent from the following detailed description, the accompanying drawings, and the appended claims.

BRIEF DESCRIPTION OF THE DRAWINGS

With reference to the following description, appended claims, and accompanying drawings:

FIG. 2A illustrates an exemplary axial gap configuration in accordance with an exemplary embodiment;

FIG. 2B illustrates an exemplary radial gap configuration in accordance with an exemplary embodiment;

FIG. 3A illustrates an exemplary cavity engaged configuration in accordance with an exemplary embodiment;

FIG. 3B illustrates an exemplary face engaged configuration in accordance with an exemplary embodiment;

FIGS. 4F through 4I illustrate an exemplary lamination assembly having multiple flux switches in accordance with an exemplary embodiment;

FIGS. 8A and 8B illustrate an exemplary skewed lamination assembly in accordance with an exemplary embodiment;

DETAILED DESCRIPTION

Figure 1B:
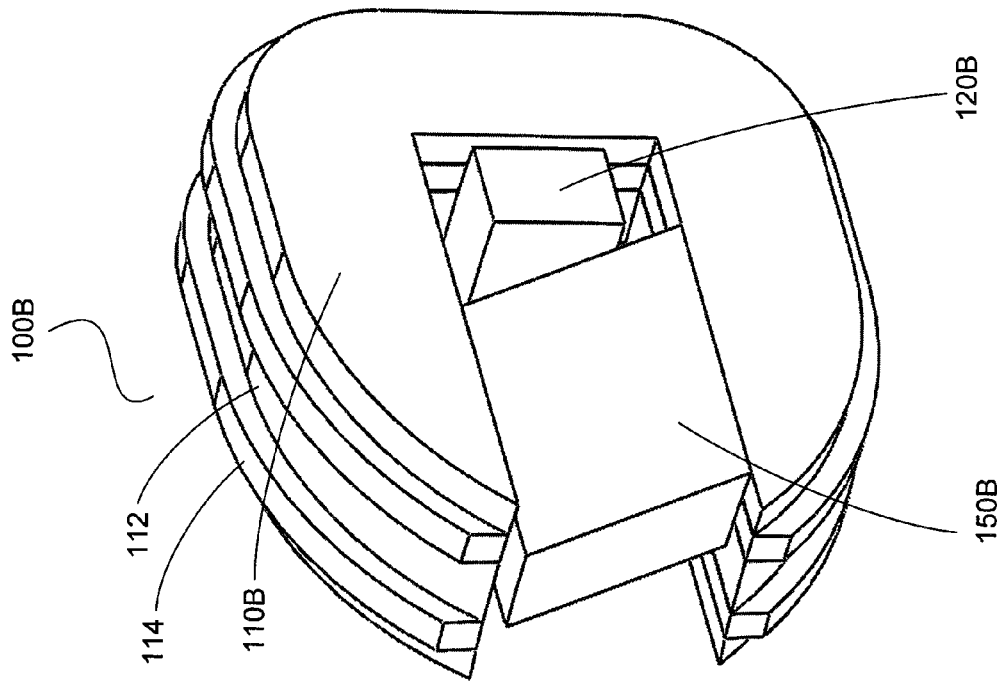
FIG. 1B illustrates an exemplary commutated flux machine in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended statements.

For the sake of brevity, conventional techniques for electrical system construction, management, operation, measurement, optimization, and/or control, as well as conventional techniques for magnetic flux utilization, concentration, control, and/or management, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical electrical system, for example an AC synchronous electric motor, a generator, and/or the like.

Various shortcomings of prior electrical machines can be addressed by utilizing transverse flux machines and/or commutated flux machines configured in accordance with principles of the present disclosure. As used herein, a "transverse flux machine" and/or "commutated flux machine" may be any electrical machine wherein magnetic flux paths have sections where the flux is generally transverse to a rotational plane of the machine. In an exemplary embodiment, when a magnet and/or flux concentrating components are on a rotor and/or are moved as the machine operates, the electrical machine may be a pure "transverse" flux machine. In another exemplary embodiment, when a magnet and/or flux concentrating components are on a stator and/or are held stationary as the machine operates, the electrical machine may be a pure "commutated" flux machine. As is readily apparent, in certain configurations a "transverse flux machine" may be considered to be a "commutated flux machine" by fixing the rotor and moving the stator, and vice versa. Moreover, a coil may be fixed to a stator; alternatively, a coil may be fixed to a rotor.

There is a spectrum of functionality and device designs bridging the gap between a commutated flux machine and a transverse flux machine. Certain designs may rightly fall between these two categories, or be considered to belong to both simultaneously. Therefore, as will be apparent to one skilled in the art, in this disclosure a reference to a "transverse flux machine" may be equally applicable to a "commutated flux machine" and vice versa.

Moreover, transverse flux machines and/or commutated flux machines may be configured in multiple ways. For example, with reference to FIG. 2A, a commutated flux machine may be configured with a stator 210 generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap." Similar approaches may be followed in transverse flux machines and are referred to in a similar manner.

Figure 3C:
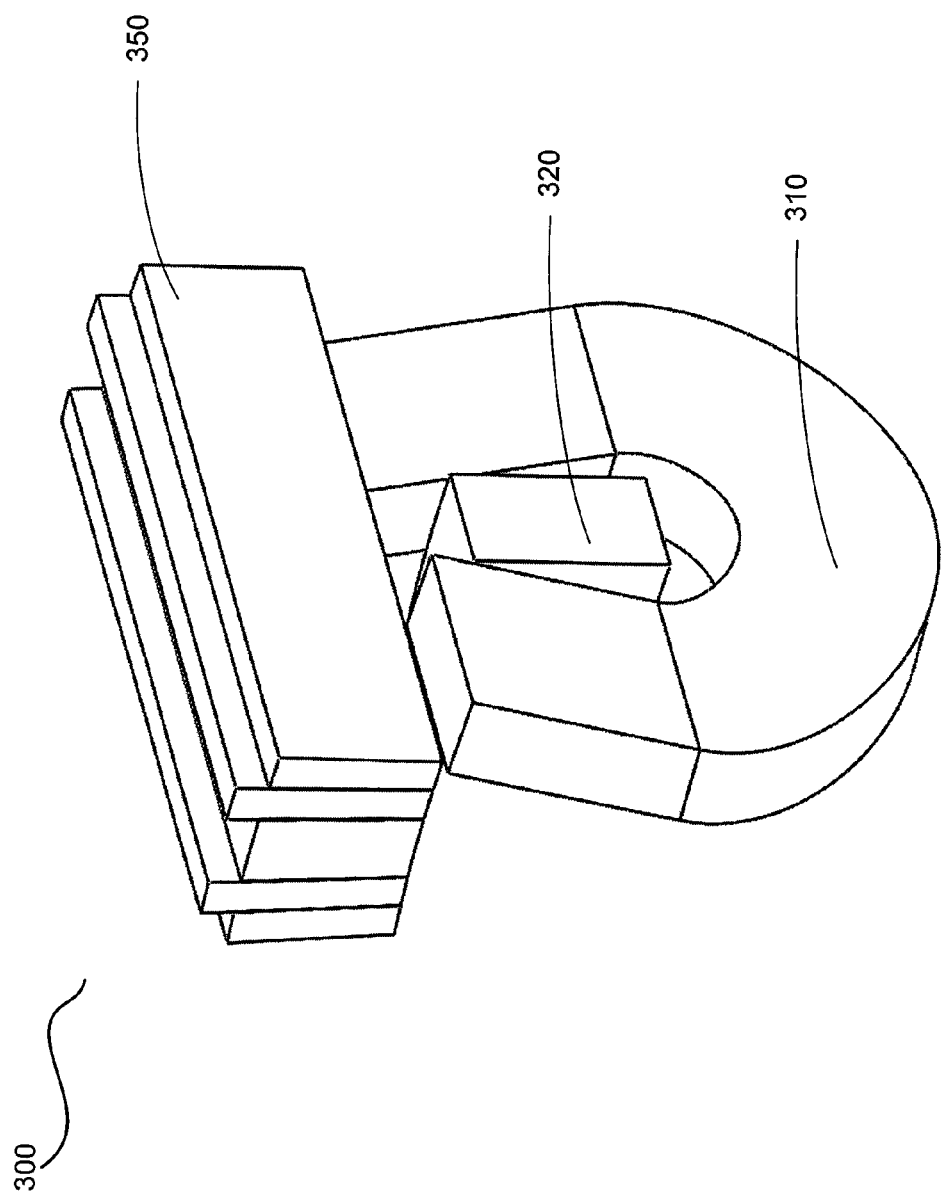
FIG. 3C illustrates an exemplary face engaged transverse flux configuration in accordance with an exemplary embodiment.

With reference now to FIG. 3A, a flux switch 352 in a commutated flux machine may engage a stator 310 by extending at least partially into a cavity defined by stator 310. Such a configuration is referred to herein as "cavity engaged." Turning to FIG. 3B, flux switch 352 in a commutated flux machine may engage stator 310 by closely approaching two terminal faces of stator 310. Such a configuration is referred to herein as "face engaged." Similar engagement approaches may be followed in transverse flux machines and are referred to in a similar manner. In general, it should be noted that a particular electrical machine may be face engaged or cavity engaged, and may be an axial gap or radial gap configuration. For example, in an exemplary embodiment, with reference to FIG. 3C, a transverse flux machine 300 comprises a coil 320 at least partially surrounded by stator 310. Stator 310 is face engaged with rotor 350 in an axial gap configuration.

Moreover, a transverse flux machine and/or commutated flux machine in accordance with principles of the present disclosure may be configured with any suitable components, structures, and/or elements in order to provide desired electrical, magnetic, and/or physical properties. For example, a transverse flux machine having a torque density in excess of 30 Newton-meters per kilogram of active magnetic material may be achieved by utilizing portions of laminated material. As used herein, "torque density" refers to Newton-meters of continuous torque produced per kilogram of active electrical and magnetic materials in the motor. Also as used herein, continuous torque is defined as a level of output torque that produces a maximum (spatial) equilibrium temperature of 100 degrees Celsius in the motor stator, responsive to a load of duty type S1 as defined in International Electrotechnical Commission (IEC) standard 60034-1, given ambient temperature of 25 degrees Celsius and airflow of 8 kilometers per hour around the motor.

Additionally, in accordance with principles of the present disclosure, a transverse flux machine and/or commutated flux machine may be configured to achieve a higher voltage constant. In this manner, the number of turns in the machine may be reduced, in connection with a higher frequency. A corresponding reduction in coil resistance and/or the number of turns in the coil may thus be achieved. Similarly, as the voltage may be higher, the current may be smaller, resulting in a more efficient machine.

Yet further, in accordance with principles of the present disclosure, a transverse flux machine and/or commutated flux machine may be configured to achieve a high flux switching frequency, for example a flux switching frequency in excess of 500 Hz. Because flux is switched at a high frequency, torque density may be increased.

An electrical machine, for example an electric motor, may be any system configured to facilitate the switching of magnetic flux. In various exemplary embodiments, an electric motor may comprise a transverse flux machine and/or a commutated flux machine. In general, a transverse flux machine and/or commutated flux machine comprises a rotor, a stator, and a coil. A flux switch may be located on the stator or the rotor. As used herein, a "flux switch" may be any component, mechanism, or device configured to open and/or close a magnetic circuit (i.e., a portion where the permeability is significantly higher than air). A magnet may be located on the stator or the rotor. Optionally, flux concentrating portions may be included on the stator and/or the rotor.

A coil may be at least partially enclosed and/or partially surrounded by the stator or the rotor. In an exemplary embodiment, a "partially enclosed" or "partially surrounded" coil may be considered to be a coil wherein more than 50% of the coil exterior is surrounded by the stator and/or rotor. In another exemplary embodiment, a "partially enclosed" or "partially surrounded" coil may be considered to be a coil wherein a magnet, a flux concentrator, and/or a flux switch surrounds the coil by greater than 180 degrees (i.e., more than halfway around the coil).

Figure 1A:
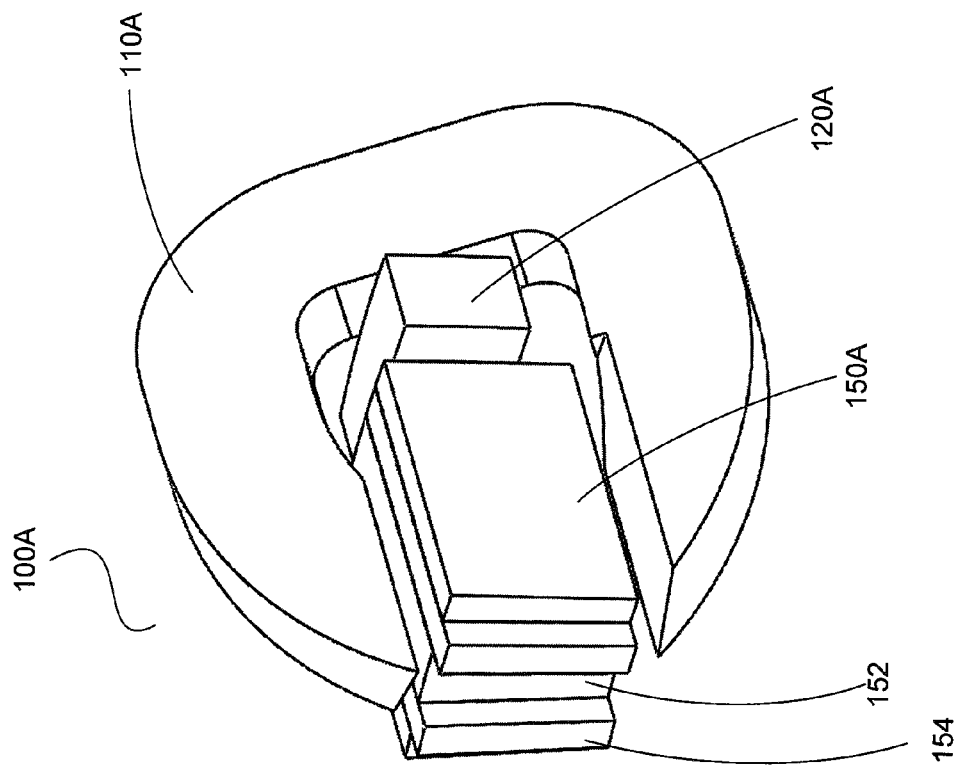
FIG. 1A illustrates an exemplary transverse flux machine in accordance with an exemplary embodiment.

In accordance with an exemplary embodiment, and with renewed reference to FIG. 1A, an electrical machine, for example transverse flux machine (TFM) 100A, generally comprises a rotor 150A, a stator 110A, and a coil 120A. Rotor 150A comprises a plurality of interleaved magnets 154 and flux concentrators 152, spaced apart circumferentially with respect to the rotational axis. Rotor 150A is configured to interact with stator 110A in order to facilitate switching of magnetic flux. Stator 110A is configured to be magnetically coupled to rotor 150A, and is configured to facilitate flow of magnetic flux via interaction with rotor 150A. Stator 110A at least partially encloses coil 120A. Coil 120A is arranged circumferentially with respect to the rotor's rotational axis, and is configured to generate a current output responsive to flux switching and/or accept a current input configured to drive rotor 150A. Transverse flux machine 100A may also comprise various structural components, for example components configured to facilitate operation of transverse flux machine 100A. Moreover, transverse flux machine 100A may comprise any suitable components configured to support, guide, modify, and/or otherwise manage and/or control operation of transverse flux machine 100A and/or components thereof.

In accordance with an exemplary embodiment, and with reference to FIG. 1B, an electrical machine, for example commutated flux machine (CFM) 100B, generally comprises a stator 110B, a rotor 150B, and a coil 120B. Stator 110B comprises a plurality of interleaved magnets 114 and flux concentrators 112. Stator 110B at least partially encloses coil 120B. Stator 110B is configured to interact with rotor 150B in order to facilitate switching of magnetic flux. Stator 110B is configured to be magnetically coupled to rotor 150B, and is configured to facilitate flow of magnetic flux via interaction with rotor 150B. Coil 120B is configured to generate a current output responsive to flux switching and/or accept a current input configured to drive rotor 150B. Commutated flux machine 100B may also comprise various structural components, for example components configured to facilitate operation of commutated flux machine 100B. Moreover, commutated flux machine 100B may comprise any suitable components configured to support, guide, modify, and/or otherwise manage and/or control operation of commutated flux machine 100B and/or components thereof.

Figure 4C:
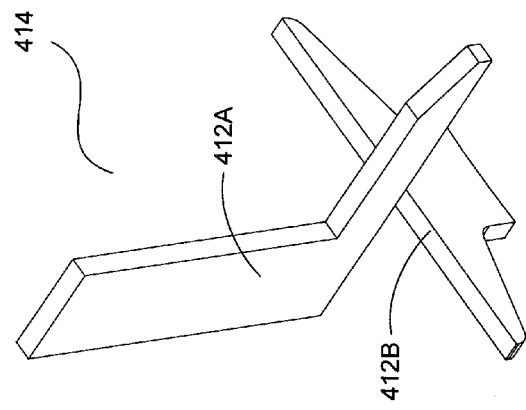
FIG. 4C illustrates individual laminations of an exemplary lamination assembly in accordance with an exemplary embodiment.
Figure 4B:
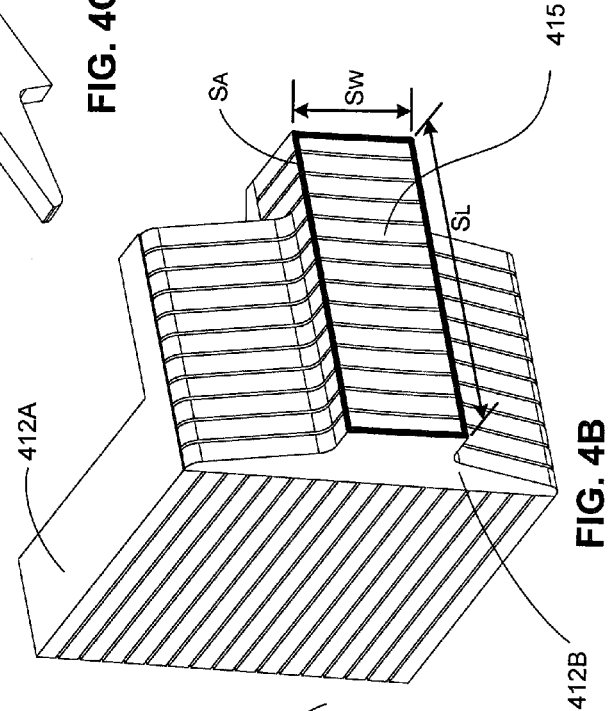
FIGS. 4A and 4B illustrate an exemplary lamination assembly in accordance with an exemplary embodiment.
Figure 4A:
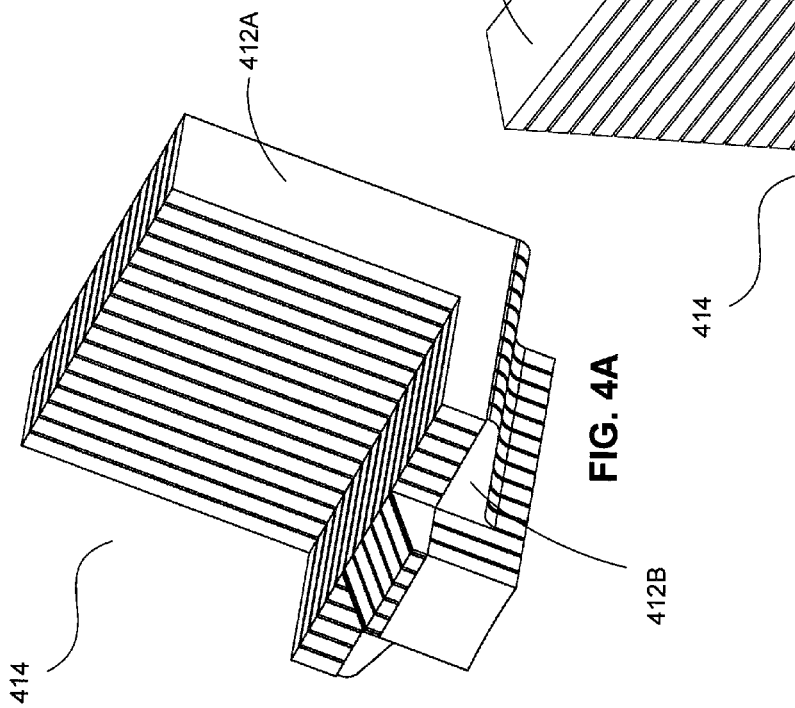

Turning now to FIGS. 4A-4C, in accordance with various exemplary embodiments a transverse flux machine and/or commutated flux machine may utilize one or more lamination assemblies 414 as part of the stator assembly (also referred to as the stator). Lamination assemblies 414 are configured to facilitate switching of magnetic flux in an electrical machine. In various exemplary embodiments, a lamination assembly 414 comprises one or more side lamination assemblies (also referred to as side laminations) 412A and one or more switch lamination assemblies (also referred to as switch laminations) 412B. Moreover, a lamination assembly 414 may comprise additional laminated portions, as desired.

Lamination assembly 414 typically comprises multiple layers of a generally planar material or materials suitable for transmission of magnetic flux. In various exemplary embodiments, lamination assembly 414 comprises silicon steel. In an exemplary embodiment, lamination assembly 414 comprises M19 silicon steel. Lamination assembly 414 may also comprise cold rolled grain oriented ("CRGO") silicon steel, nickel-based alloys (e.g., Carpenter brand high-permeability "49" alloy and/or the like), cobalt-based alloys (e.g., Carpenter brand "Hiperco" cobalt-based materials and/or the like), nickel-cobalt alloys, and/or the like. Moreover, lamination assembly 414 may comprise any suitable material or materials having a desired electrical resistivity and/or magnetic permeability.

Side laminations 412A and switch laminations 412B may comprise the same material. Moreover, side laminations 412A and switch laminations 412B may comprise different materials. In various exemplary embodiments, side laminations 412A comprise a first material, and switch laminations 412B comprise a second material. For example, side laminations 412A may comprise Carpenter brand high-permeability "49" alloy, and switch laminations 412B may comprise Carpenter brand "Hiperco 50" alloy.

In an exemplary embodiment, side laminations 412A have a thickness of about 0.35 mm. In another exemplary embodiment, side laminations 412A have a thickness of between about 0.3 mm and about 0.4 mm. In various exemplary embodiments, side laminations 412A have a thickness between about 0.18 mm and about 0.65 mm. In various exemplary embodiments, switch laminations 412B may be configured with thicknesses generally similar to those of side laminations 412A. Moreover, the thickness of switch laminations 412B may be thicker and/or thinner than the thickness of side laminations 412A, as desired. Side laminations 412A may be configured with any suitable thickness, as desired.

In various exemplary embodiments, side laminations 412A and/or switch laminations 412B are configured with an electrically insulating coating and/or finish on the exterior or a portion of the exterior thereof. The insulating coating may comprise any suitable coating configured to provide a desired level of electrical insulation. For example, in one exemplary embodiment side laminations 412A and/or switch laminations 412B are coated with an oxide finish. In another exemplary embodiment, side laminations 412A and/or switch laminations 412B are coated with an organic-based varnish. In various exemplary embodiments, side laminations 412A and/or switch laminations 412B are coated with one or more of oxidized silicon, a "C-5" coating, and/or a polyimide film (e.g., Kapton® brand film and/or the like). Moreover, side laminations 412A and/or switch laminations 412B may be coated, covered, finished, and/or otherwise at least partially electrically insulated via any suitable method or process, and with any suitable material or combination of materials.

Moreover, in various exemplary embodiments, the portion of lamination assembly 414 where side laminations 412A interface with and/or abut switch laminations 412B may be electrically insulated, for example via an electrically insulating coating, film, and/or the like. By utilizing electrically insulating coatings in and/or on lamination assembly 414, eddy current and other losses may be reduced.

In various exemplary embodiments, lamination assembly 414 is formed by coupling one or more side laminations 412A and one or more switch laminations 412B. Lamination assembly 414 may be formed in any suitable manner, for example by stamping, pressing, embossing, gluing, and/or otherwise mechanically and/or chemically bonding. Side laminations 412A may be pre-shaped, and then joined to one another. Similarly, switch laminations 412B may be pre-shaped, and then joined to one another. Moreover, a group of side laminations 412A and/or a group of switch laminations 412B may also be formed from a sheet or sheets of material. For example, multiple sheets of lamination material may be placed atop one another, and then stamped by a die corresponding to the desired shape of a side lamination 412A and/or a switch lamination 412B. A group of stamped side laminations 412A may then be coupled to a group of stamped switch laminations 412B to form lamination assembly 414.

Lamination assembly 414 may comprise any suitable number of side laminations 412A and/or switch laminations 412B. In an exemplary embodiment, lamination assembly 414 comprises eighteen side laminations 412A and fourteen switch laminations 412B. In various exemplary embodiments, lamination assembly 414 comprises between three side laminations 412A and five hundred side laminations 412A. In various exemplary embodiments, lamination assembly 414 comprises between three switch laminations 412B and five hundred switch laminations 412B. Moreover, lamination assembly 414 may comprise any suitable number of side laminations 412A and/or switch laminations 412B, for example based on a desired thickness of lamination assembly 414, a desired geometry of a flux switch 415, the diameter of an electrical machine, the axial length of an electrical machine, the thickness of one or more side laminations 412A and/or switch laminations 412B, a space available in an electrical machine, and/or the like.

With momentary reference to FIG. 4C, in various exemplary embodiments side laminations 412A in lamination assembly 414 are configured with a different planar alignment than switch laminations 412B in lamination assembly 414. Stated another way, in various exemplary embodiments, side laminations 412A are generally aligned parallel to a first plane, while switch laminations 412B are generally aligned parallel to a second plane, and the first plane and the second plane are not parallel to one another. In this manner, side laminations 412A and switch laminations 412B can interact to direct magnetic flux in three dimensions.

Figure 4D:
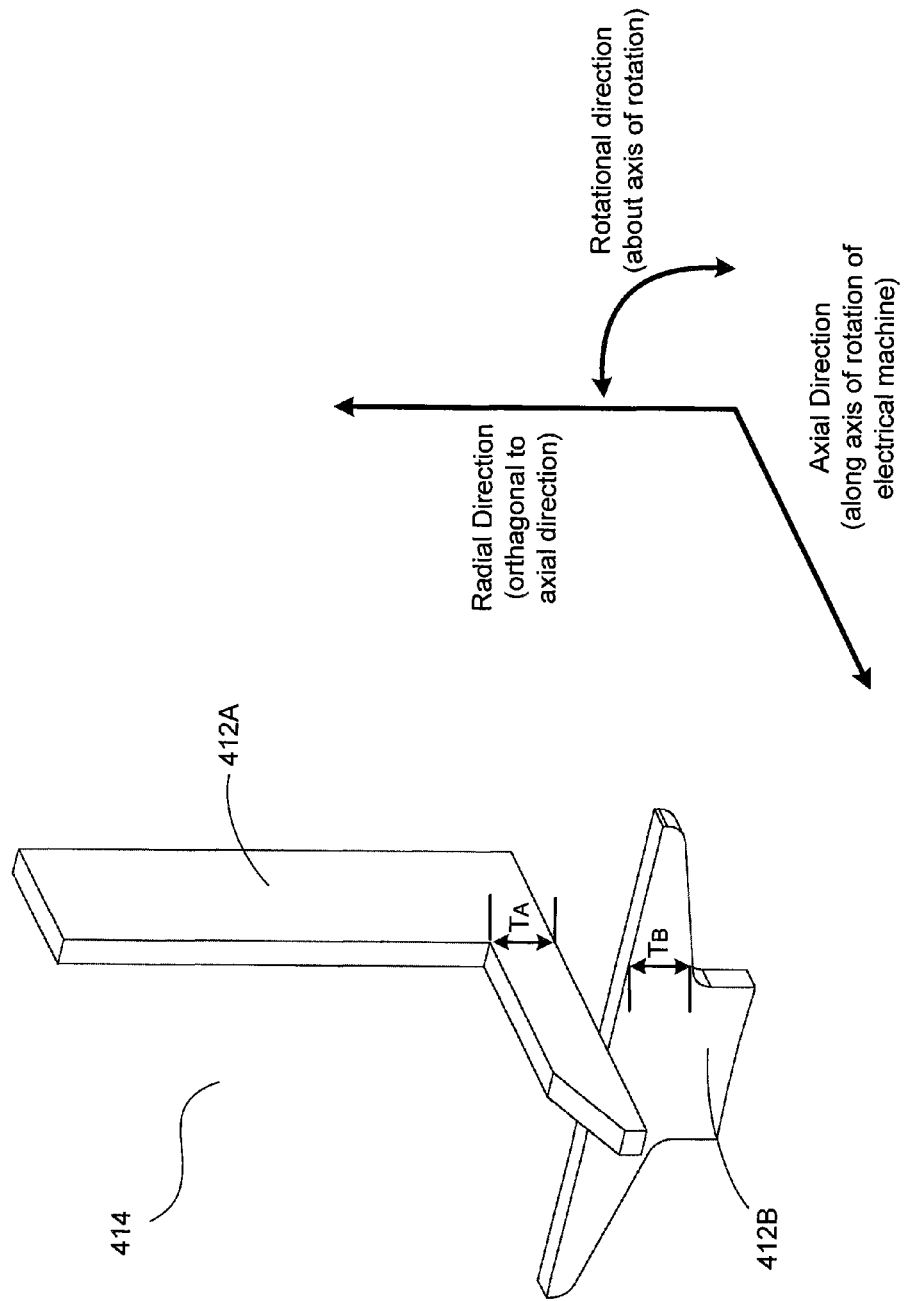
FIG. 4D illustrates exemplary directional references for an electrical machine in accordance with an exemplary embodiment.

With reference now to FIG. 4D, stated generally, directions in an electrical machine having a rotor, for example a transverse flux machine and/or commutated flux machine, may be referenced and/or described via the terms "axial direction" (a direction extending along the axis of rotation of the rotor), "radial direction" (a direction orthogonal to the axial direction, i.e., extending "outward" and/or "inward" with respect to the rotational axis), and "rotational direction" (a direction around the axis of rotation of the rotor, also referred to as the circumferential direction). Accordingly, in various exemplary embodiments, side laminations 412A are configured to extend along planes having one common direction with the planes of switch laminations 412B. For example, with momentary reference to FIG. 4H, in an exemplary embodiment side laminations 412A are generally aligned in planes extending in an axial direction and a radial direction, while switch laminations 412B are generally aligned in planes extending in a radial direction and a rotational direction.

By orienting side laminations 412A and switch laminations 412B in a particular configuration, magnetic flux may be conducted in a transverse flux machine and/or commutated flux machine in three dimensions. In various exemplary embodiments, side laminations 412A are approximately 90 degrees out of plane with switch laminations 412B. In certain exemplary embodiments, the planes of side laminations 412A and the planes of switch laminations 412B share a common radial direction, while side laminations 412A also extend in an axial direction, and switch laminations 412B extend in a rotational direction. In other exemplary embodiments, side laminations 412A are between about 60 degrees out of plane and about 90 degrees out of plane with switch laminations 412B. Moreover, side laminations 412A and switch laminations 412B may be oriented with respect to one another in any suitable configuration wherein the respective planes are not identical.

In various exemplary embodiments, side laminations 412A and/or switch laminations 414B are formed from oriented materials. Stated generally, the shorter the distance a particular side lamination 412A and/or switch lamination 412B extends in a first direction, the greater the benefit in using oriented materials having an orientation generally orthogonal to the first direction. For example, with momentary reference to FIG. 4I, the shorter the distance a switch lamination 412B extends in a rotational direction, the greater the benefit in using oriented materials having an orientation generally in a radial direction. In another example, similar results obtain with respect to the shorter the distance a side lamination 412A extends in the axial direction.

With reference now to FIGS. 4A-4I, in various exemplary embodiments side laminations 412A in lamination assembly 414 are identical to one another. Moreover, in other exemplary embodiments side laminations 412A in lamination assembly 414 differ from one another in size, shape, thickness, material, and/or the like. For example, in a particular lamination assembly 414, certain side laminations 412A located nearer the center of lamination assembly 414 may be configured with one or more flanges, extensions, tabs, or other features. In this manner, side laminations 412A may be configured to achieve at least a portion of a desired overall shape for lamination assembly 414. Moreover, in this manner, side laminations 412A may be configured to facilitate manufacture, installation, and/or use of lamination assembly 414. Additionally, in this manner, side laminations 412A may be configured to align with, be adjacent to, and/or otherwise interact with and/or correspond to at least a portion of one or more switch laminations 412B in order to facilitate transfer of magnetic flux therebetween. Lamination assembly 414 may comprise side laminations 412A having two different shapes, side laminations 412A having three different shapes, side laminations 412A having four different shapes, and/or side laminations 412A having any other suitable number of different shapes, in order to obtain a desired overall shape and/or structure of lamination assembly 414.

Continuing to reference FIGS. 4A-4I, in various exemplary embodiments switch laminations 412B are configured to form a flux switch in the form of a tooth in an electrical machine. In this embodiment, there is a single tooth associated with each switch lamination, but in some embodiments (such as those discussed below) there may be multiple teeth associated with each switch lamination. Thus, at least one tooth is associated with each switch lamination assembly and proximal the rotor for conducting the magnetic flux between the rotor (e.g., the magnets thereon) and the switch lamination assembly.

For example, multiple switch laminations 412B may be stacked, linked, bonded, stamped, fastened, embossed, and/or otherwise coupled to form a flux switch 415. Flux switch 415 may be configured with a switch area $S_A$. In exemplary embodiments where flux switch 415 is generally rectangular, switch area $S_A$ may be considered to be the product of a switch length $S_L$ and a switch width $S_W$. However, flux switch 415 may be configured with various shapes, curves, angles, tapers, notches, extensions, and/or the like, for example in order to achieve a desired switch area $S_A$, to achieve a desired timing in an electrical machine, to reduce cogging torque in an electrical machine, to reduce flux leakage, and/or the like.

In various exemplary embodiments, switch laminations 412B are configured with varying widths along a particular dimension. For example, with momentary reference to FIGS. 4C and 4D, moving along switch laminations 412B in a radial direction, switch laminations 412B may increase in width in a rotational direction as the radial distance increases. In various exemplary embodiments, switch laminations 412B are configured with a generally tapered "anvil"-like shape. The broader side (also referred to as the wider portion) of the "anvil" may abut one or more side laminations 412A, for example, and the narrower side of the "anvil" may at least partially form flux switch 415. That is, the laminated materials of the switch lamination has the wider or broader portion adjacent the laminated materials of the side lamination (also referred to as the second group) that is wider in the circumferential direction than the narrower portion adjacent the tooth or teeth associated therewith for directing the magnetic flux between the at least one tooth and the laminated materials of the side lamination. For flux flowing from the tooth/teeth, the flux is distributed circumferentially from the narrower to the wider portion, whereas the flux from to the tooth/teeth is focused circumferentially from the wider portion to the narrower portion. In another exemplary embodiment, switch laminations 412B are configured with constant widths along a particular dimension, and blocks of switch laminations 412B are set appropriate angles in order to at least partially form a lamination assembly 414. Switch laminations 412B may be configured with any suitable shape or shapes, as desired.

Figure 4E:
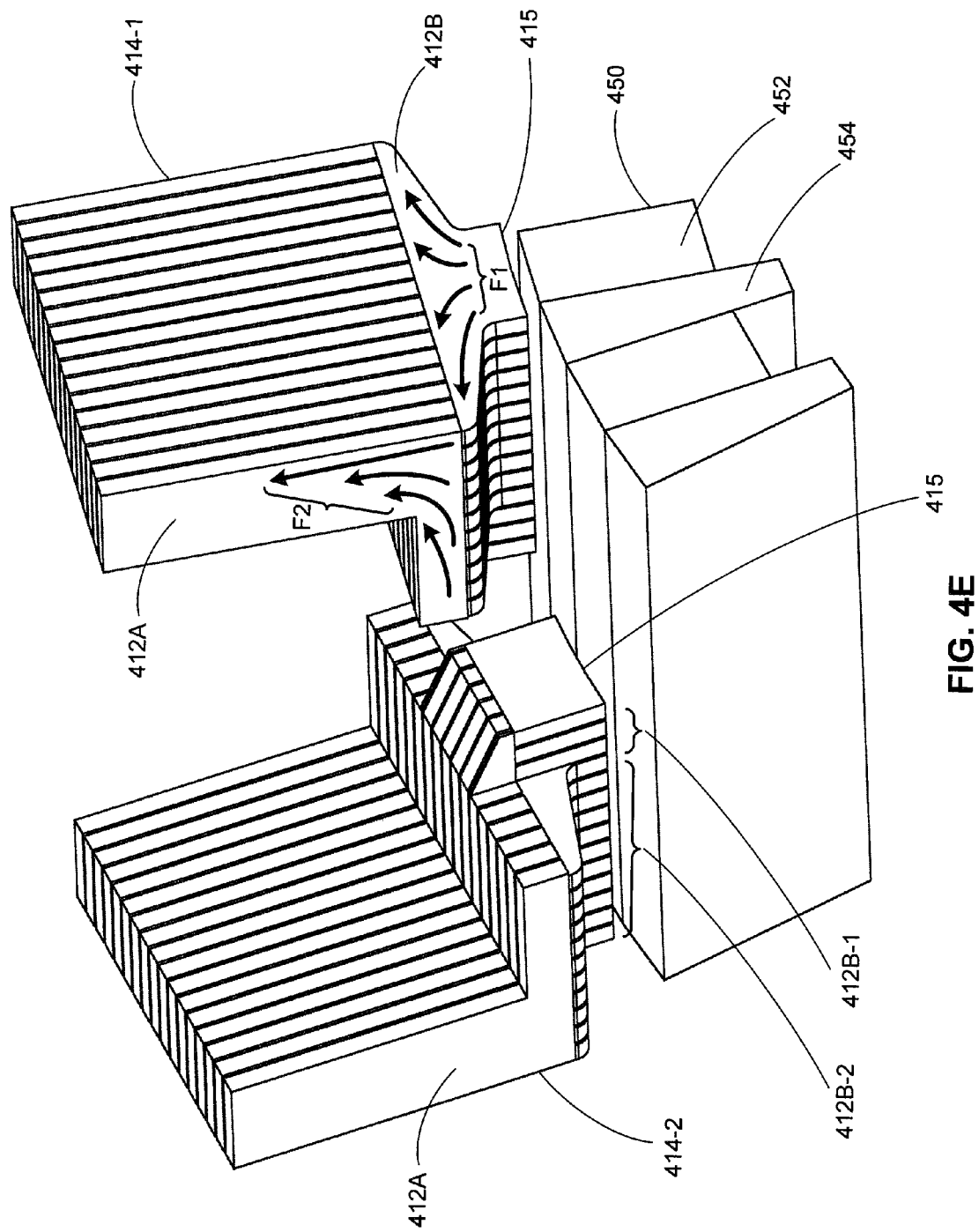
FIG. 4E illustrates flux flow in an exemplary lamination assembly in accordance with an exemplary embodiment.

Switch laminations 412B in lamination assembly 414 may be identical to one another. Moreover, switch laminations 412B in lamination assembly 414 may differ from one another in size, shape, thickness, and/or the like. For example, as illustrated in FIGS. 4A and 4E, in a particular lamination assembly 414 certain switch laminations 412B located on a first axial side of lamination assembly 414 (for example, switch laminations 412B in group 412B-1) may be smaller than other switch laminations 412B located on a second axial side of lamination assembly 414 (for example, switch laminations 412B in group 412B-2), in order to form at least a portion of a "clawpole"-like switch configuration. Moreover, switch laminations 412B may be configured to facilitate manufacture, installation, and/or use of lamination assembly 414. Additionally, switch laminations 412B may be configured to align with, be adjacent to, and/or otherwise interact with and/or correspond to at least a portion of one or more side laminations 412A in order to facilitate transfer of magnetic flux therebetween.

Additional details regarding side laminations, lamination stacks, segmented lamination stacks, materials for laminations and the like may be found in U.S. Patent Application Publication No. 2012-0119610 entitled "TRANSVERSE AND/OR COMMUTATED FLUX SYSTEMS HAVING SEGMENTED STATOR LAMINATIONS," the contents of which are hereby incorporated by reference in their entirety.

Figure 5A:
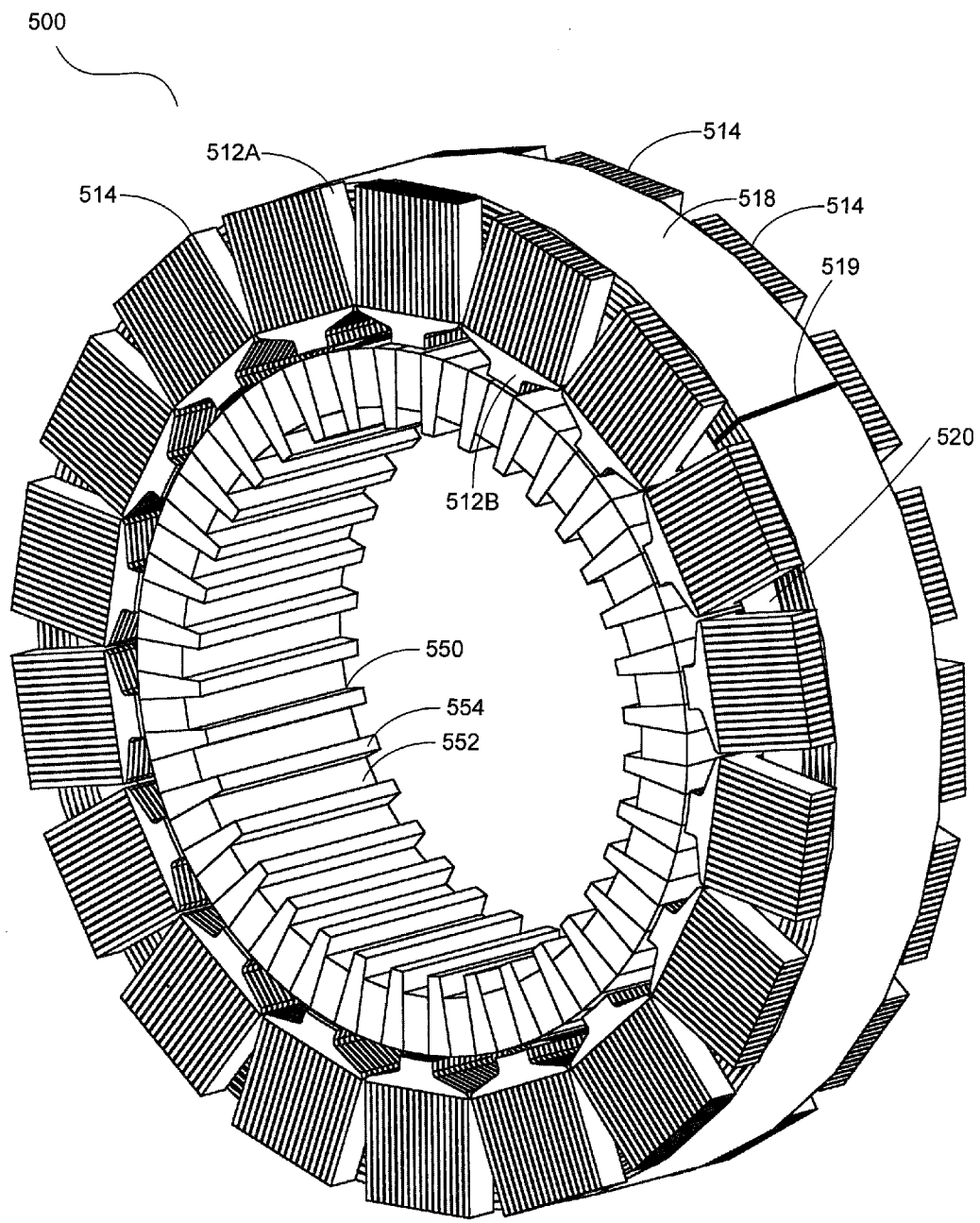
FIG. 5A illustrates an exemplary transverse flux machine utilizing lamination assemblies in accordance with an exemplary embodiment.
Figure 5B:
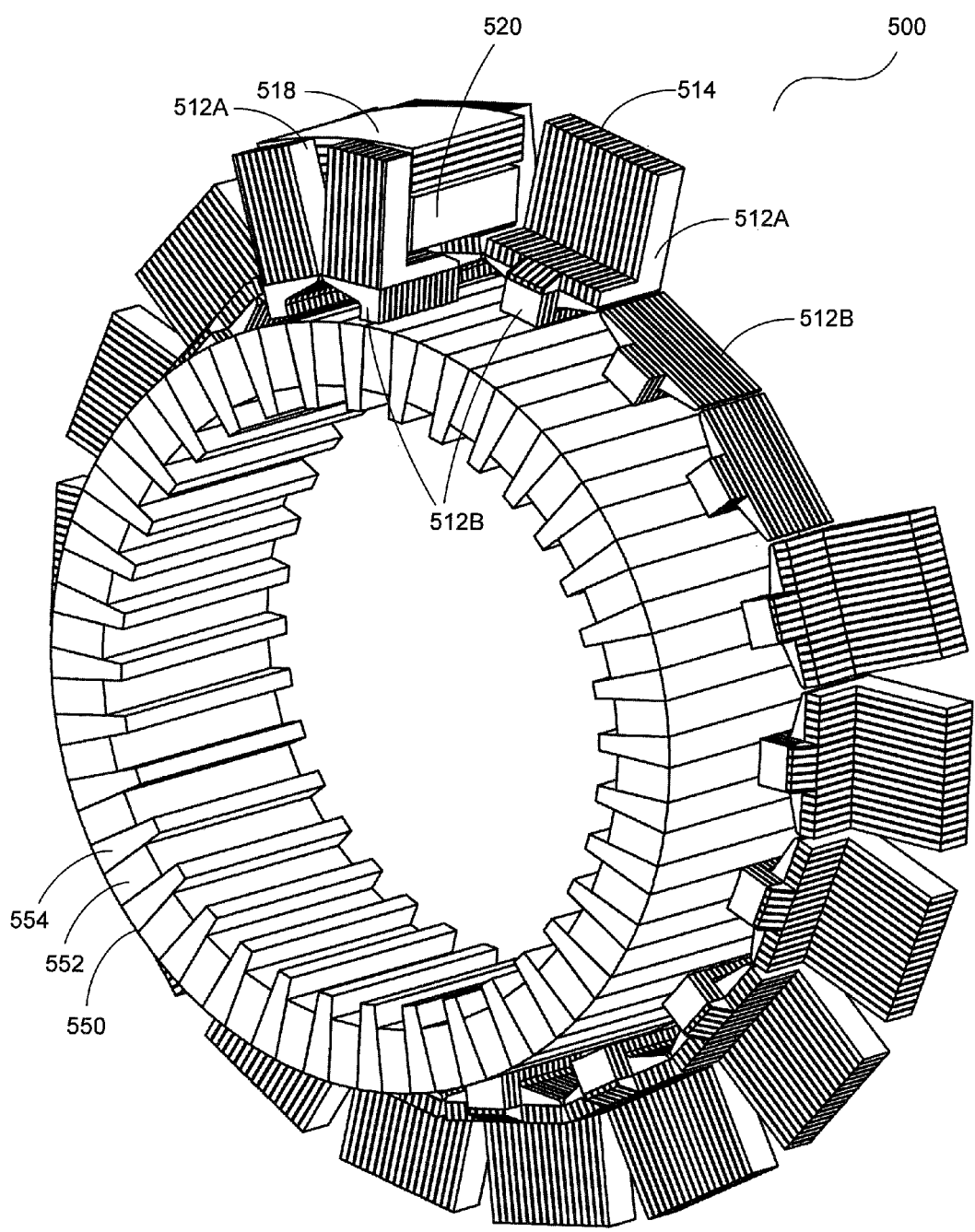
FIGS. 5B and 5C illustrate partial cut-away views of an exemplary transverse flux machine utilizing lamination assemblies in accordance with an exemplary embodiment.
Figure 5C:
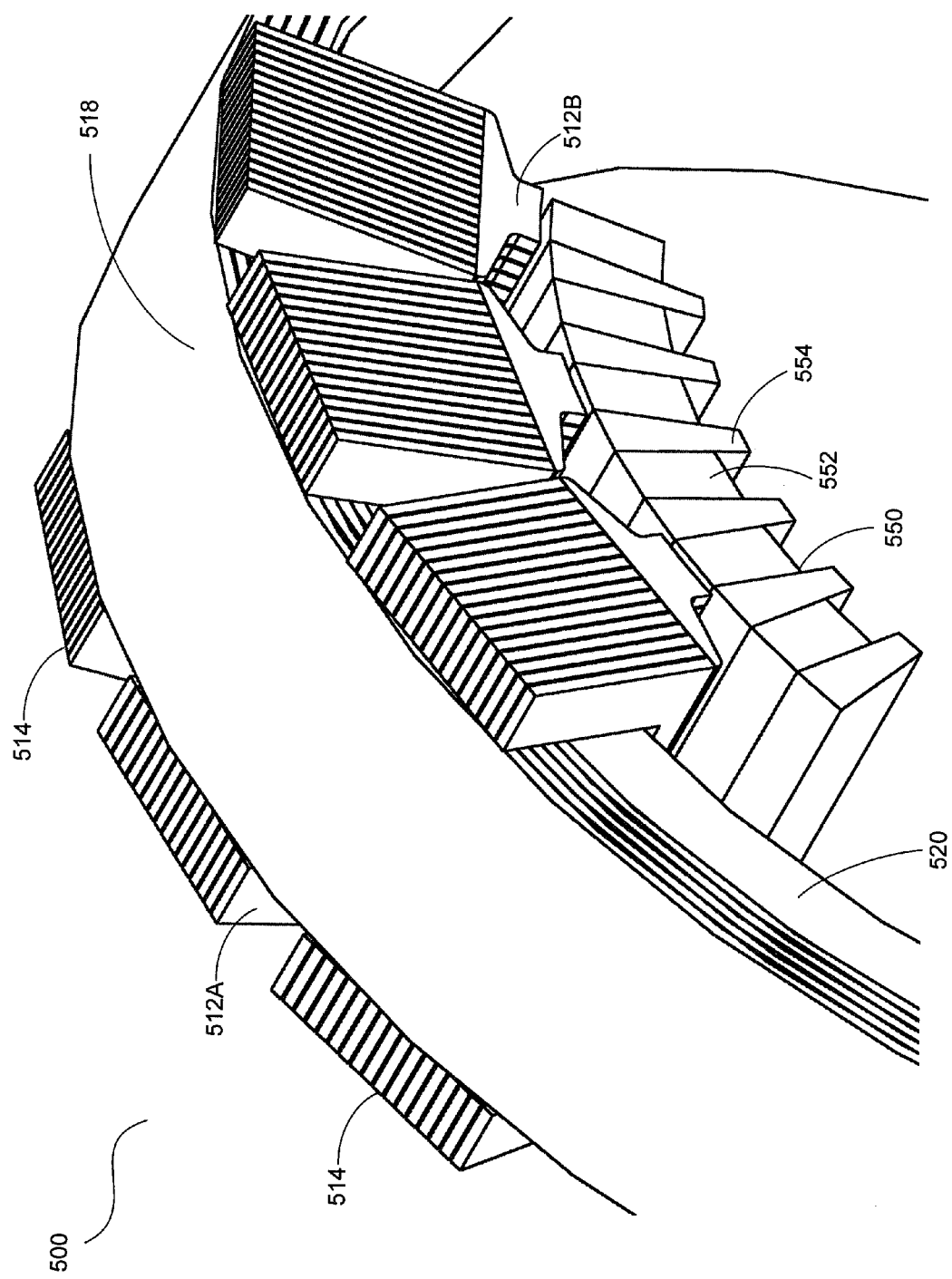
Figure 5D:
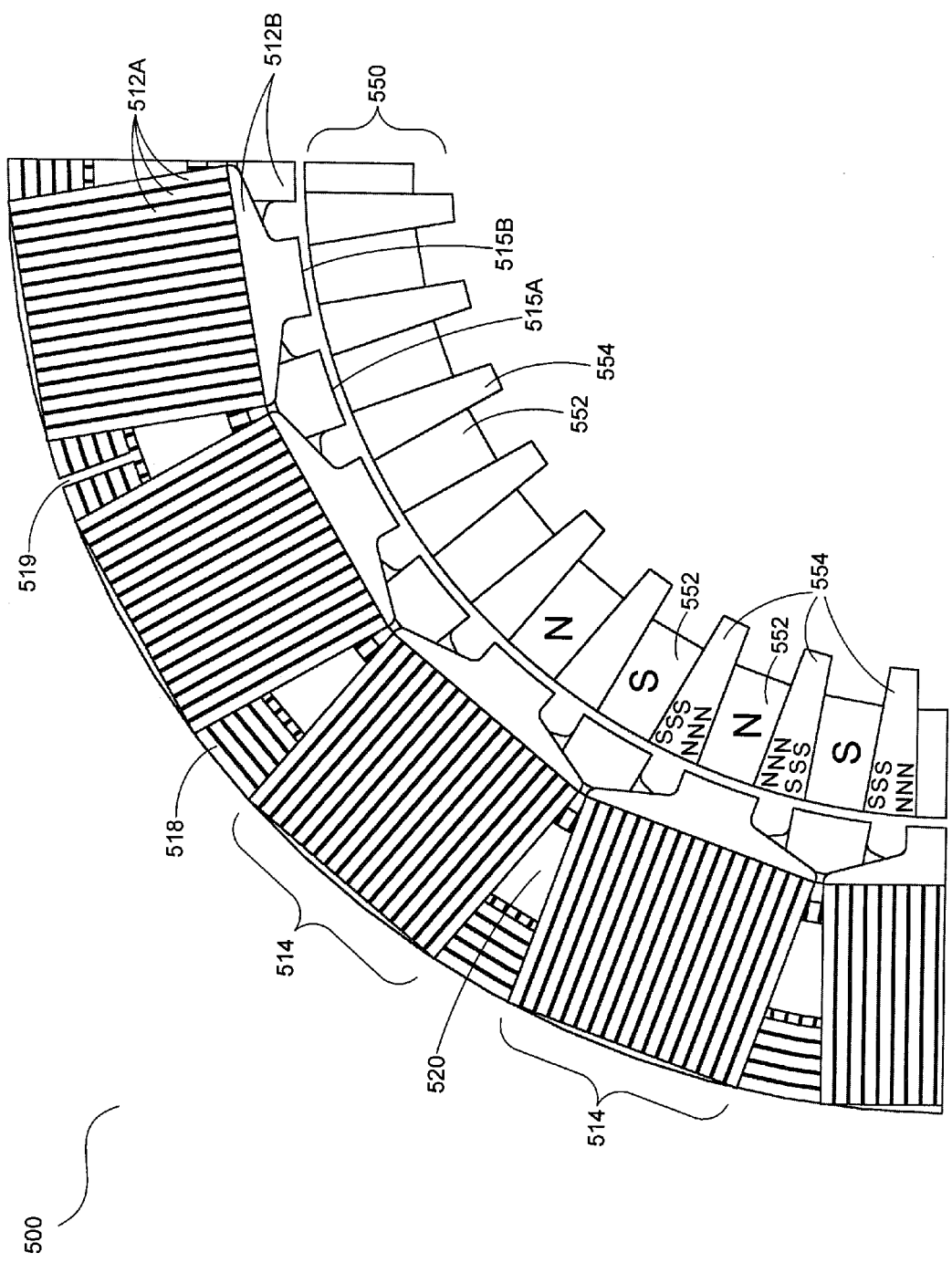
FIG. 5D illustrates a quarter section view of an exemplary transverse flux machine utilizing lamination assemblies in accordance with an exemplary embodiment.

With reference now to FIGS. 4B and 4E, in various exemplary embodiments flux switch 415 is configured to face an air gap in a transverse flux machine and/or a commutated flux machine. Flux switch 415 may be planar; alternatively, flux switch 515 may be convex and/or concave. Flux switch 415 may be configured with various lengths, widths, curves, and/or the like, as suitable. For example, in an exemplary embodiment a switch length $S_L$ and a switch width $S_W$ of flux switch 415 may be selected based at least in part on dimensions of a portion of a rotor 450 to which flux switch 415 is intended to interface. For example, flux switch 415 may be configured to have a switch width $S_W$ of about the same width as a flux concentrator 452 in a rotor of a transverse flux machine (the flux concentrators 452 are positioned between the magnets 454, which may in some embodiments be arranged with their polarity orientation alternating circumferentially, N-S, S-N, N-S, etc. as shown for example in FIG. 5D). Moreover, flux switch 415 may be configured to have a switch width $S_W$ wider than the width of flux concentrator 452 in rotor 450 of a transverse flux machine, and/or a switch width $S_W$ narrower than the width of flux concentrator 452 in a rotor of a transverse flux machine.

In various exemplary embodiments, flux switch 415 may be configured for switching a sufficient amount of magnetic flux in order to saturate or nearly saturate other components of a magnetic flux path in a transverse flux machine and/or commutated flux machine. Moreover, flux switch 415 and/or other portions of lamination assembly 414 may be configured to reduce flux leakage in a transverse flux machine and/or commutated flux machine.

In various exemplary embodiments, switch width $S_W$ is configured to be about 1.2 times the width of flux concentrator 452. In another exemplary embodiment, switch width $S_W$ is configured to be about 1.5 times the width of flux concentrator 452. In another exemplary embodiment, switch width $S_W$ is configured to be about 1.875 times the width of flux concentrator 452. In various exemplary embodiments, switch width $S_W$ is configured to be between about equal to the width of flux concentrator 452 to about 2 times the width of flux concentrator 452. Moreover, a desirable ratio of switch width $S_W$ to the width of flux concentrator 452, for example based on dimensions of an air gap in a transverse flux machine.

In various exemplary embodiments, switch area $S_A$ may be configured to have a desired characteristic, for example a desired switch width $S_W$, at least in part as a function of a pole pitch in a transverse flux machine and/or commutated flux machine. In an exemplary embodiment, switch width $S_W$ is about 5 mm, the pole pitch is about 5.7 mm, and the transverse flux machine is configured with 60 poles. In this embodiment, the ratio of switch width $S_W$ to pole pitch is about 0.88. In another exemplary embodiment, switch width $S_W$ is about 3 mm, the pole pitch is about 4.75 mm, and the transverse flux machine is configured with 72 poles. In this embodiment, the ratio of switch width $S_W$ to pole pitch is about 0.63. In various exemplary embodiments, the ratio of switch width $S_W$ to pole pitch may be between about 0.5 to about 0.95. Moreover, the ratio of switch width $S_W$ to pole pitch may be selected based on one or more of a desired cogging torque in a transverse machine, the diameter of a rotor in a transverse flux machine, the number of poles in a transverse flux machine, the dimensions of an air gap in a transverse flux machine, and/or the like, as suitable, in order to achieve one or more desired operational and/or performance characteristics of a transverse flux machine. Moreover, stated generally, switch area $S_A$ may be configured to maximize the amount of flux switched between a rotor and a stator in a transverse flux machine and/or commutated flux machine.

In various exemplary embodiments, the configuration of flux switches 415 and/or the location of flux switches 415 on lamination assembly 414 are configured to implement a sixth-phase offset in order to reduce cogging torque. In an exemplary embodiment, the location of flux switches 415 on lamination assembly 414 is configured to implement a sixth-phase offset distributed across two lamination assemblies 414. In another exemplary embodiment, the location of flux switches 415 on lamination assembly 414 is configured to implement a sixth-phase offset distributed across three lamination assemblies 414. In various other exemplary embodiments, the location of flux switches 415 on lamination assembly 414 is configured to implement a sixth-phase offset distributed across four or more lamination assemblies 414. Moreover, the configuration of flux switches 415 and/or the location of flux switches 415 on lamination assembly 414 may be configured to implement a single sixth-phase offset in an electrical machine, a double sixth-phase offset in an electrical machine, a triple sixth-phase offset in an electrical machine, and/or any other suitable implantation of a sixth phase offset in an electrical machine. Additional details regarding phase offset in an electrical machine, for example a sixth-phase offset, are disclosed in U.S. patent application Ser. No. 12/772,962 filed on May 3, 2010, now U.S. Patent Application Publication 2011/0169366 entitled "TRANSVERSE AND/OR COMMUTATED SYSTEMS HAVING PHASE OFFSET", the contents of which are hereby incorporated by reference in their entirety.

In various exemplary embodiments, multiple lamination assemblies 414 may be utilized to form a generally ring-shaped structure. In the ring-shaped structure, flux switches 415 may be disposed to generally face the radial interior of the ring (for example, in connection with the use of an "inner" rotor in an axial gap configuration), the radial exterior of the ring (for example, in connection with the use of an "outer" rotor in an axial gap configuration), and/or an axial side of the ring (for example, in connection with the use of a "side by side" rotor in a radial gap configuration). As used herein, a generally ring-shaped structure or other suitable structures composed of lamination assemblies 414 may be referred to as a "stator half". For example, in various exemplary embodiments a first stator half and a second stator half may be utilized to at least partially enclose and/or surround a coil. Moreover, a first stator half and a second stator half may be utilized to provide a magnetic flux path from a portion of a rotor having a first polarity to a portion of a rotor having the opposite polarity.

That is, the stator may be considered to have a plurality of pairs of the side lamination assemblies on opposing sides of said coil for conducting magnetic flux, the pairs of side lamination assemblies being arranged circumferentially with respect to the rotational axis; and a plurality of pairs of the switch lamination assemblies for conducting the magnetic flux, the pairs of switch lamination assemblies being arranged circumferentially with respect to the rotational axis and positioned adjacent ends of side lamination assemblies proximal the rotor. The pairs refer to the two of each that cooperate together to conduct the flux about coil. Thus, a pair of side lamination assemblies or a pair of switch lamination assemblies would be those adjacent pairs on opposite sides of the coil (in a radial gap configuration, they would be axially apart, and in an axial gap configuration they would be radially apart). The pair need not be directly opposite each other, and some staggering or displacement may be used in the design. The coil is disposed between the laminated materials of each pair of side lamination assemblies and each pair of side lamination assemblies is coupled distal the rotor for conducting the magnetic flux therebetween.

In various exemplary embodiments, with momentary reference to FIGS. 4F through 4I, one or more lamination assemblies 414 may be configured with one or more holes 413 at least partially therethrough. Holes 413 may be configured to facilitate coupling of side laminations 412A and/or switch laminations 412B, mounting of additional motor components to lamination assembly 414 (for example, an adjustable Hall effect sensor system, a temperature sensor, and/or the like), coupling of multiple lamination assemblies 414 to form a stator half, coupling of a lamination assembly 414 to structural and/or mechanical components of an electrical machine, and/or the like.

Continuing to reference FIGS. 4F through 4I, in various exemplary embodiments, in a lamination assembly 414 a group of switch laminations 412B may be configured to couple with, mount to, at least partially enclose, and/or otherwise interface with multiple groups of side laminations 412A. For example, as shown in FIG. 4F, a group of switch laminations 412B is configured with a first cavity for at least partially receiving a first group 412A-1 of side laminations 412A, and a second cavity for at least partially receiving a second group 412A-2 of side laminations 412A. In an exemplary embodiment, lamination assembly 414 comprises one group of switch laminations 412B, and one group of side laminations 412A. In another exemplary embodiment, lamination assembly 414 comprises one group of switch laminations 412B, and two groups of side laminations 412A. In another exemplary embodiment, lamination assembly 414 comprises one group of switch laminations 412B, and three groups of side laminations 412A. Moreover, lamination assembly 414 may comprise any suitable number of groups of side laminations 412A and any suitable number of groups of switch laminations 412B, as desired.

The group of laminated materials forming each switch lamination assembly may be referred to as a first group of laminated materials aligned circumferentially and in a first direction with respect to the rotational axis for conducting the magnetic flux circumferentially and in the first direction between the at least one tooth associated therewith and the adjacent side lamination assembly. The first direction is one selected from the group consisting of the axial and radial directions with respect to the rotational axis. In an axial gap configuration, the first direction is radial, and in a radial gap configuration the first direction is axial. Likewise, the group of laminated materials forming each side lamination assembly may be referred to as a second group of laminated materials aligned axially and radially with respect to the rotational axis for conducting the magnetic flux axially and radially. The coil more specifically is located between the second group of laminated materials of each side lamination assembly.

Lamination assembly 414 may be configured with any suitable number of flux switches 415 (i.e., teeth). In an exemplary embodiment, lamination assembly 414 is configured with one flux switch 415. In another exemplary embodiment, lamination assembly 414 is configured with two flux switches 415. In other exemplary embodiments, lamination assembly 414 is configured with three flux switches 415, four flux switches 415, and/or more flux switches 415. In one exemplary embodiment, lamination assembly 414 is configured with twelve flux switches 415. The number of flux switches 415 on a particular lamination assembly 414 may be selected, for example, based at least in part on the pole pitch of a transverse flux machine, the number of poles in a transverse flux machine, the diameter of a transverse flux machine, an operational RPM range of a transverse flux machine, a desired cogging torque in a transverse flux machine, mechanical and/or structural considerations, and/or the like.

In various exemplary embodiments, the number of pairs of flux switches 415 (i.e., teeth) in lamination assembly 414 is the same as the number of groups of side laminations 412A in lamination assembly 414. In other exemplary embodiments, the number of flux switches 415 in lamination assembly 414 is different than the number of groups (i.e., pairs) of side laminations 412A in lamination assembly 414. In an exemplary embodiment, lamination assembly 414 comprises one flux switch 415 and two groups of side laminations 412A. In another exemplary embodiment, lamination assembly 414 comprises two flux switches 415 and two groups of side laminations 412A. In another exemplary embodiment, lamination assembly 414 comprises one flux switch 415 and three groups of side laminations 412A. In yet another exemplary embodiment, lamination assembly 414 comprises two flux switches 415 and one group of side laminations 412A. In still other exemplary embodiments, lamination assembly 414 comprises a plurality of flux switches 415 and a plurality of groups of side laminations 412A.

With reference now to FIGS. 4A through 4I, in various exemplary embodiments lamination stack 414 is configured to "redistribute" flux in at least one dimension. For example, with particular reference to FIG. 4E, magnetic flux entering a lamination stack 414 from rotor 450 is initially generally "redistributed" along a rotational direction within switch laminations 412B, for example as illustrated by arrows F1. Upon moving from switch laminations 412B to side laminations 412A, magnetic flux thereafter generally moves along an axial direction and/or radial direction within side laminations 412A, for example as illustrated by arrows F2. It will be appreciated that when rotor 450 is rotated to a location where flux exits the lamination stack 414 and enters rotor 450, the above-described magnetic flux path operates in reverse order.

In various exemplary embodiments, due to the laminated structure of switch laminations 412B, and due to the generally "anvil"-like shape of switch laminations 412B, when magnetic flux enters lamination stack 414 at flux switch 415, lamination stack 414 is configured to redistribute magnetic flux generally along a rotational direction prior to allowing significant magnetic flux movement in an axial direction. Stated differently, because switch laminations 412B become wider in a rotational direction as the distance from flux switch 415 increases, concentrated flux entering lamination stack 414 at flux switch 415 is permitted to redistribute along a rotational direction within each switch lamination 412B.

Figure 4G:
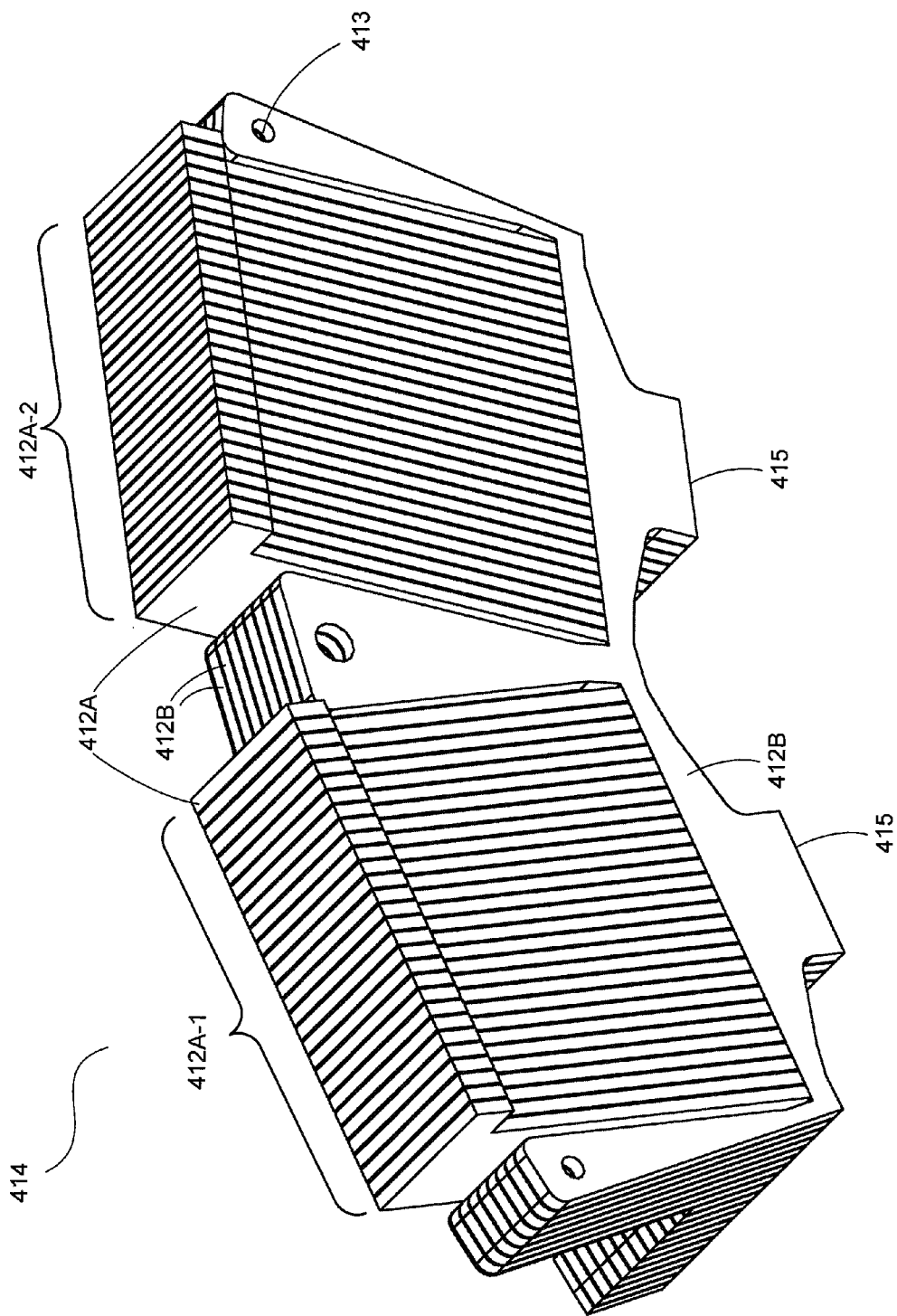
Figure 4H:
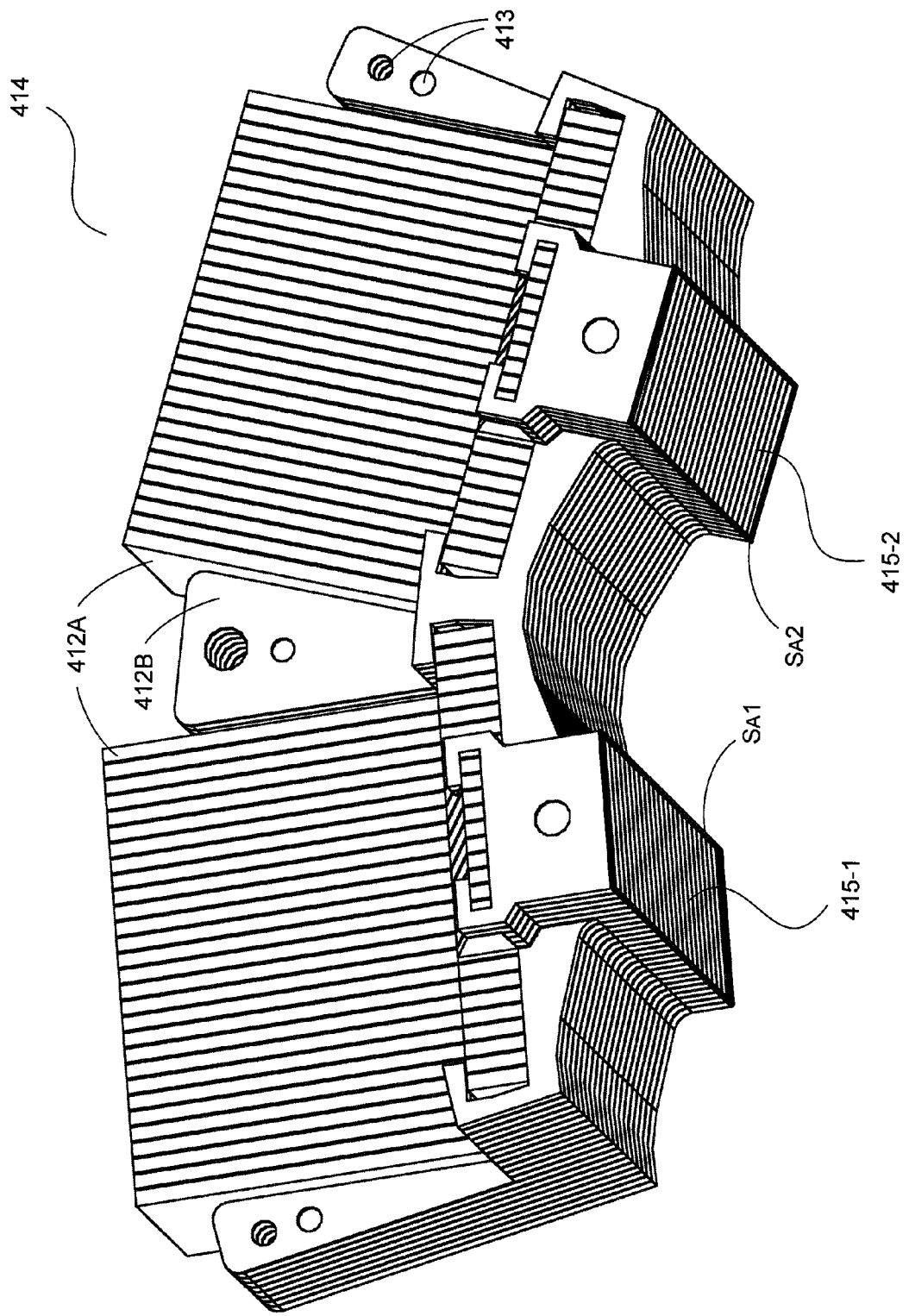
Figure 4I:
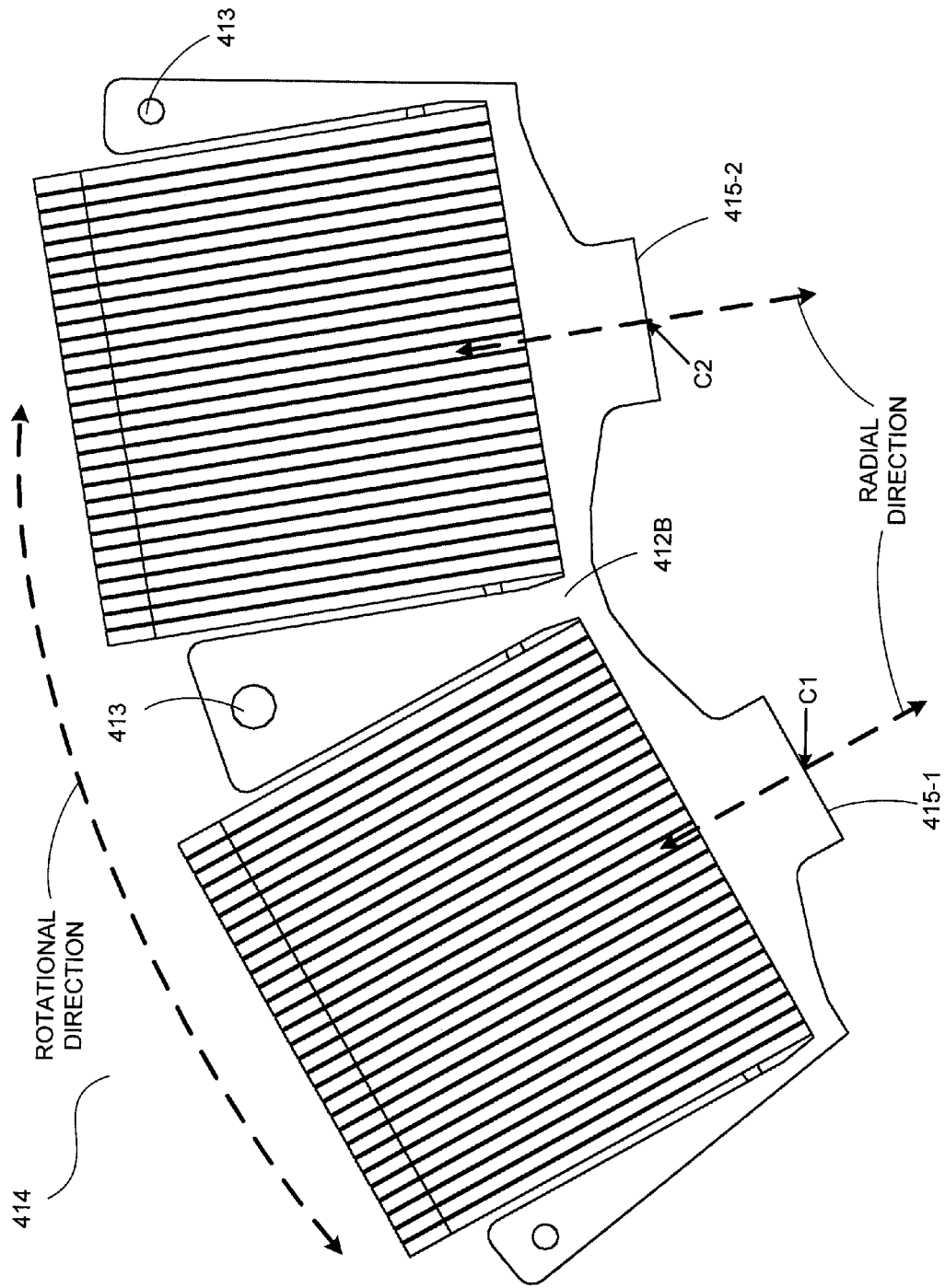

In various exemplary embodiments, with particular reference to FIG. 4E, switch laminations 412B are configured to redistribute flux along a rotational direction. Switch laminations 412B may be configured to redistribute flux any suitable distance along a rotational direction; however, in many instances it is advantageous to distribute flux over as large a distance in the rotational direction as there is space available. For example, in certain exemplary embodiments, switch laminations 412B are configured to redistribute flux over a total distance along a rotational direction that is at least 90% of the pole pitch in a transverse flux machine and/or commutated flux machine. Stated another way, switch laminations 412B may be configured with a length that is at least 90% of the pole pitch, along the side of switch laminations 412B that abut side laminations 412A. In other exemplary embodiments, switch laminations 412B are configured to redistribute flux over a total distance along a rotational direction that is nearly 100% of the pole pitch (i.e., groups of switch laminations 412B nearly abut and/or touch one another, for example as illustrated with switch laminations 512B in FIGS. 5A-5D). Moreover, in various exemplary embodiments wherein switch laminations 412B are configured with more than one flux switch 415, switch laminations 412B may be configured to redistribute flux over a total distance along a rotational direction that exceeds 100% of the pole pitch (for example, as illustrated in FIG. 4G).

With momentary reference to FIG. 4D, in various exemplary embodiments switch laminations 412B are configured with a radial thickness $T_B$ at about the edge of flux switch 415 that is approximately equal to the radial thickness $T_A$ of the lower "L"-shaped portion of side laminations 412A. In certain exemplary embodiments, radial thickness $T_B$ and radial thickness $T_A$ differ from one another by less than 10%. In other exemplary embodiments, radial thickness $T_B$ and radial thickness $T_A$ differ from one another by less than 25%. However, radial thickness $T_B$ and radial thickness $T_A$ may have any suitable ratio to one another, as desired.

In various exemplary embodiments, the amount of material in switch laminations 412B below the interface with side laminations 412A (exclusive of the material forming flux switch 415) may be referred to as $M_B$ and is approximately equal to the amount of material in the lower "L"-shaped portion of side laminations 412A above the interface, referred to as $M_A$. In certain exemplary embodiments, $M_B$ and $M_A$ differ by less than 10%. In other exemplary embodiments, $M_B$ and $M_A$ differ from one another by less than 25%. However, $M_B$ and $M_A$ may have any suitable ratio to one another, as desired.

By selecting $T_B$, $T_A$, $M_B$, $M_A$, the material for switch laminations 412B, the material for side laminations 412A, and/or the like, switch laminations 412B and side laminations 412A may be configured to be capable of transferring approximately equal amounts of magnetic flux. By avoiding making either switch laminations 412B and/or side laminations 412A too large with respect to the other (i.e., by avoiding significant mismatch in flux transferring capability therebetween), additional space in a transverse flux machine and/or commutated flux machine may be provided for a conductive coil. The additional space for a coil can enable higher turn count, improved torque density, and/or lower coil losses.

Defining the L-shape, each group of laminated materials 412A (also referred to as the second group) has a first leg portion extending in the axial direction and adjacent the group of laminated materials 412B of the switch lamination (also referred to as the first group). A second leg portion extends in the radial direction away from the first leg portion. The coil is disposed between the second leg portions of the groups (i.e., second groups) of laminated materials of each pair of side lamination assemblies. This L-shape allows a larger coils to be used, and while directing the flux path out and around the coil. Each second leg portion has a free radial end opposite the first leg portion, thus defining the L-shape for the second group of laminated materials. The shape may also be C-shaped, with an additional portion acting as the back return or part thereof distal from the switch lamination assembly and its tooth.

When the number of pairs of switch lamination assemblies and number of pairs of side lamination assemblies are the same, and the wider portion of each first group of laminated materials (i.e., the laminae of the switch lamination assembly) and the first leg portion of each second group of laminated materials (i.e., the laminae of the side lamination assembly) have aligned surfaces facing each other of matching area dimension for conducting flux therebetween. In other words, the abutting and interfacing surfaces formed by the edges of the side laminations and the edges of the switch laminations are aligned with each other and have the same dimension in terms of area.

By utilizing a stator comprising one or more lamination assemblies 414 and/or the like, a transverse flux machine and/or commutated flux machine may be configured to achieve higher output torque, higher efficiency, lower temperature operation, reduced thermal losses, reduced eddy currents, and/or other similar operational improvements, as well as improved ease of manufacturability, improved reliability, reduced cost, and/or other manufacturing improvements. Additionally, use of one or more lamination assemblies 414 can enable part reuse across transverse flux machines and/or commutated flux machines of various diameters and/or other configurations. For example, identical lamination assemblies 414 may suitably be used in two different transverse flux machines having different diameters. Improved manufacturability, reduced part count, and reduced expense are thus achieved, compared to electrical machines wherein various parts are not interchangeable across electrical machines having differing diameters.

Lamination assemblies configured in accordance with principles of the present disclosure may desirably be utilized in various electrical machines, for example transverse flux machines and/or commutated flux machines. In various exemplary embodiments, with reference now to FIGS. 5A through 5F, an exemplary transverse flux machine 500 comprises a rotor 550, and a stator assembly 510 comprising a coil 520 and a plurality of lamination assemblies 514. Rotor 550 comprises at least one flux concentrator 552 and at least one magnet 554, each of which may comprise any suitable shape. In an exemplary embodiment, both flux concentrator 552 and magnet 554 are substantially rectangular in three dimensions. In other exemplary embodiments, flux concentrator 552 and/or magnet 554 are tapered, rounded, and/or otherwise at least partially non-rectangular. In various exemplary embodiments, flux concentrator 552 comprises layers of laminated material. In an exemplary embodiment, flux concentrator 552 comprises layers of non-oriented silicon steel. In other exemplary embodiments, flux concentrator 552 comprises one or more layers of oriented silicon steel, nickel alloys, cobalt alloys, and/or the like. Moreover, flux concentrator 552 may comprise alternating and/or interleaved layers of multiple materials.

In various exemplary embodiments, rotor 550 comprises a generally ring-shaped structure comprised of alternating magnets 554 and flux concentrators 552. In rotor 550, magnets 554 may be configured to be "extended" with respect to flux concentrators 552, for example in a direction away from coil 520. Moreover, rotor 550 may be configured to be at least partially "overhung" with respect to stator assembly 510, for example by rotor 550 overhanging a first side of stator assembly 510 and a second side of stator assembly 510 in a direction parallel to an air gap between rotor 550 and stator assembly 510. Additional details regarding extended magnets and/or overhung rotors are disclosed in U.S. patent application Ser. No. 12/772,958 filed on May 3, 2010, now U.S. Pat. No. 8,053,944 entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING", the contents of which are hereby incorporated by reference in their entirety When transverse flux machine 500 is operated as a motor, responsive to an input current in coil 520, rotor 550 is driven to rotate with respect to stator assembly 510. When transverse flux machine 500 is operated as a generator, responsive to a mechanical force causing rotor 550 to rotate, an AC output current is induced in coil 520.

In various exemplary embodiments, transverse flux machine 500 is configured with a voltage constant $K_E$ (also referred to as a back EMF constant) calculated as (volts phase-to-phase)/RPMs. In certain exemplary embodiments, transverse flux machine 500 having a diameter of about 120 mm is configured with a voltage constant $K_E$ of between about 0.06 and about 0.3. In an exemplary embodiment, transverse flux machine 500 having a diameter of about 58 mm is configured with a voltage constant $K_E$ of about 0.116. In certain exemplary embodiments, transverse flux machine 500 having a particular diameter is configured with a voltage constant $K_E$ of between about 0.03 and about 0.5. In contrast, various prior art electric motors having a similar diameter, for example electric motors configured as servo motors, are configured with a voltage constant $K_E$ of about 0.006 to about 0.04. Because transverse flux machine 500 is configured with a higher voltage constant $K_E$ compared to various prior motors, transverse flux machine 500 can offer improved performance. Moreover, voltage constants in electrical machines may vary based at least in part on the diameter and/or width of an electrical machine. As such, the examples provided above are illustrative and not exhaustive.

In various exemplary embodiments, transverse flux machine 500 is configured with between about 5 turns and about 500 turns in coil 520. In certain exemplary embodiments, single-phase transverse flux machine 500 having a diameter of about 58 mm may be configured to achieve an average continuous output torque of about 1.5 Newton-meters at a current level of about 250 amp-turns in coil 520. Yet further, in various exemplary embodiments, single-phase transverse flux machine 500 having a diameter of about 330 mm may be configured to achieve an average continuous output torque of about 133 Newton-meters at a current level of about 880 amp-turns in coil 520.

In various exemplary embodiments, transverse flux machine 500 is configured with a higher motor constant compared to various prior electric motors. In certain exemplary embodiments, when transverse flux machine 500 is configured with a single phase, an axial thickness of about 10 mm, and a diameter of about 58 mm, transverse flux machine 500 is configured with a motor constant $K_M$ of between about 0.12 Newton-meters per root watt (Nm/√W) and about 0.24 Newton-meters per root watt, where $K_M$ for the single phase is calculated as $((Nm(\text{single phase})/I_{RMS})/\sqrt{(R(\text{single phase}))}$. In an exemplary embodiment with these dimensions, transverse flux machine 500 is configured with a motor constant $K_M$ of about 0.182 Newton-meters per root watt.

In other exemplary embodiments where transverse flux machine 500 is configured with three phases (each phase having an axial thickness of about 10 mm, for a total axial thickness of about 30 mm), and a diameter of about 58 mm, transverse flux machine 500 is configured with a motor constant $K_M$ of between about 0.21 Newton-meters per root watt and about 0.41 Newton-meters per root watt, where the motor constant $K_M$ for the three phase device is calculated as the motor constant $K_M$ of a single phase given above, multiplied by the square root of 3 ($\sqrt{3}$). In an exemplary embodiment with these dimensions, transverse flux machine 500 is configured with a motor constant $K_M$ of about 0.311 Newton-meters per root watt.

In certain exemplary embodiments, when transverse flux machine 500 is configured with a single phase, an axial thickness of about 20 mm, and a diameter of about 120 mm, transverse flux machine 500 is configured with a motor constant $K_M$ of between about 1.3 Newton-meters per root watt and about 2.5 Newton-meters per root watt. In an exemplary embodiment with these dimensions, transverse flux machine 500 is configured with a motor constant $K_M$ of about 1.92 Newton-meters per root watt.

In other exemplary embodiments where transverse flux machine 500 is configured with three phases (each phase having an axial thickness of about 20 mm, for a total axial thickness of about 60 mm), and a diameter of about 120 mm, transverse flux machine 500 is configured with a motor constant $K_M$ of between about 2.25 Newton-meters per root watt and about 4.33 Newton-meters per root watt, where the motor constant $K_M$ for the three phase device is calculated as the motor constant $K_M$ of a single phase given above, multiplied by the square root of 3 ($\sqrt{3}$). In an exemplary embodiment with these dimensions, transverse flux machine 500 is configured with a motor constant $K_M$ of about 3.32 Newton-meters per root watt.

In yet other exemplary embodiments, when transverse flux machine 500 is configured with a single phase, an axial thickness of about 35 mm, and a diameter of about 330 mm, transverse flux machine 500 is configured with a motor constant $K_M$ of between about 13.5 Newton-meters per root watt and about 27 Newton-meters per root watt. In an exemplary embodiment with these dimensions, transverse flux machine 500 is configured with a motor constant $K_M$ of about 20.28 Newton-meters per root watt.

In still other exemplary embodiments where transverse flux machine 500 is configured with three phases (each phase having an axial thickness of about 35 mm, for a total axial thickness of about 105 mm), and a diameter of about 330 mm, transverse flux machine 500 is configured with a motor constant $K_M$ of between about 23.3 Newton-meters per root watt and about 46.7 Newton-meters per root watt, where the motor constant $K_M$ for the three phase device is calculated as the motor constant $K_M$ of a single phase given above, multiplied by the square root of 3 ($\sqrt{3}$). In an exemplary embodiment with these dimensions, transverse flux machine 500 is configured with a motor constant $K_M$ of about 35 Newton-meters per root watt.

Moreover, motor constants in electrical machines may vary based at least in part on the diameter of an electrical machine. As such, the examples provided above are illustrative and not exhaustive.

Because transverse flux machines and/or commutated flux machines configured in accordance with principles of the present disclosure, for example transverse flux machine 500, may be configured with a higher motor constant $K_M$ compared to various prior motors of similar diameters and number of phases, transverse flux machine 500 can offer improved performance. For example, transverse flux machine 500 can provide for extended operational times and/or vehicle ranges for a particular battery, use of less expensive battery chemistries having lower peak current draw capability (as transverse flux machine 500 may use a lower current to produce a particular output torque when compared to various prior motors of similar diameters and number of phases), reduced and/or eliminated cooling components due to reduced thermal losses, and/or the like.

With continued reference to FIGS. 5A through 5F, in accordance with various exemplary embodiments an electrical machine, for example transverse flux machine 500, generally comprises a rotor 550, a stator assembly 510, and a coil 520. Moreover, transverse flux machine 500 may comprise multiple stator assemblies 510. For example, transverse flux machine 500 may comprise a single rotor 550, one or more coils 520, and one or more stator assemblies 510. Moreover, via use of a plurality of stator assemblies 510, transverse flux machine 500 may be configured to produce polyphase output and/or operate responsive to polyphase input, for example when each stator assembly 510 corresponds to a different phase. In an exemplary embodiment, transverse flux machine 500 is configured with three stator assemblies 510 to form a three-phase transverse flux motor.

Stator assembly 510 may be configured with any suitable shapes, geometries, and/or dimensions configured to facilitate the flow of flux around coil 520. In one exemplary embodiment, with particular reference to FIG. 5E, stator assembly 510 comprises stator half 510-1 and stator half 510-2. Stator assembly 510 further comprises one or more back return laminations 518 coupling stator half 510-1 and stator half 510-2. In various exemplary embodiments, stator assembly 510 is configured to interface with rotor 550 in a face engaged configuration. In other exemplary embodiments, stator assembly 510 is configured to be cavity engaged with rotor 550.

Back return laminations 518 may comprise any suitable material for transferring magnetic flux. For example, back return laminations 518 may comprise silicon steel, M19 silicon steel, cold rolled grain oriented ("CRGO") silicon steel, nickel-based alloys (e.g., Carpenter brand high-permeability "49" alloy and/or the like), cobalt-based alloys (e.g., Carpenter brand "Hiperco" cobalt-based materials and/or the like), nickel-cobalt alloys, and/or the like. Additionally, back return laminations 518 may comprise Metglas® brand amorphous metal products produced by Hitachi Metals America, for example Metglas® brand magnetic alloy 2605SA1 and/or the like. Yet further, back return laminations 518 may comprise powdered metal and/or other soft magnetic composite materials. Moreover, back return laminations 518 may comprise any suitable material or materials having a desired electrical resistivity and/or magnetic permeability.

Back return laminations 518 may comprise tape wound planar material. Moreover, back return laminations 518 may be monolithic. In various exemplary embodiments wherein back return laminations are configured as a generally ring-shaped structure, back return laminations 518 are configured with at least one cut therethrough (and/or configured as multiple segments) in order to interrupt an electrical circuit.

In certain exemplary embodiments, stator assembly 510 at least partially encloses coil 520. Coil 520 may be any suitable height, width, and/or length to generate an electrical current responsive to flux switching in stator assembly 510 and/or rotor 550. Moreover, coil 520 may also be any suitable height, width, and/or length configured to receive a current in order to drive rotor 550 to rotate. In one exemplary embodiment, the interior surface of stator assembly 510 may be configured to generally mirror the shape and size of the exterior of coil 520. In another exemplary embodiment, stator assembly 510 may be configured to be slightly larger than coil 520. Moreover, in another exemplary embodiment, stator assembly 510 is "wrapped" around coil 520 so that the interior surface of stator assembly 510 is slightly larger than the height and width of coil 520 with a minimized gap between coil 520 and stator assembly 510.

Coil 520 may have any suitable length, diameter and/or other dimensions and/or geometries, as desired. In an exemplary embodiment, coil 520 is substantially circular about an axis of rotation of electrical machine 500. In an exemplary embodiment, coil 520 is coupled to an interior surface of stator assembly 510. Coil 520 may be desirably spaced away from and/or magnetically insulated from rotor 550 and/or stator assembly 510. For example, coil 520 may be desirably spaced away from and/or magnetically insulated from rotor 550 and/or stator assembly 510 in order to reduce eddy currents and/or other induced effects in coil 520 responsive to flux switching.

In various exemplary embodiments, coil 520 is electrically coupled to a current source. The current source may be any suitable current source, but in various exemplary embodiments, the current source is alternating current.

In an exemplary embodiment, coil 520 is constructed from copper. However, coil 520 may be made out of any suitable electrically conductive material and/or materials such as silver, gold, aluminum, superconducting materials, and/or the like. Furthermore, coil 520 may be one solid piece, or may be made by coiling, layering, stacking, and/or otherwise joining many smaller strands or wires of electrically conductive material and/or low-loss materials together. In various exemplary embodiments, coil 520 may be dual wound, edge-wound or flat-wound, as suitable, in order to reduce eddy currents and/or other losses. Additional details regarding exemplary coil materials, shapes, and configurations are disclosed in U.S. patent application Ser. No. 12/611,737 filed on Nov. 3, 2009, now U.S. Pat. No. 7,868,508 entitled "POLYPHASE TRANSVERSE AND/OR COMMUTATED FLUX SYSTEMS", and in U.S. Patent Application Publication No. 2012-119609 entitled "TRANSVERSE AND/OR COMMUTATED FLUX SYSTEM COIL CONCEPTS" having the same filing date as the present application, the contents of each of which are hereby incorporated by reference in their entirety.

Figure 5E:
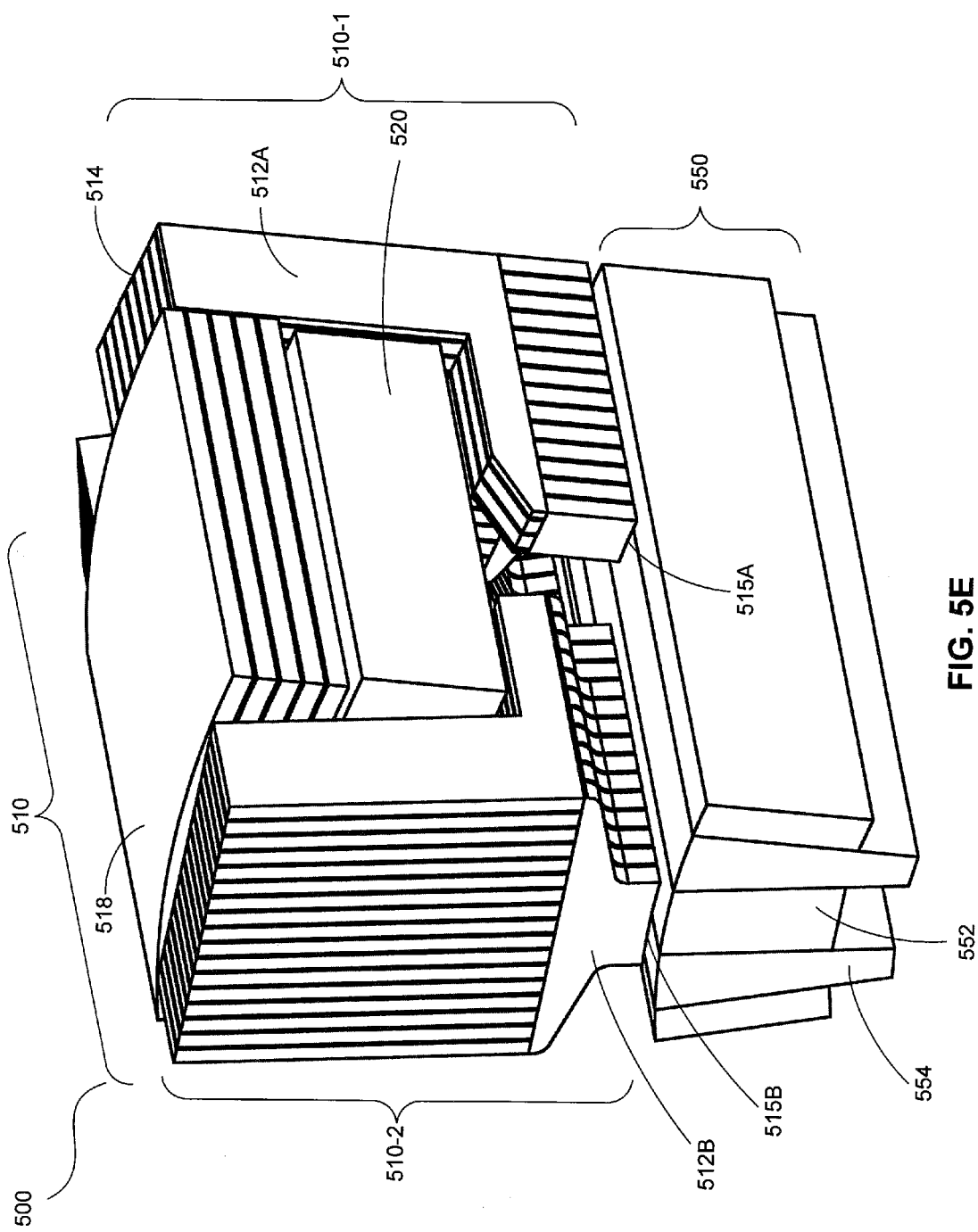
FIG. 5E illustrates a cutaway view of an exemplary transverse flux machine utilizing lamination assemblies in accordance with an exemplary embodiment.

In accordance with various exemplary embodiments, with reference to FIG. 5E, stator assembly 510 and rotor 550 interact to create a magnetic flux circuit. Flux transfer is achieved, for example, by the switching opposite pole flux concentrators 552 of rotor 550 approaching flux switches 515 in stator assembly 510 (for example, flux switches 515A and 515B). In an exemplary embodiment, opposite pole flux concentrators 552 are adjacent and interleaved in rotor 550. In various exemplary embodiments, a flux path is created through the switching elements of stator assembly 510 (for example, flux switches 515). In an exemplary embodiment, AC synchronous magnetic flux flow is generated in response to similar flux conduction and flux paths being created simultaneously in adjacent flux concentrators 552. In another exemplary embodiment, asynchronous flux flow is generated in response to flux conduction and flux paths being created in adjacent flux concentrators 552 at slightly delayed intervals.

In an exemplary embodiment wherein transverse flux machine 500 operates as a generator, as rotor 550 moves from a first position to a second position relative to stator assembly 510, flux flows in an opposite direction within stator assembly 510, as compared to the first (prior) position of rotor 550. The change in flux direction in stator assembly 510 causes flux to be conducted around coil 520 in alternating directions. The alternating flux direction results in generation of alternating electrical output in coil 520.

In various exemplary embodiments, rotor 550 is driven to rotate. Rotor 550 movement may be controlled by a control system which controls, for example, rotor RPM, axial positioning, acceleration, rotational direction, deceleration, starting, and/or stopping. In an exemplary embodiment, rotor 550 is driven in either rotational direction (clockwise or counter-clockwise), for example depending on a preference of an operator and/or according to programming. The control system may further comprise programming memory, and a user interface, which may include graphics. The control system may include ports for coupling to additional electrical devices and/or may be coupled to additional electrical devices wirelessly. The control system may further comprise sensors for monitoring and measuring desired values of the system. These values may include one or more of phase matching, phase propagation, input waveforms, output waveforms, flux density, voltage constant, torque constant, webers of flux switched, RPM, amperes of current, wattage, system malfunctions, and/or the like. A power source may be coupled to the control system. This power source may be any suitable power source for operation of the control system, such as alternating current, direct current, capacitive charge, and/or inductance. In an exemplary embodiment, the power source is a DC battery.

Portions of rotor 550 and/or stator assembly 510 may comprise any suitable flux conducting material and/or materials, such as steel, silicon steel, amorphous metals, metallic glass alloys, powdered metals such as powdered iron, and/or the like. In an exemplary embodiment, portions of transverse flux machine 500, such as portions of stator assembly 510 and/or rotor 550, may be comprised of Metglas® brand amorphous metal products produced by Hitachi Metals America, for example Metglas® brand magnetic alloy 2605SA1 and/or the like. Moreover, portions of stator assembly 510 and/or rotor 550 may comprise nickel-iron alloys, for example "Carpenter 49" material manufactured by Carpenter Technology Corporation, and/or the like. Additionally, portions of stator assembly 510 and/or rotor 550 may comprise cobalt-iron alloys, for example "Hiperco 50" material manufactured by Carpenter Technology Corporation, and/or the like. In an exemplary embodiment, switch laminations 512B comprise "Hiperco 50" material, side laminations 510A comprise Carpenter 49 material, and back return laminations 518 comprise Metglas® brand magnetic alloy 2605SA1.

In an exemplary embodiment, portions of transverse flux machine 500, such as portions of magnets 554, may comprise permanent magnets, for example rare earth magnets. Magnetic material may comprise any suitable material, for example neodymium-iron-boron (NIB) material. In an exemplary embodiment, the rare earth permanent magnets have a suitable magnetic field, for example a field in the range of about 0.5 Tesla to about 1.5 Tesla.

In other exemplary embodiments, magnets 554 may comprise ceramic magnets, for example hard ferrites comprising iron and barium or strontium oxides. In an exemplary embodiment, magnets 554 may comprise FB9N-class material (SrO6Fe2O3) manufactured by TDK Corporation. In an exemplary embodiment, the ceramic magnets have a suitable magnetic field, for example a field in the range of about 0.1 Tesla to about 0.35 Tesla. In other exemplary embodiments, magnets 554 comprise inducted magnets and/or electromagnets. The inducted magnets and/or electromagnets may be made out of iron, iron alloys, metallic alloys, and/or the like, as well as other suitable materials as is known.

In various exemplary embodiments, flux switches 515 are configured to reduce flux leakage in transverse flux machine 500. For example, in an exemplary embodiment flux switches 515A are configured to maintain a desired separation distance between flux switches 515A in stator half 510-1 and flux switches 515B in stator half 510-2.

In various exemplary embodiments, the size of the air gap between stator assembly 510 and rotor 550 is substantially constant across flux concentrators 552 on rotor 550. In other exemplary embodiments, the size of the air gap between stator assembly 510 and rotor 550 may be variable across flux concentrators 552 on rotor 550. In various exemplary embodiments, the size of the air gap between stator assembly 510 and rotor 550 is between about 0.003 inches (0.0762 mm) and about 0.080 inches (2.032 mm). Moreover the size of the air gap between stator assembly 510 and rotor 550 may be any suitable size, and may be selected to achieve a desired level of performance in transverse flux machine 500.

Figure 5F:
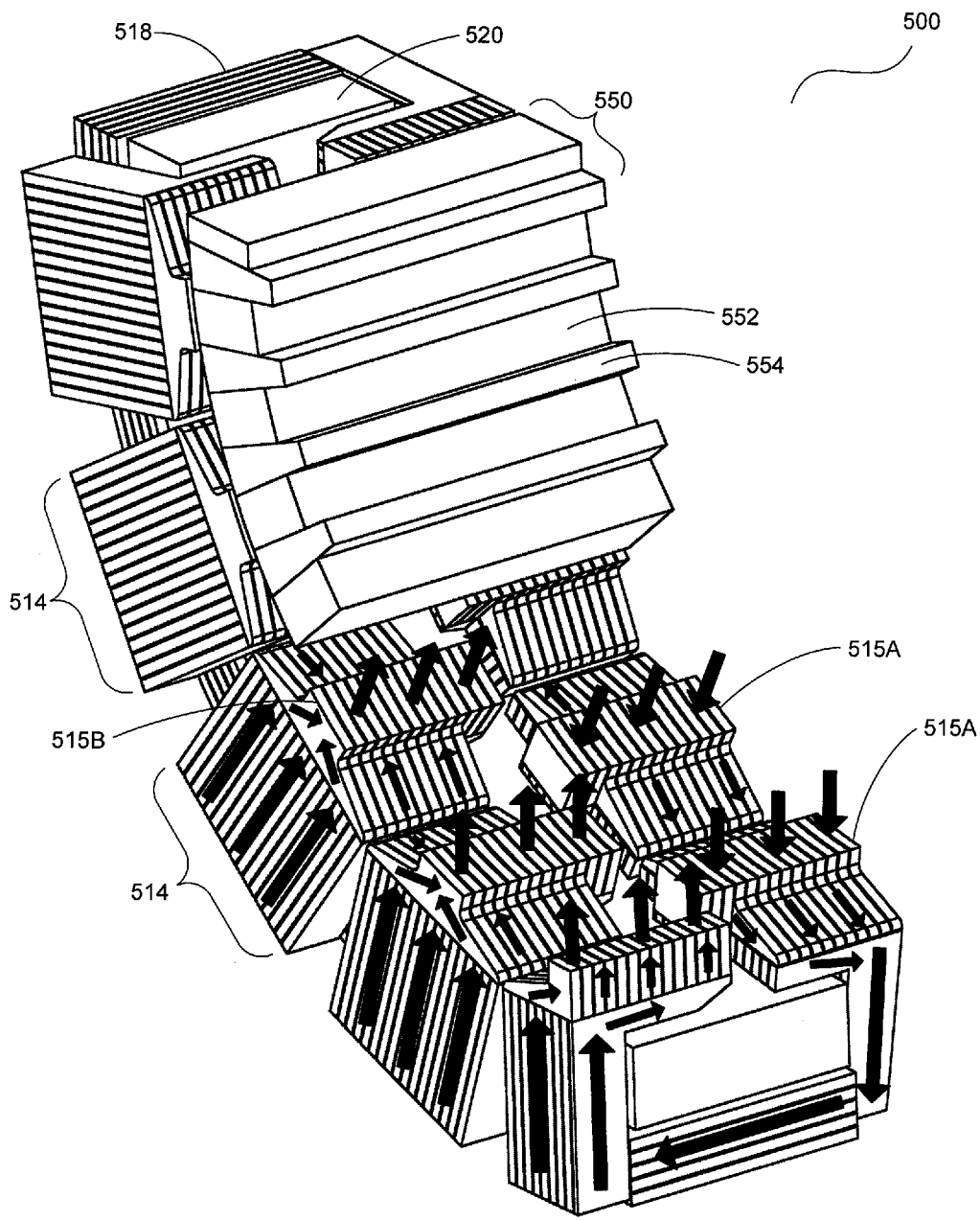
FIG. 5F illustrates flux flow in an exemplary transverse flux machine utilizing lamination assemblies in accordance with an exemplary embodiment.

With reference now to FIG. 5F, exemplary magnetic flux flow in transverse flux machine 500 at a particular location of rotor 550 is illustrated. Flux from rotor 550 enters flux switches 515A on a first side of stator assembly 510, is conducted around coil 520 via lamination assemblies 514 and back return laminations 518, and returns to rotor 550 via flux switches 515B on a second side of stator assembly 510. It will be appreciated that the arrows representing flux flow in FIG. 5F are not intended to be precise or exhaustive, and many additional flux paths may exist in a practical transverse flux machine and/or commutated flux machine. It will also be appreciated that as rotor 550 rotates, the direction of flux flow illustrated in FIG. 5F will reverse, and return again to the illustrated direction in an alternating matter.

In various exemplary embodiments, a transverse flux machine and/or commutated flux machine, for example transverse flux machine 500, may be configured with various sensors, including torque sensors, strain gauges, Hall effect sensors, temperature sensors, and/or the like, for example in order to facilitate operation and/or characterization and assessment of the transverse flux machine. Additional details regarding adjustable Hall effect sensor systems are disclosed in U.S. Provisional Patent Application No. 61/453,006 filed on Mar. 15, 2011, to which U.S. Patent Publication No. 2012-0235668 claims priority, and each entitled "ADJUSTABLE HALL EFFECT SENSOR SYSTEM", the contents of each of which are hereby incorporated by reference in their entirety.

Additional details regarding utilization of transverse flux machines and/or commutated flux machines in electric bicycles and other light electric vehicles are disclosed in U.S. patent application Ser. No. 12/772,959 filed on May 3, 2010, now U.S. Patent Application Publication No. 2011/1069381 entitled "TRANSVERSE AND/OR COMMUTATED FLUX SYSTEMS FOR ELECTRIC BICYCLES", the contents of which are hereby incorporated by reference in their entirety.

Figure 6A:
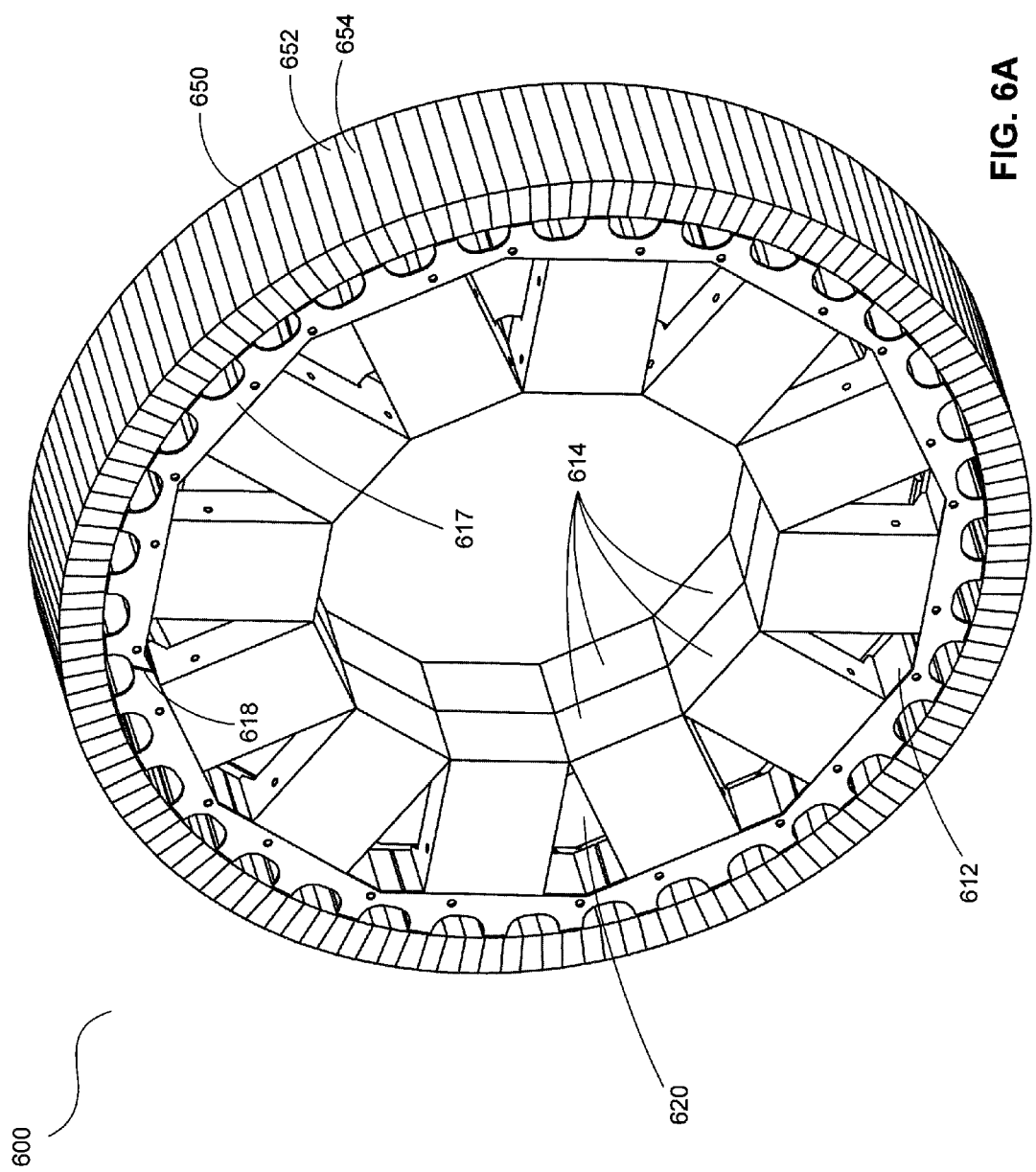
FIG. 6A illustrates an exemplary transverse flux machine utilizing lamination assemblies and a retaining ring in accordance with an exemplary embodiment.
Figure 6B:
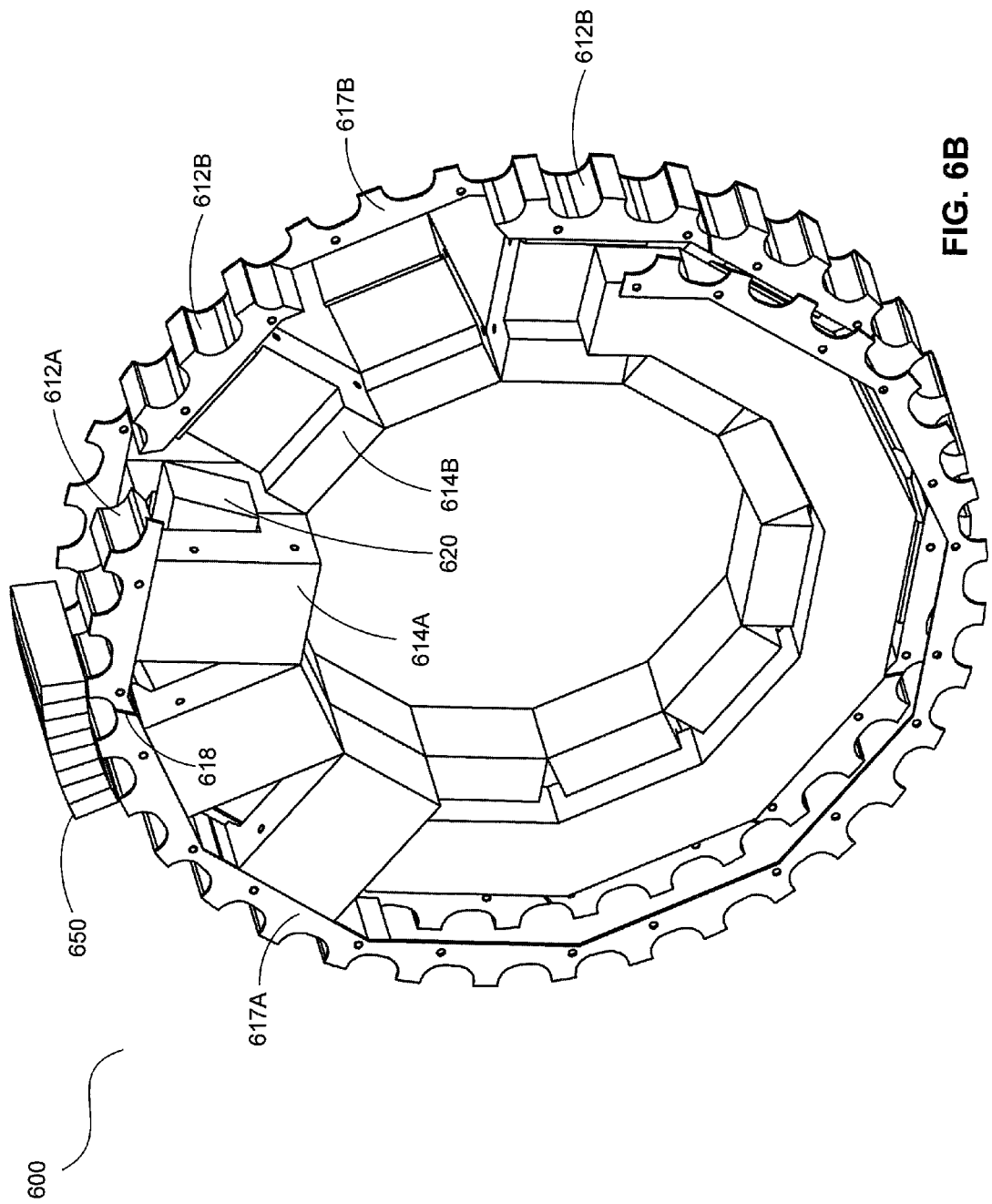
FIG. 6B illustrates a partial cut-away view of an exemplary transverse flux machine utilizing lamination assemblies and a retaining ring in accordance with an exemplary embodiment.
Figure 6C:
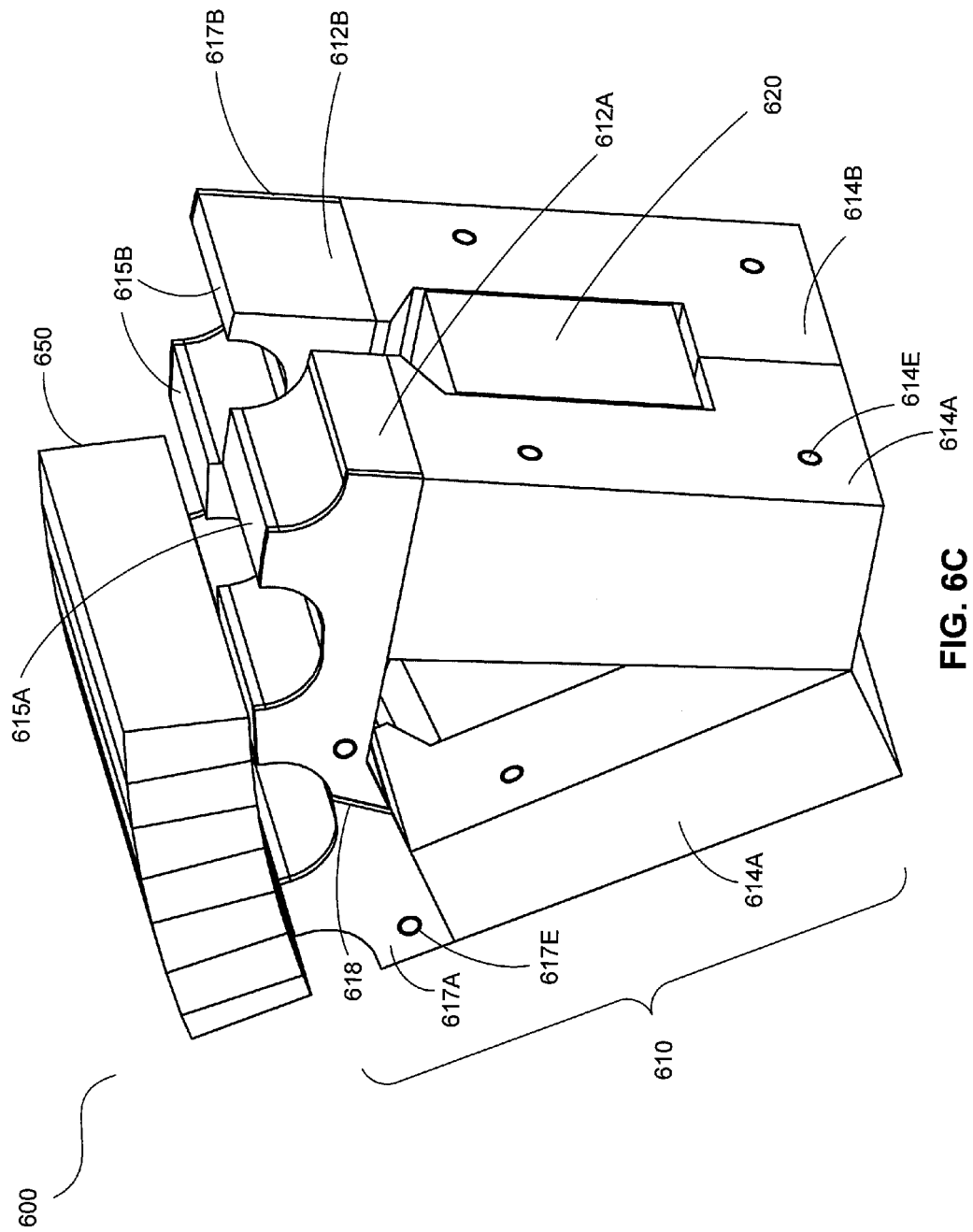
FIG. 6C illustrates a sectioned view of an exemplary transverse flux machine utilizing lamination assemblies and a retaining ring in accordance with an exemplary embodiment.

Turning now to FIGS. 6A through 6C, in various exemplary embodiments a transverse flux machine 600 generally comprises a rotor 650, a stator assembly 610, and a coil 620. Moreover, transverse flux machine 600 may comprise multiple stator assemblies 610. For example, transverse flux machine 600 may comprise a single rotor 650, one or more coils 620, and one or more stator assemblies 610. Moreover, via use of a plurality of stator assemblies 610, transverse flux machine 600 may be configured to produce polyphase output and/or operate responsive to polyphase input, for example when each stator assembly 610 corresponds to a different phase. In an exemplary embodiment, transverse flux machine 600 is configured with three stator assemblies 610 to form a three-phase transverse flux motor.

In an exemplary embodiment, stator assembly 610 comprises one or more groups of side laminations 614 (for example, side lamination stacks 614A and side lamination stacks 614B), and one or more groups of switch laminations configured with flux switches (for example, switch lamination stacks 612A and switch lamination stacks 612B having flux switches 615A and 615B, respectively). In stator assembly 610, groups of laminated materials may be held together by dimple-like embossings or "interlinks" as is known in the art, for example interlinks 614E, 617E, and/or the like.

In various exemplary embodiments, stator assembly 610 is configured with one or more guide rings, for example guide rings 617A and 617B. Guide rings 617A and 617B may be utilized to collate, position, guide, align, and/or retain portions of stator assembly 610 in a desired orientation and/or configuration, for example switch lamination stacks 612A and 612B. Guide rings 617A and 617B may be configured with a cut 618 and/or may be segmented in order to interrupt an electrical circuit therein. Additionally, guide rings 617A and 617B may be configured to switch magnetic flux, and may be configured with flux switching areas configured to align with and/or form part of flux switches 615A and 615B.

Figure 7A:
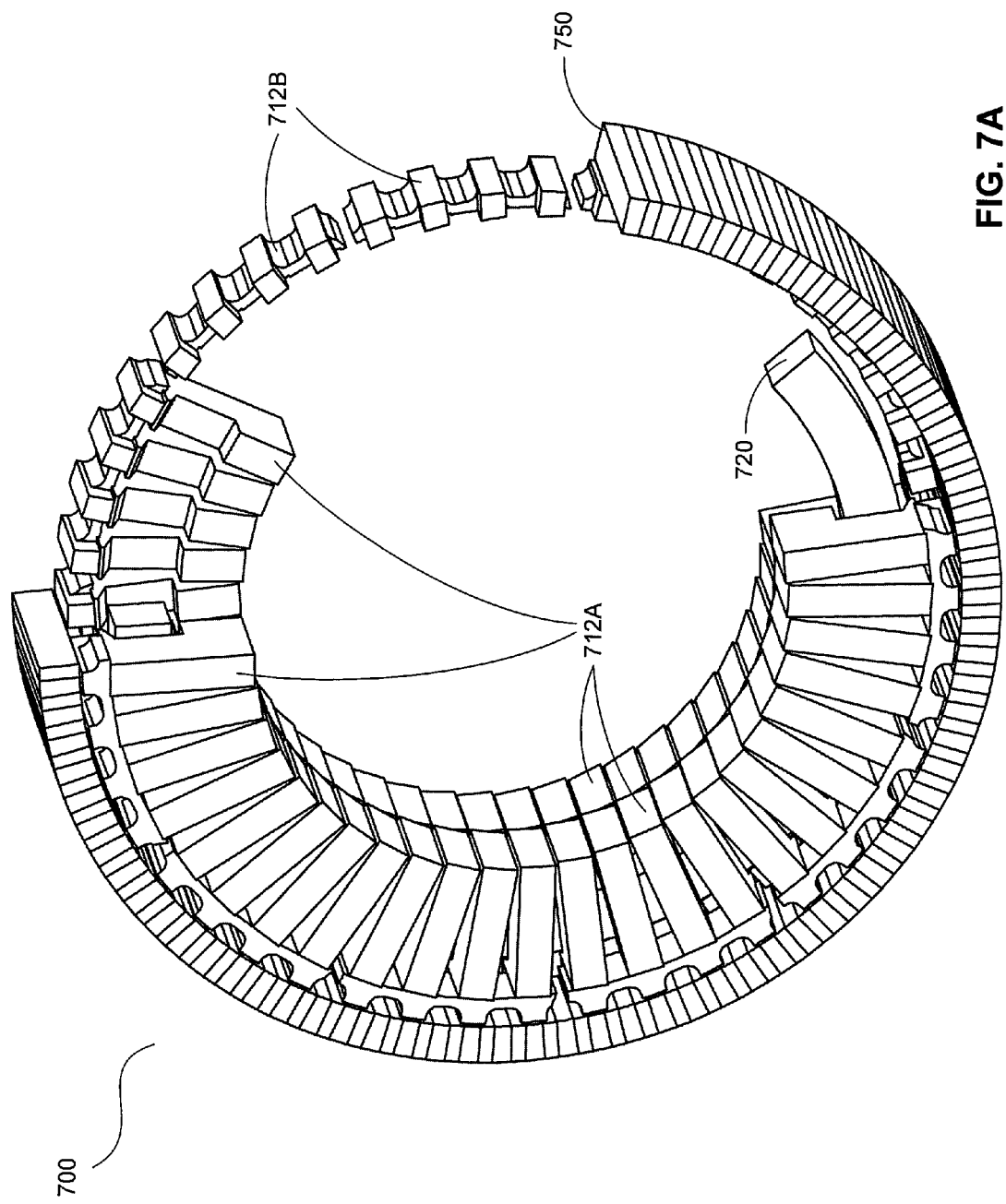
FIG. 7A illustrates a partial cut-away view of an exemplary transverse flux machine utilizing lamination assemblies in accordance with an exemplary embodiment.
Figure 7B:
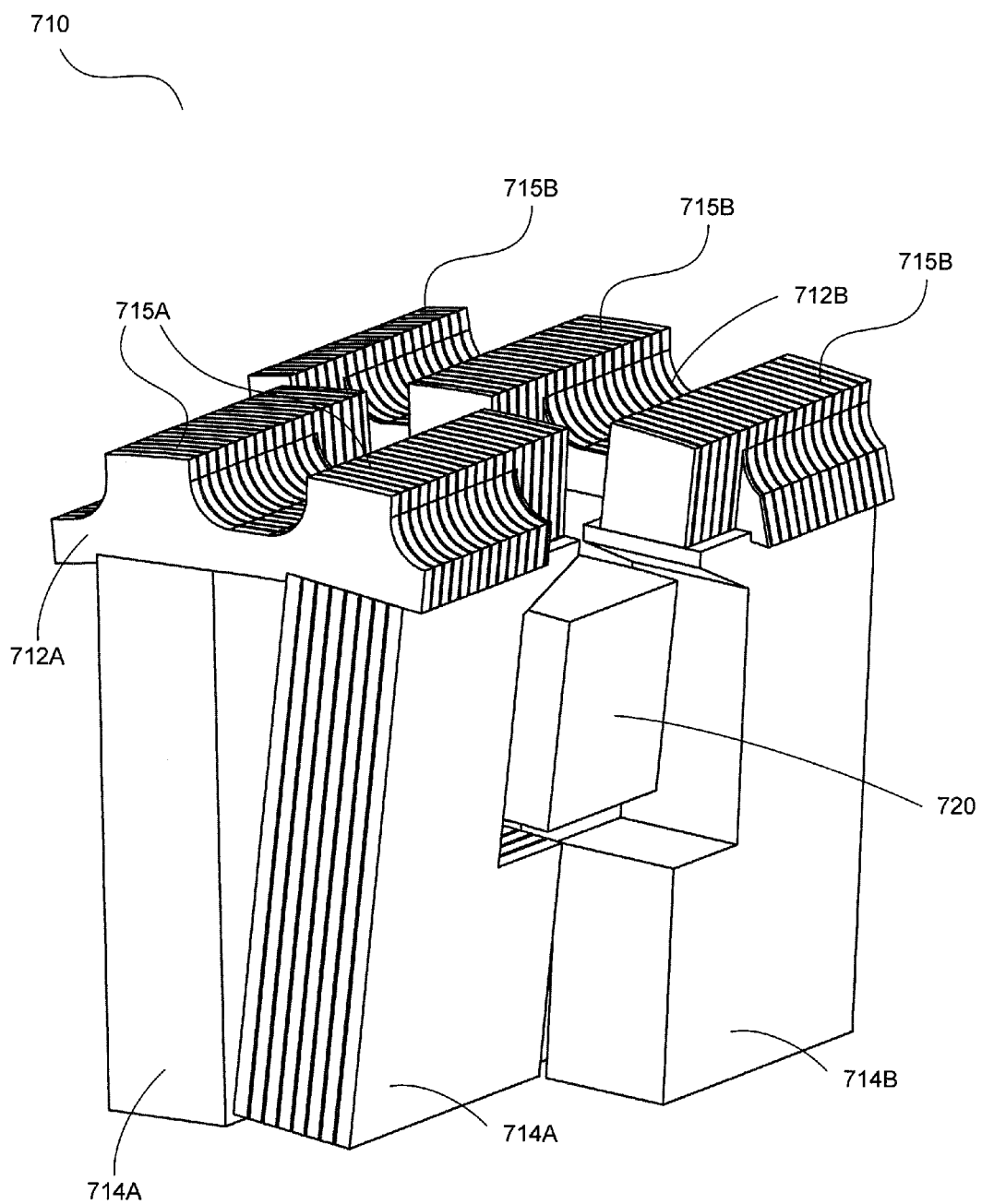
FIG. 7B illustrates a sectioned view of an exemplary transverse flux machine utilizing lamination assemblies in accordance with an exemplary embodiment.

With reference now to FIGS. 7A and 7B, in various exemplary embodiments a transverse flux machine, for example transverse flux machine 700, is configured with one or more groups of side laminations 712A which also provide a back return path for magnetic flux. In these exemplary embodiments, groups of side laminations 712A may be configured to abut and/or closely approach one another, for example on the side of coil 720 generally opposite flux switches 715, providing a back return path for magnetic flux.

In various exemplary embodiments, a group of switch laminations 712B is configured with one or more flux switches 715B. In an exemplary embodiment, one group of switch laminations 712B is configured with four flux switches 715B. Moreover, one group of switch laminations 712B may be configured with additional and/or fewer flux switches 715B, as suitable.

A group of switch laminations 712B may be coupled to one or more side laminations 712A. In various exemplary embodiments, one group of switch laminations 712B is coupled to four groups of side laminations 712A. Moreover, one group of switch laminations 712B may be coupled to additional and/or fewer groups of side laminations 712A, as suitable. In certain exemplary embodiments, one group of switch laminations 712B is coupled to a number of groups of side laminations 712A corresponding to the number of flux switches 715 on the one group of switch laminations 712B. Stated another way, transverse flux machine 700 may be configured with a 1:1 relationship between flux switches 715 and groups of side laminations 712A. In other exemplary embodiments, transverse flux machine 700 is configured with more flux switches 715 than groups of side laminations 712A. In yet other exemplary embodiments, transverse flux machine 700 is configured with fewer flux switches 715 than groups of side laminations 712A.

In various exemplary embodiments, groups of side laminations 712A are configured to closely approach and/or abut one another, for example abutting one another generally on the side of coil 720 opposite flux switches 715, in order to provide a magnetic circuit around coil 720. In this manner, a separate component providing a back return path (for example, back return laminations 518) can be eliminated.

As illustrated in FIGS. 7A and 7B, transverse flux machine 700 is configured as a single-phase device; however, it will be appreciated that a polyphase device may be constructed in accordance with similar principles, for example by placing three stator assemblies 710 side-by-side in an axial direction.

Figure 8C:
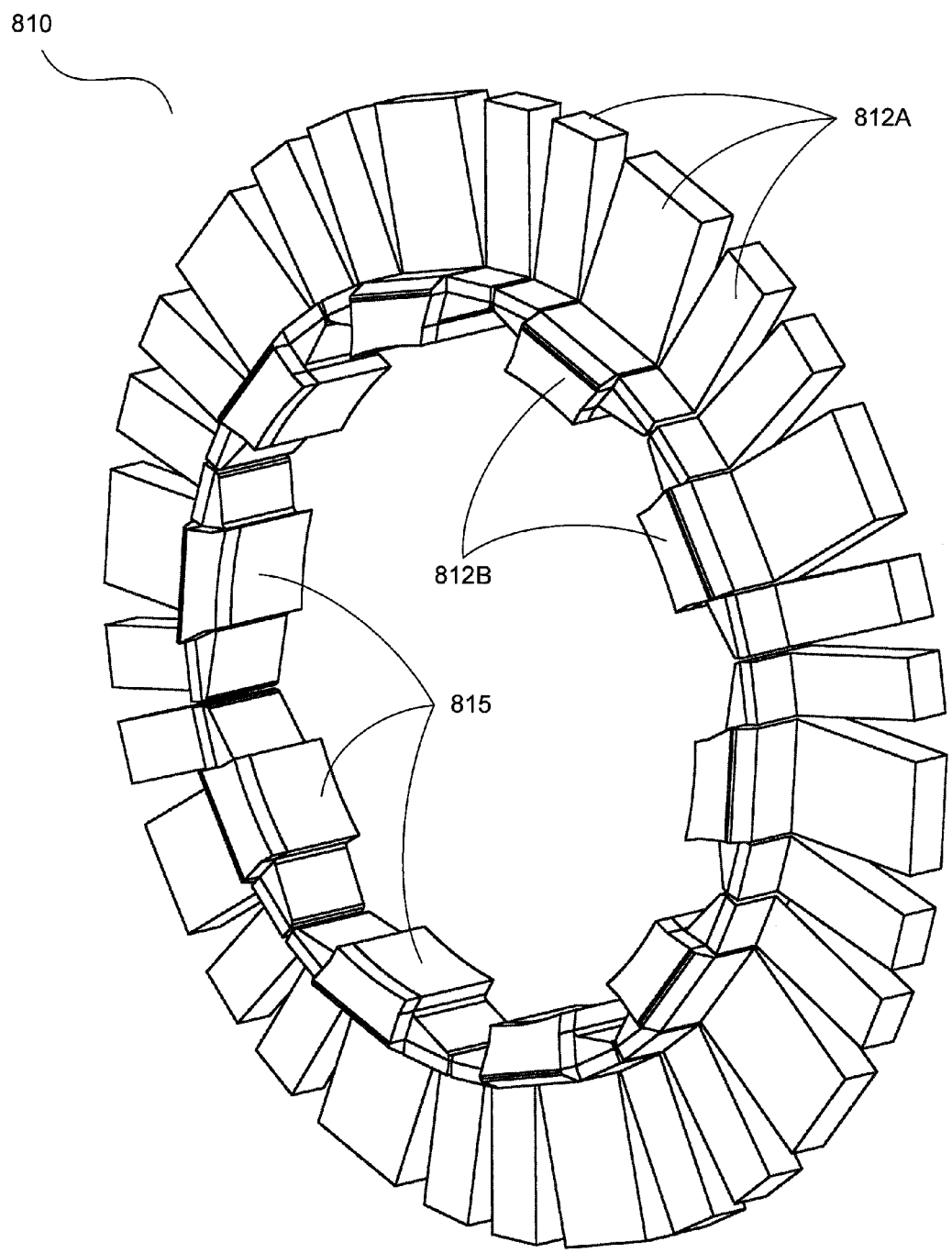
FIG. 8C illustrates a plurality of exemplary skewed lamination assemblies forming a stator half in accordance with an exemplary embodiment.

Turning now to FIGS. 8A and 8B, in various exemplary embodiments a lamination assembly, for example lamination assembly 814, may be configured with a single group of switch laminations 812A, and multiple groups of side laminations 812B (for example, groups of side laminations 812B-1, 812B-2, and 812B-3). By utilizing multiple groups of side laminations 812B, manufacture of lamination assembly 814 may be made easier. Additionally, by using multiple groups of side laminations 812B, the angle between successive groups of side laminations 812B can be reduced, reducing the area of the generally triangle-shaped "gaps" 812G where effectively no flux is conducted in a radial direction.

Moreover, when oriented materials are utilized in side laminations 812B, utilizing multiple groups of side laminations 812B in lamination assembly 814 allows the orientation in any particular group of side laminations 812B to be more closely aligned with an ideal direction. This is because the group of side laminations 812B extends a shorter distance in a rotational direction (and thus, magnetic flux flowing in a radial direction in side laminations 812B more closely follows the orientation of the material).

Moreover, with continued reference to FIGS. 8A and 8B, in various exemplary embodiments a lamination assembly, for example lamination assembly 814, may be configured with some degree of "skew" in order to modify, control, and/or otherwise configure the timing of flux switching in an electrical machine. For example, lamination assembly 814 may be configured with a skewed location of flux switch 815 relative to the body of lamination assembly 814, in order to "retard" and/or "advance" the timing of flux switching in a particular flux switch 815.

Figure 5G:
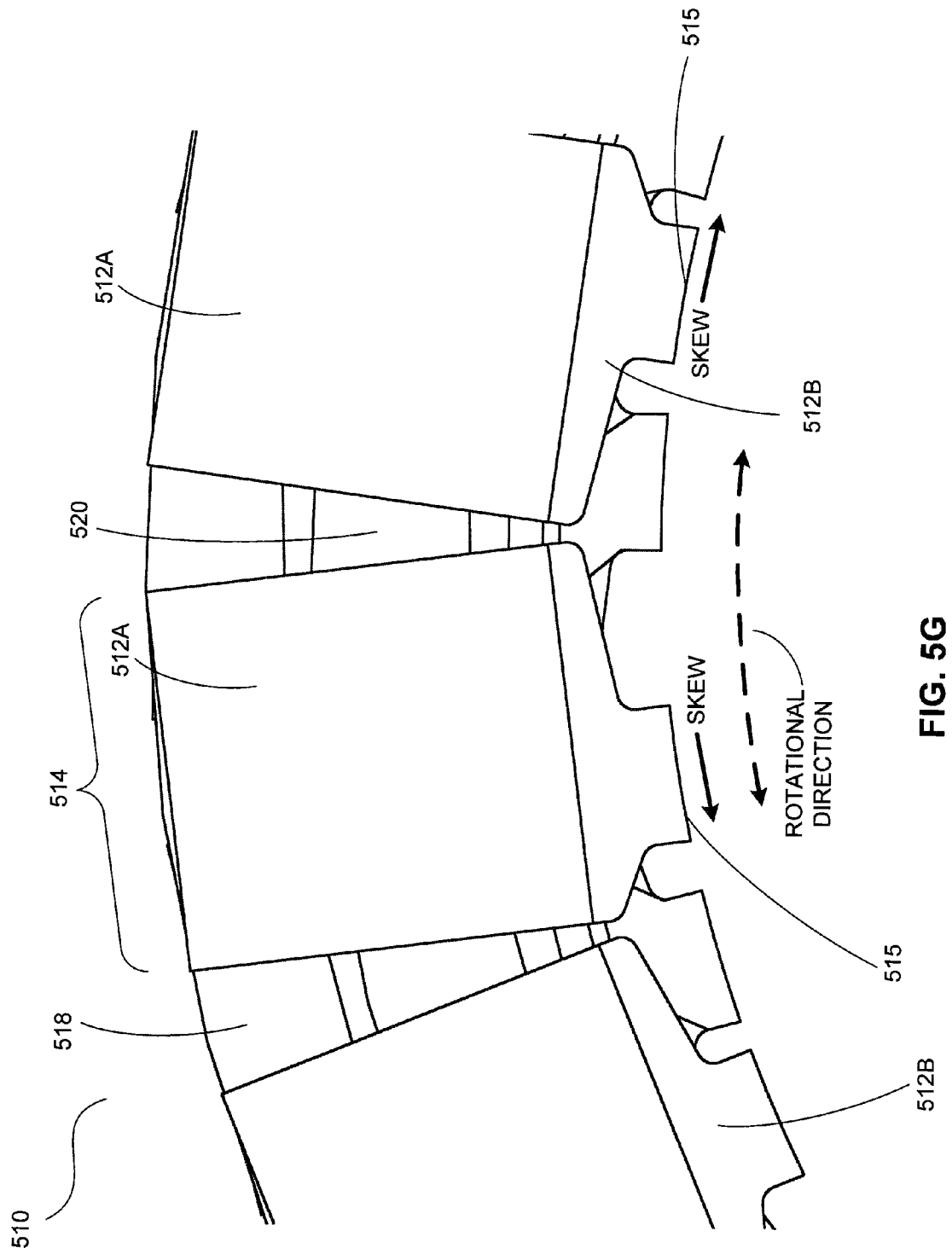
FIGS. 5G and 5H illustrate skewed flux switches in an exemplary transverse flux machine utilizing lamination assemblies in accordance with an exemplary embodiment.
Figure 5H:
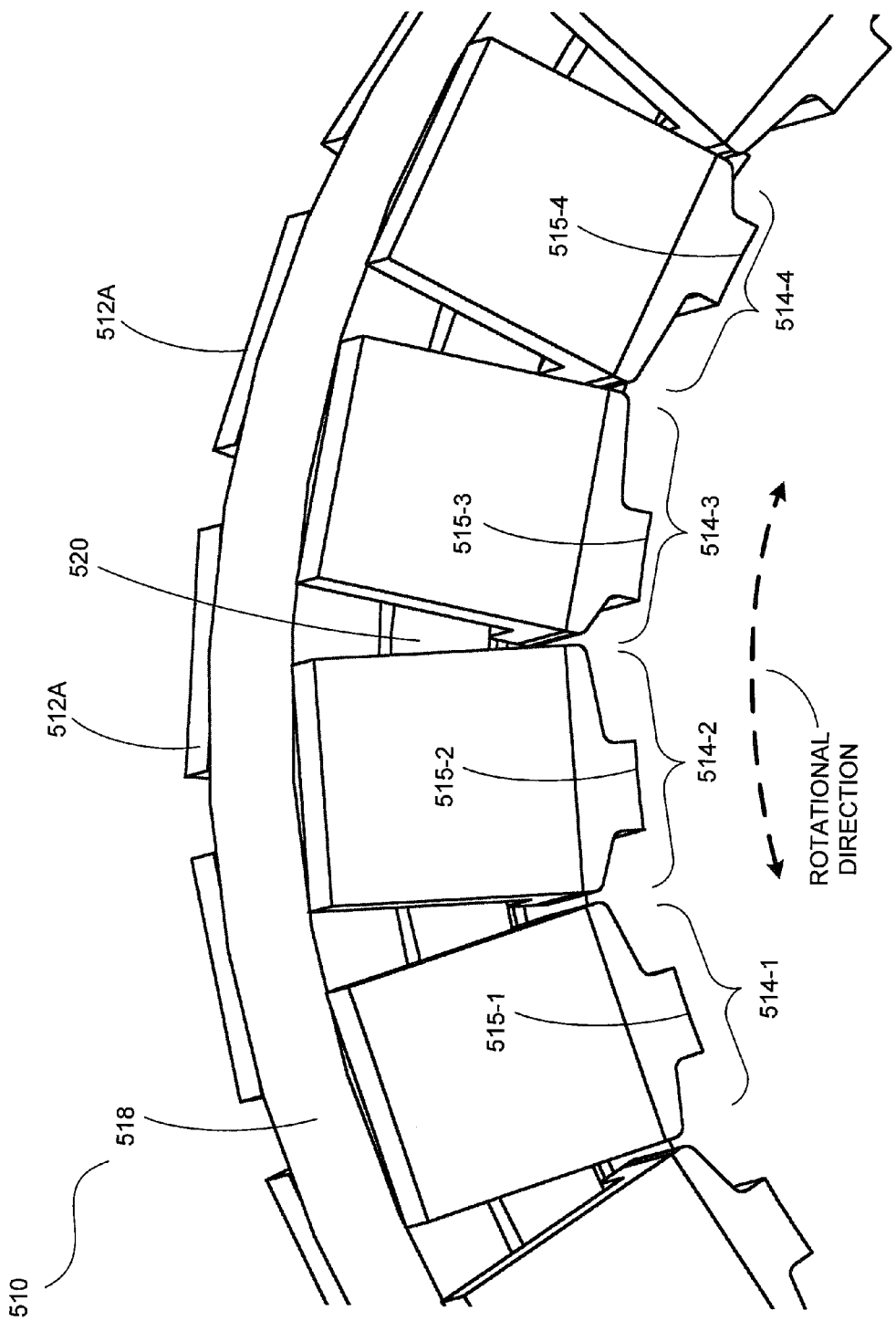

With particular reference now to FIG. 8B, in various exemplary embodiments a particular lamination assembly 814 is configured with a group of switch laminations 812A forming a "skewed" flux switch 815. Stated another way, flux switch 815 is not located equidistant from the edges of lamination stack 814 in the rotational direction; rather, flux switch 815 is now closer to one side of lamination stack 814 than the other. Stated yet another way, the base of the "anvil"-like shape of switch laminations 812A is skewed in the rotational direction. Considered yet another way, lamination stack 814 is not symmetric in the rotational direction. For comparison purposes, flux switch 415 as illustrated in FIG. 4B is unskewed; flux switches 515 as illustrated in FIGS. 5G and 5H are skewed. It will be appreciated that a flux switch 815 and/or multiple flux switches 815 may be skewed, regardless of their position on lamination stack 814.

In various exemplary embodiments, flux switch 815 is skewed in a rotational direction a distance equivalent to between about 0 percent of a voltage phase in transverse flux machine 800 and about one-sixth (16.66 percent) of the voltage phase. Stated differently, flux switch 815 may be skewed so as to be effectively "advanced" an amount up to about one-sixth of a voltage phase; alternatively, flux switch 815 may be skewed so as to be effectively "retarded" an amount up to about one-sixth of a voltage phase. In other words, flux switch 815 may be skewed over +/−one-sixth of a voltage phase (for an overall skew range of flux switch 815 of one-third of a voltage phase). For example, in an exemplary embodiment wherein the poles in transverse flux machine 800 are separated by about 9 degrees, flux switch 815 may be skewed up to about +/−1.5 degrees in a rotational direction.

In various exemplary embodiments, flux switches 815 in transverse flux machine 800 may be configured with varying widths in a rotational direction. For example, a particular flux switch 815 may extend about two degrees around a rotational axis of transverse flux machine 800. Another flux switch 815 may extend about 0.8 degrees around a rotational axis of transverse flux machine 800. Flux switches 815 may be configured with any suitable widths, as desired. Moreover, it will be appreciated that combinations of skew of flux switches 815 and/or varied widths of flux switches 815 may be utilized to achieve a desired set of performance characteristics for a transverse flux machine and/or commutated flux machine.

In various exemplary embodiments, lamination assemblies 814 utilized in a particular transverse flux machine and/or commutated flux machine may have different amounts of skew. For example, a first lamination assembly 814 may be configured with a flux switch 815 having zero skew, a second lamination assembly 814 may be configured with a flux switch 815 having a skew amount of plus 1/24 (+4.16 percent) of a voltage phase, a third lamination assembly 814 may be configured with a flux switch 815 having a skew amount of minus 1/24 (−4.16 percent) of a voltage phase, a fourth lamination assembly 814 may be configured with a flux switch 815 having a skew amount of plus one-twelfth (+8.33 percent) of a voltage phase, a fifth lamination assembly 814 may be configured with a flux switch 815 having a skew amount of minus one-twelfth (−8.33 percent) of a voltage phase, and so forth. In this manner, timing of flux switching in a transverse flux machine and/or commutated flux machine may be configured and/or controlled, as desired. Moreover, in this manner, a sixth-phase offset may be implemented by approximately equally distributing cogging torque waveforms in transverse flux machine 800 over a phase shift from zero to one-sixth of a voltage phase, for example as disclosed in U.S. patent application Ser. No. 12/772,962 filed on May 3, 2010, now U.S. Patent Application Publication 2011/0169366 entitled "TRANSVERSE AND/OR COMMUTATED SYSTEMS HAVING PHASE OFFSET", the contents of which are herein incorporated by reference.

Moreover, in various exemplary embodiments, with momentary additional reference to FIGS. 5G and 5H, a transverse flux machine and/or commutated flux machine (for example, transverse flux machine 500 and/or transverse flux machine 800) may comprise multiple lamination assemblies, some of which are configured with a flux switch or flux switches having similar amounts of skew, and others of which are configured with a flux switch or flux switches having differing amounts of skew. In this manner, the timing of flux switching in each flux switch may be more precisely configured and/or controlled. For example, lamination assemblies 514-1, 514-2, 514-3, and 514-4 illustrated in FIG. 5H are each configured with a respective flux switch 515-1, 515-2, 515-3, and 515-4; each flux switch may be configured with a different amount and/or direction of skew than the other flux switches.

With returning reference now to FIGS. 8C-8F, in various exemplary embodiments transverse flux machine 800 comprises a stator assembly, for example stator assembly 810. Stator assembly 810 may be configured with a single phase; alternatively, stator assembly 810 is configured with multiple phases and transverse flux machine 800 may therefore be a polyphase device. In an exemplary embodiment, stator assembly 810 comprises multiple stator portions—for example stator portions 810A, 810B, and 810C. In various exemplary embodiments, polyphase stator assembly 810 may comprise various electrical and/or magnetic components. For example, polyphase stator assembly 810 may comprise three conductive coils 820A, 820B, and 820C, disposed generally within stator portions 810A, 810B, and 810C, respectively. Back return laminations 818A, 818B, and 818C provide flux paths at least partially around coils 820A, 820B, and 820C, respectively.

In certain exemplary embodiments, polyphase stator assembly 810 is configured with flux switches 815 (for example, flux switches 815A-1, 815B-1, 815C-1, and/or the like) disposed generally on the interior of polyphase stator assembly 810 (for example, as illustrated in FIGS. 8C through 8F). In these exemplary embodiments, polyphase stator assembly 810 is configured for use with an inner rotor. In other exemplary embodiments, polyphase stator assembly 810 is configured with flux switches 815 disposed generally on the exterior of polyphase stator assembly 810. In these exemplary embodiments, polyphase stator assembly 810 is configured for use with an outer rotor.

In various exemplary embodiments, responsive to rotation of a rotor (not shown in the figures), flux is switched around coils 820A, 820B, and 820C, creating an output current in coils 820A, 820B, and 820C. Alternatively, responsive to an input current in one or more of coils 820A, 820B, or 820C, a rotor is driven to rotate.

Figure 8D:
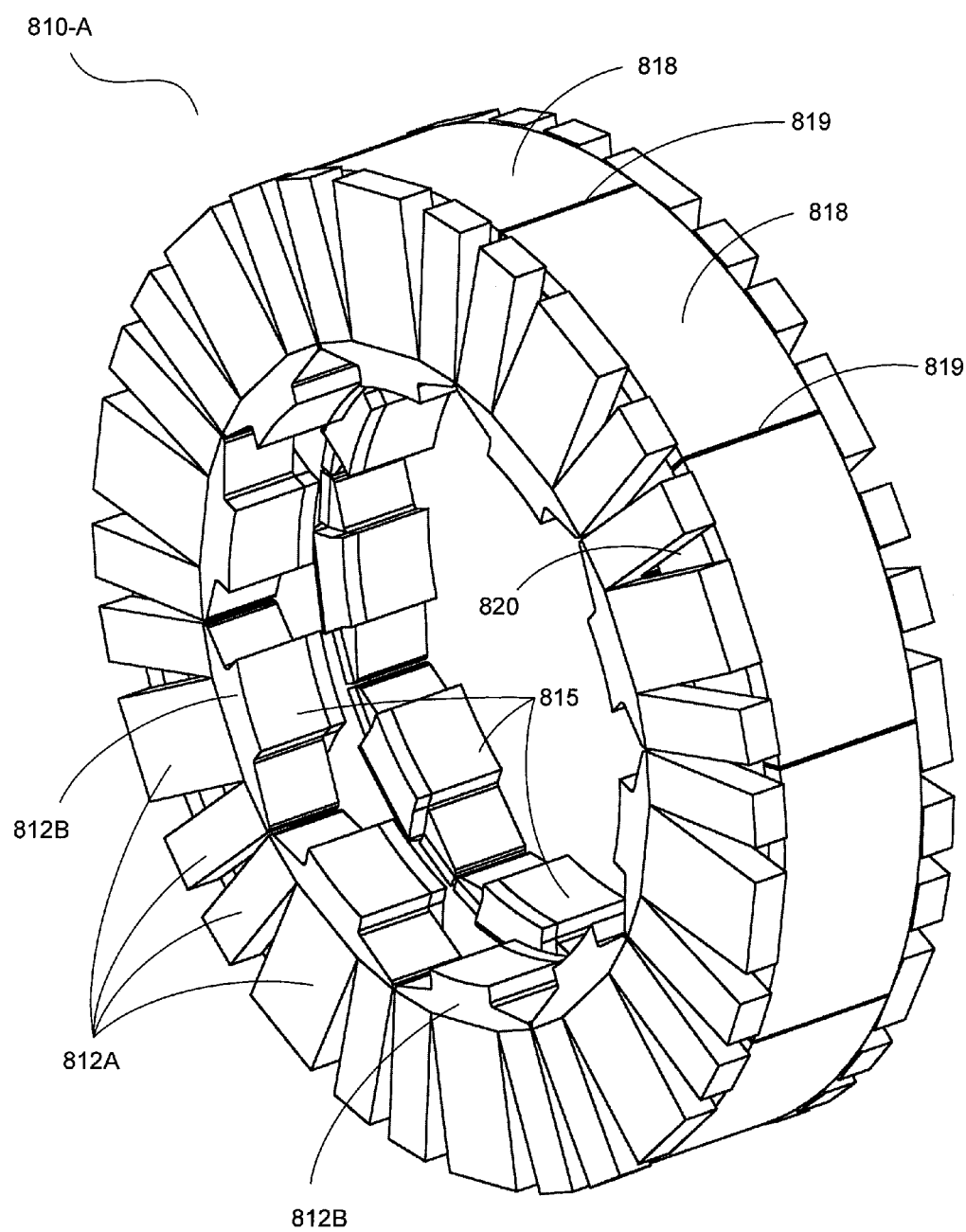
FIG. 8D illustrates a stator for a transverse flux machine utilizing a plurality of exemplary skewed lamination assemblies in accordance with an exemplary embodiment.
Figure 8E:
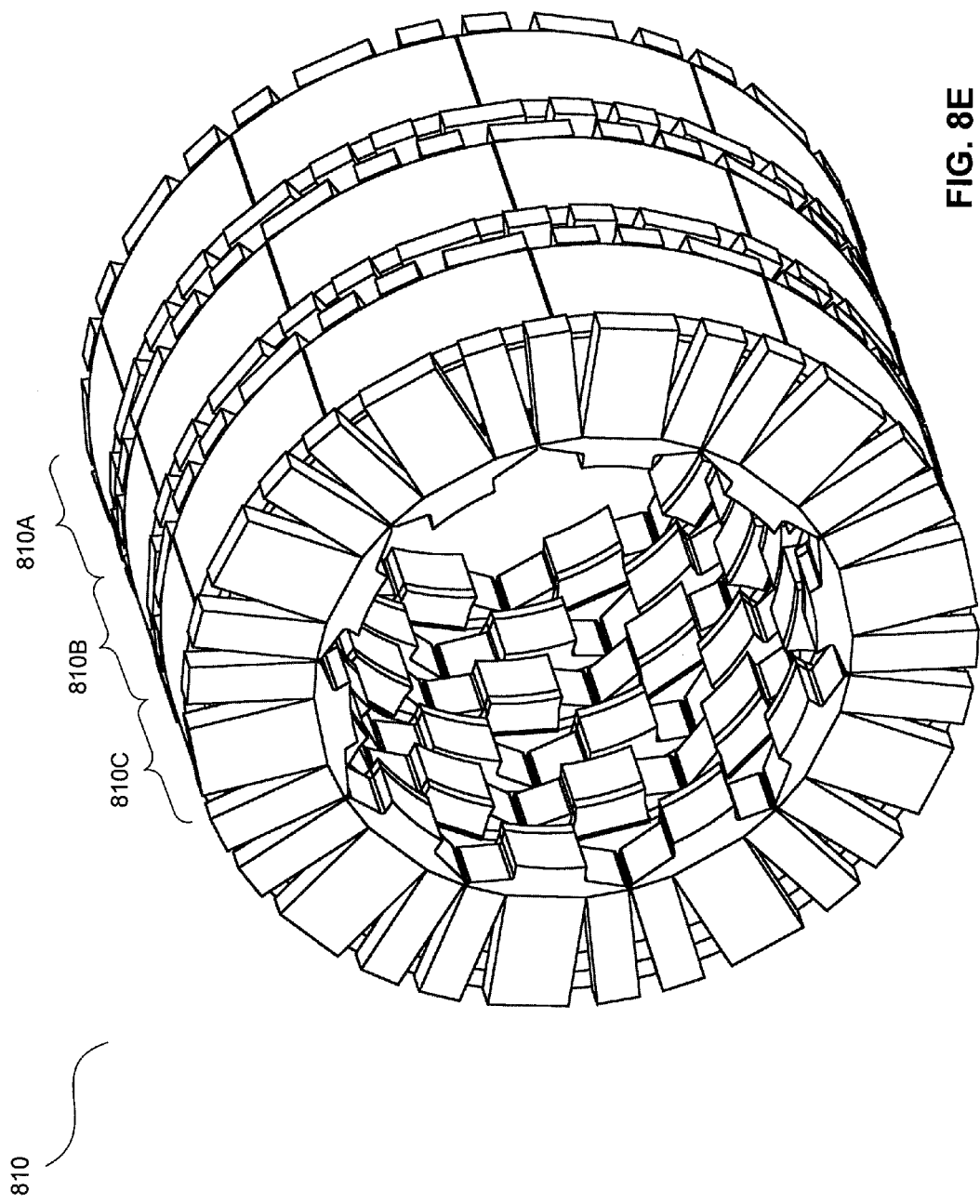
FIG. 8E illustrates a polyphase stator for a transverse flux machine in accordance with an exemplary embodiment.
Figure 8F:
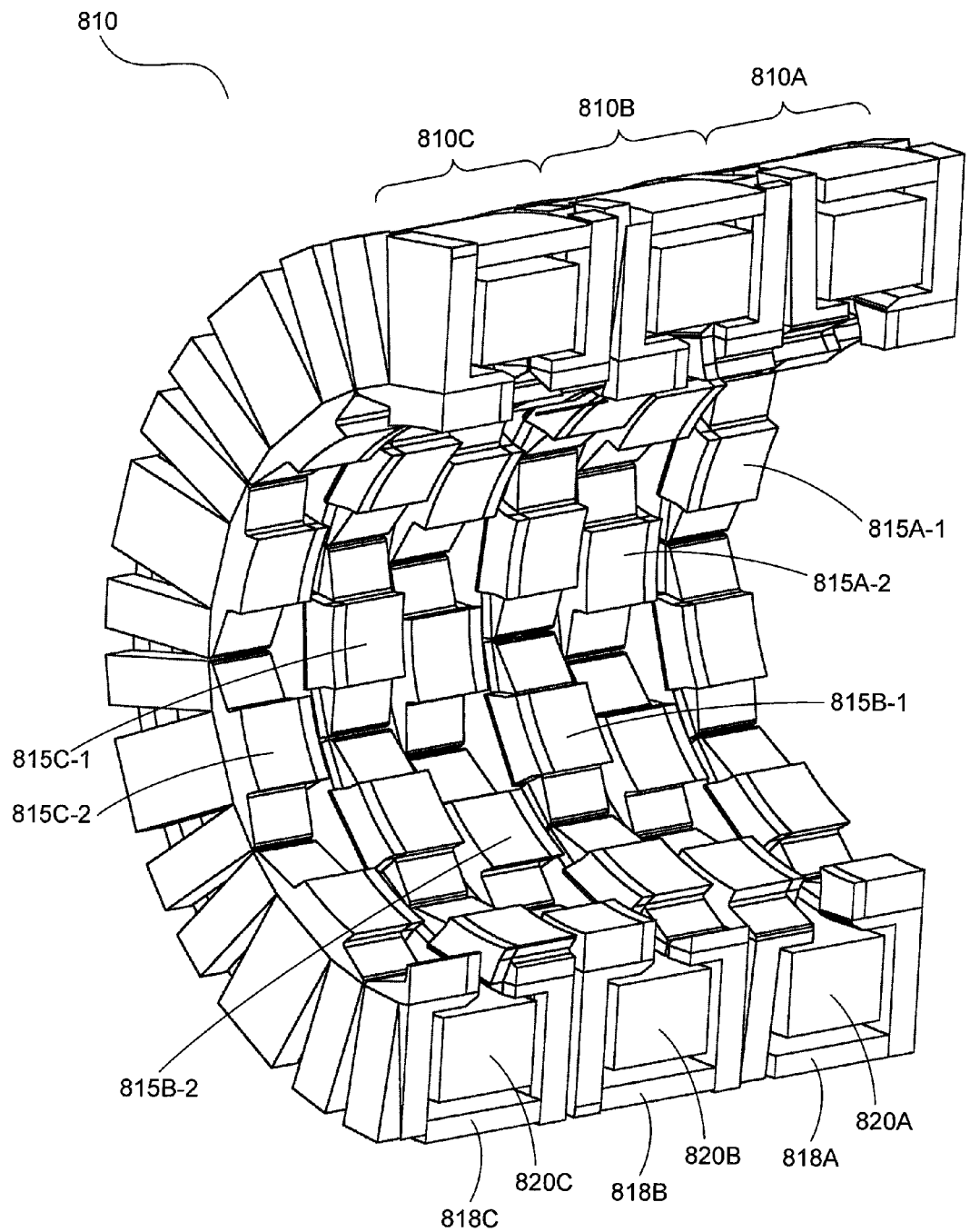
FIG. 8F illustrates a cutaway view of a polyphase stator for a transverse flux machine in accordance with an exemplary embodiment.

With momentary reference to FIGS. 8D and 8E, in various exemplary embodiments, a back return lamination 818 is configured with one or more "cuts" 819 therethrough. Considered differently, a back return lamination 818 may be considered to be made up of one or more segments, wherein a cut 819 electrically separates the segment edges. In this manner, unwanted losses due to magnetic flux linking portions of back return lamination 818 may be reduced. Additional details regarding segmentation of components in transverse flux machines and/or commutated flux machines, for example in order to reduce losses, may be found in U.S. Patent Application Publication No. 2012-0119610 entitled "TRANSVERSE AND/OR COMMUTATED FLUX SYSTEMS HAVING SEGMENTED STATOR LAMINATIONS" having the same filing date as the present application, the contents of which are hereby incorporated by reference in their entirety.

In various exemplary embodiments, transverse flux machines and/or commutated flux machines configured in accordance with principles of the present disclosure may be utilized as motors for light electric vehicles, for example as motors for electric bicycles.

In an exemplary embodiment, a transverse flux machine may be coupled to a wheel, for example a bicycle wheel. A transverse flux machine may also be coupled to gear cassette and/or other suitable components in order to allow the transverse flux machine to interface with various driveline and/or control components of a bicycle or other light electric vehicle (e.g., brake calipers, foot pedals, chains, belts, and/or the like).

In an exemplary embodiment, transverse flux machine 800 is configured with a diameter of about 58 mm. In another exemplary embodiment, transverse flux machine 800 is configured with a diameter of about 330 mm. In various exemplary embodiments, transverse flux machine 800 is configured with a diameter of between about 25 mm and about 3 meters. Moreover, transverse flux machine 800 may be configured with any suitable diameter, as desired.

In an exemplary embodiment, transverse flux machine 800 is configured with an axial length of about 30 mm. In another exemplary embodiment, transverse flux machine 800 is configured with an axial length of about 100 mm. In various exemplary embodiments, transverse flux machine 800 is configured with an axial length of between about 5 mm and about 5 meters. Moreover, transverse flux machine 800 may be configured with any suitable axial length, as desired.

In an exemplary embodiment, transverse flux machine 800 is configured with 48 poles. In another exemplary embodiment, transverse flux machine 800 is configured with 60 poles. In various exemplary embodiments, transverse flux machine 800 is configured with between about 16 poles and about 360 poles. Moreover, transverse flux machine 800 may be configured with any suitable number of poles, as desired.

In an exemplary embodiment, transverse flux machine 800 comprises about 300 grams of active electrical and magnetic materials. In another exemplary embodiment, transverse flux machine 800 comprises about 1 kilogram of active electrical and magnetic materials. In various exemplary embodiments, transverse flux machine 800 comprises between about 100 grams and about 100 kilograms of active electrical and magnetic materials. Moreover, transverse flux machine 800 may comprise any suitable amount of active electrical and magnetic materials, as desired.

In an exemplary embodiment, transverse flux machine 800 is operable over a range from about 0 RPM to about 2000 RPM. In another exemplary embodiment, transverse flux machine 800 is operable over a range from about 0 RPM to about 3000 RPM. In various exemplary embodiments, transverse flux machine 800 is operable over a range from about 0 RPM to about 10,000 RPM. Moreover, transverse flux machine 800 may be configured to be operable over any suitable RPM range, as desired.

In various exemplary embodiments, transverse flux machine 800 is configured with a diameter of about 58 mm, with an axial thickness of about 30 mm, and with a torque density of between about 5 Newton-meters per kilogram of active magnetic and electrical materials and about 17 Newton-meters per kilogram of active magnetic and electrical materials. In an exemplary embodiment with this configuration, transverse flux machine 800 is configured with a torque density of about 8.3 Newton-meters per kilogram of active magnetic and electrical materials.

In certain exemplary embodiments, transverse flux machine 800 is configured with a diameter of about 120 mm, with an axial thickness of about 60 mm, and with a torque density of between about 4 Newton-meters per kilogram of active magnetic and electrical materials and about 15 Newton-meters per kilogram of active magnetic and electrical materials. In an exemplary embodiment with this configuration, transverse flux machine 800 is configured with a torque density of about 9.7 Newton-meters per kilogram of active magnetic and electrical materials.

In other exemplary embodiments, transverse flux machine 800 is configured with a diameter of about 330 mm, with an axial thickness of about 105 mm, and with a torque density of between about 8 Newton-meters per kilogram of active magnetic and electrical materials and about 30 Newton-meters per kilogram of active magnetic and electrical materials. In an exemplary embodiment with this configuration, transverse flux machine 800 is configured with a torque density of about 20 Newton-meters per kilogram of active magnetic and electrical materials.

In accordance with principles of the present disclosure, a transverse flux machine and/or commutated flux machine may desirably be utilized to provide mechanical output to robotic devices, prosthetic limbs, powered exoskeletons, industrial equipment, and/or the like. Moreover, a transverse flux machine and/or commutated flux machine may desirably be utilized to provide mechanical output to relatively light-weight vehicles such as bicycles, scooters, motorcycles, quads, golf carts, or other vehicles. Yet further, a transverse flux machine and/or commutated flux machine may desirably be utilized to power an automobile, a truck, bus, or other passenger vehicle. Additionally, a transverse flux machine and/or commutated flux machine may desirably be utilized in small engine applications, for example portable generators, power tools, and other electrical equipment. A transverse flux machine and/or commutated flux machine may also desirably be utilized to provide mechanical output to propeller-driven devices, for example boats, airplanes, and/or the like. A transverse flux machine and/or commutated flux machine may also desirably be utilized in various machine tools, for example rotating spindles, tables configured to move large masses, and/or the like. Yet further, a transverse flux machine and/or commutated flux machine may also be desirably utilized in large-scale power generation applications, for example in fixed installations providing 10 Kw or more of electrical power. In general, transverse flux machines and/or commutated flux machines may be utilized to provide electrical and/or mechanical input and/or output to and/or from any suitable devices.

Figure 9A:
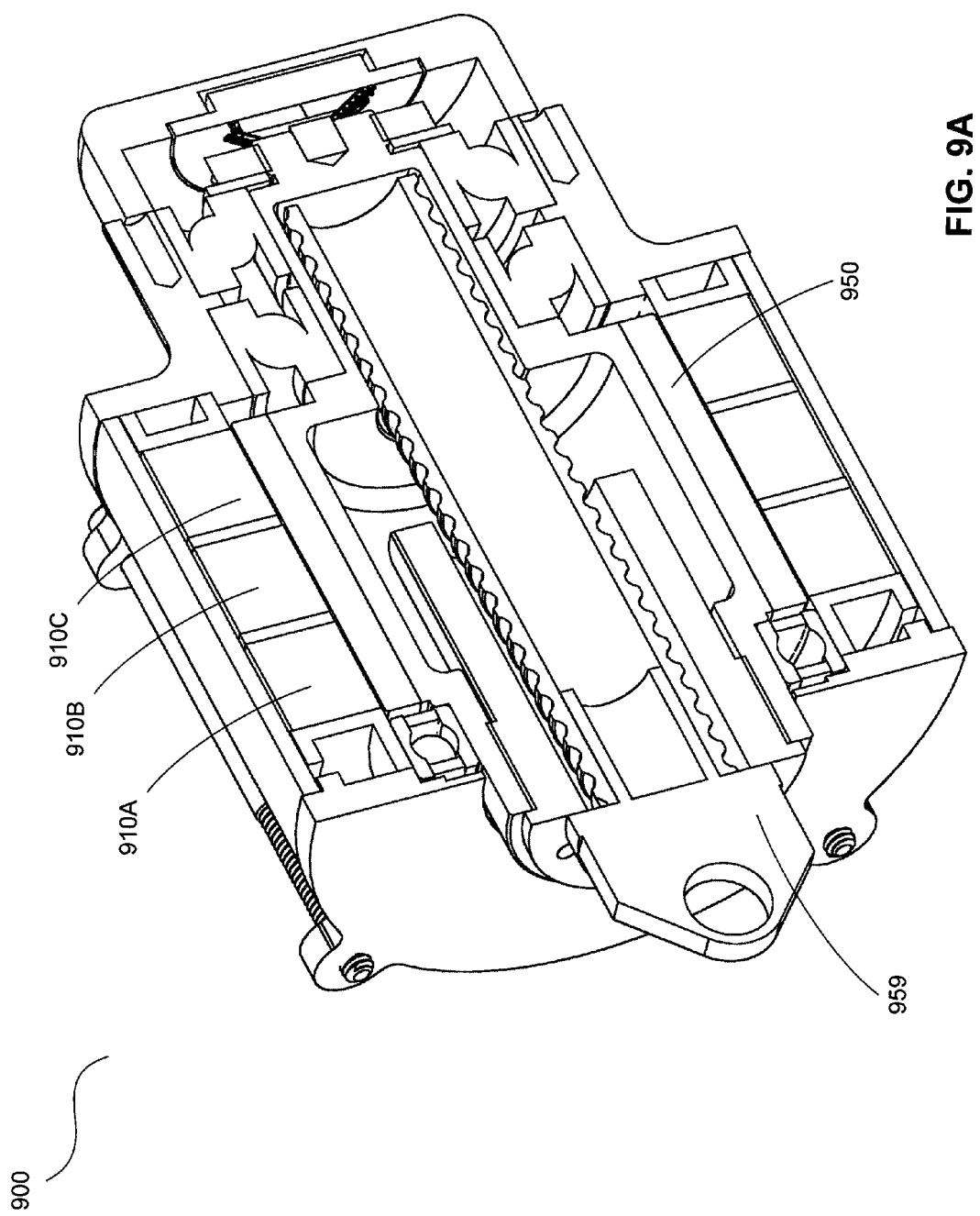
FIG. 9A illustrates an exemplary transverse flux machine configured for use as a robotic actuator in accordance with an exemplary embodiment.

In accordance with various exemplary embodiments, turning now to FIG. 9A, a polyphase transverse flux machine configured in accordance with principles of the present disclosure, for example transverse flux machine 900 configured as an actuator, may be configured with improved performance characteristics when compared to existing motors, such as prior art robotic actuators.

Transverse flux machine 900 may be configured with various components configured to interface with and/or actuate prosthetic limbs, robotic components, and/or the like. In an exemplary embodiment, transverse flux machine 900 is configured with a lead screw assembly 959. Lead screw assembly 959 is coupled to rotor 950. Responsive to current input in each of stator assemblies 910A, 910B, and 910C, rotor 950 is driven to rotate, moving lead screw assembly 959.

In an exemplary embodiment, transverse flux machine 900 is configured with electromagnetic components having an overall diameter of about 58 mm and an overall axial length of about 30 mm. In this exemplary embodiment, transverse flux machine 900 comprises about 300 grams of active magnetic and electrical materials. In an exemplary embodiment, transverse flux machine 900 is a three-phase device and is configured to produce approximately 4 Newton-meters of peak torque, and approximately 2.5 Newton-meters of continuous torque. In this exemplary embodiment, transverse flux machine 900 is configured with a motor constant $K_M$ of about 0.311 Newton-meters per root watt and a coil resistance of about 0.074 ohms. In this exemplary embodiment, transverse flux machine 900 is configured with 48 poles, a design voltage of 48 volts, and is operable over an RPM range of between about 0 RPM and about 2000 RPMs. In this exemplary embodiment, transverse flux machine 900 is configured to provide at least 400 watts of peak power.

Figure 9B:
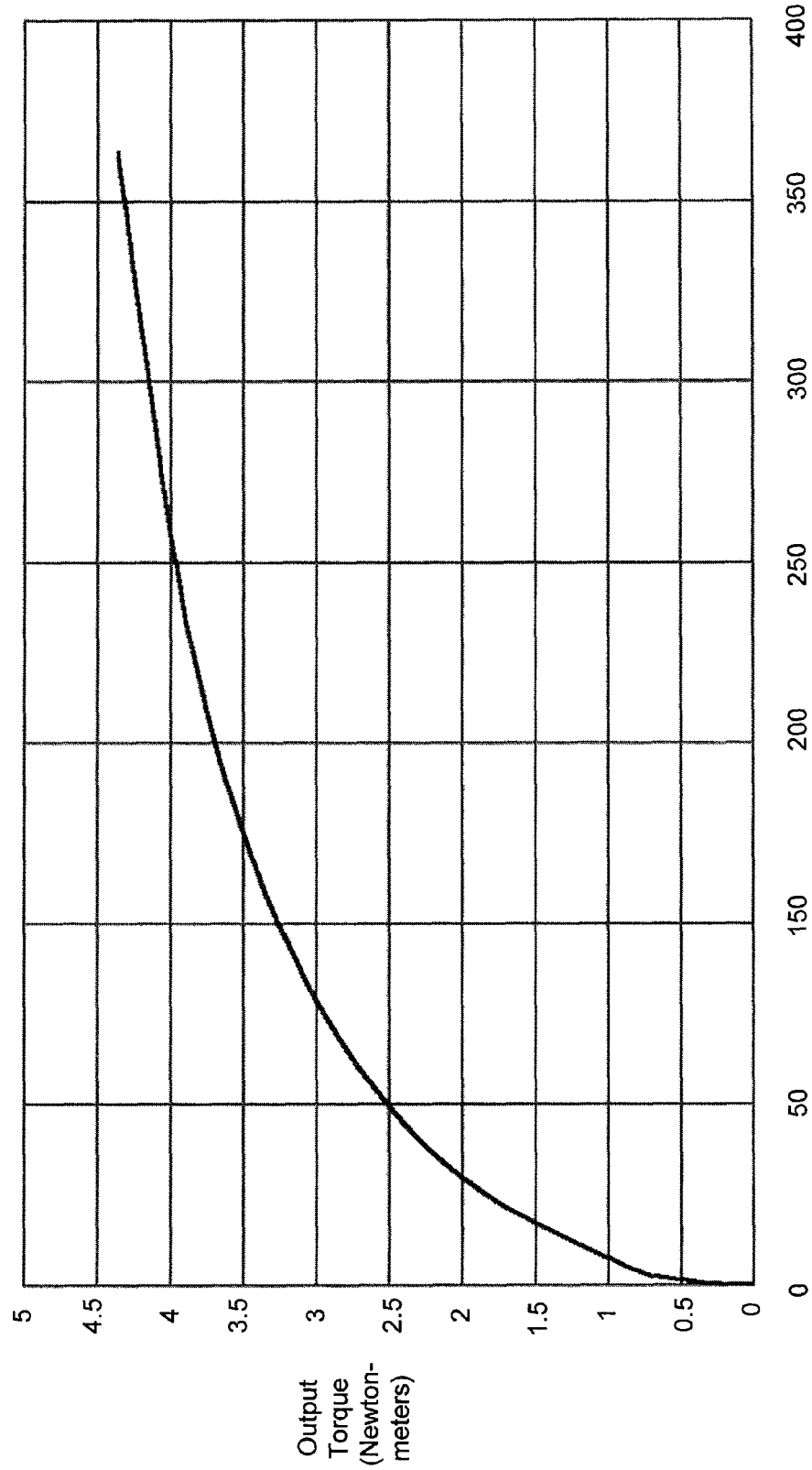
FIGS. 9B and 9C illustrate performance characteristics of an exemplary transverse flux machine in accordance with an exemplary embodiment.
Figure 9C:
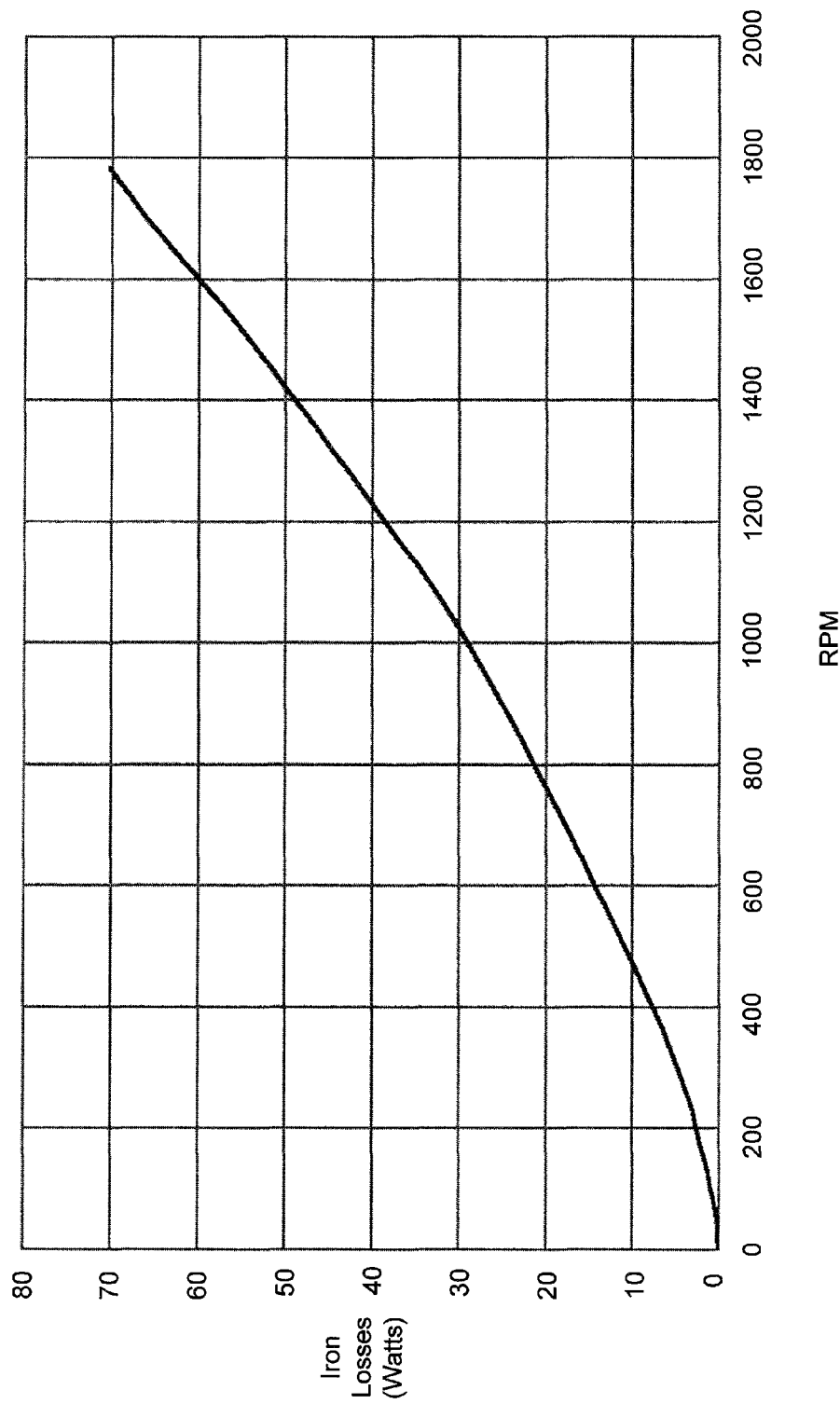

With reference now to FIGS. 9B and 9C, transverse flux machine 900 may be configured with reduced coil losses and/or iron (hysteresis) losses compared to various prior art motors. Moreover, in various exemplary embodiments, transverse flux machine 900 may be smaller, lighter, more efficient, and/or provide higher levels of peak torque and/or continuous torque when compared to various prior art motors. Additionally, transverse flux machine 900 can eliminate the need for a gearbox or transmission and associated losses. Consequently, transverse flux machine 900 enables improved robotic systems, powered prosthetics, exoskeletons, and/or the like, for example by improving system power, extending runtime on a particular battery, reducing system weight, and/or the like.

Electrical machines configured in accordance with principles of the present disclosure, for example transverse flux machines 500, 600, 700, 800, and/or 900, may be configured to operate at any suitable voltage and/or voltages. For example, in an exemplary embodiment, transverse flux machine 500 is configured to operate at a voltage of about 24 volts in coil 520. In another exemplary embodiment, transverse flux machine 500 is configured to operate at a voltage of about 48 volts in coil 520. In another exemplary embodiment, transverse flux machine 500 is configured to operate at a voltage of about 160 volts in coil 520. In another exemplary embodiment, transverse flux machine 500 is configured to operate at a voltage of about 600 volts in coil 520. Moreover, transverse flux machine 500 may be configured to operate at any suitable voltage and/or voltages, as desired.

Electrical machines configured in accordance with principles of the present disclosure may be configured to operate in connection with any suitable controller and/or controllers. For example, in an exemplary embodiment, transverse flux machine 500 is configured to operate in connection with a pulse width modulation (PWM) controller. In other exemplary embodiments, transverse flux machine 500 is configured to operate in connection with a sinusoidal drive, a trapezoidal drive, and/or the like. Moreover, transverse flux machine 500 may be configured to operate in connection with field-oriented control, block commutation, and/or the like.

In any embodiment, the stator assembly may further comprises one or more back returns coupling the side lamination assemblies of each pair thereof distal the rotor to conduct the magnetic flux therebetween. Alternatively, the side laminations may be coupled for conducting magnetic flux by having integral portions that extend over the coil to establish the coupling, rather than having a back return formed of a separate part or parts.

In any embodiment, the number of pairs of side lamination assemblies may greater than the number of pairs of switch lamination assemblies, and each switch lamination assembly conducts the magnetic flux between the at least one tooth associated therewith and multiple pairs of side lamination assemblies. In any embodiment, the number of pairs of side lamination assemblies and the number of pairs of switch lamination assemblies are the same, and each switch lamination assembly conducts the magnetic flux between the at least one tooth associated therewith and one of the switch lamination assemblies. Since each switch lamination assembly may have one or more teeth associated therewith, the number of teeth need not be the same as the number of switch lamination assemblies.

In some radial gap embodiments, the teeth and the switch lamination assemblies are positioned radially inward of the side lamination assemblies with the rotor received radially inside the stator assembly. In other radial gap embodiments, the teeth and the switch lamination assemblies are positioned radially outward of the side lamination assemblies with the rotor received radially outside the stator assembly.

In the various embodiments shown, narrower portion of each first group of laminated materials defines the at least one tooth associated with its switch lamination assembly. That is, the at least one tooth (i.e., one tooth or multiple teeth) is formed by the laminations themselves. Alternatively, the tooth could be a separate tooth attached to the laminations, and it is only preferred but not essential that the actual tooth be defined by the laminated materials of the switch lamination assembly. Hence, a tooth associated with the switch lamination assembly means the tooth is attached to it as a separate part, or integrally formed as part of the lamination assembly itself.

Principles of the present disclosure may suitably be combined with various other principles related to transverse flux machines and/or commutated flux machines. For example, principles of the present disclosure may suitably be combined with principles for stators in transverse flux machines and commutated flux machines, for example principles for partial stators and/or gapped stators, as disclosed in U.S. patent application Ser. No. 12/611,728 filed on Nov. 3, 2009, now U.S. Pat. No. 7,851,965 entitled "TRANSVERSE AND/OR COMMUTATED FLUX SYSTEM STATOR CONCEPTS", the contents of which are hereby incorporated by reference in their entirety.

Principles of the present disclosure may also suitably be combined with principles for rotors in transverse flux machines and/or commutated flux machines, for example tape wound rotors and/or multipath rotors, as disclosed in U.S. patent application Ser. No. 12/611,733 filed on Nov. 3, 2009, now U.S. Pat. No. 7,923,886 entitled "TRANSVERSE AND/OR COMMUTATED FLUX SYSTEM ROTOR CONCEPTS", the contents of which are hereby incorporated by reference in their entirety.

Principles of the present disclosure may also suitably be combined with principles of polyphase transverse flux machines and/or polyphase commutated flux machines as disclosed in U.S. patent application Ser. No. 12/611,737 filed on Nov. 3, 2009, now U.S. Pat. No. 7,868,508 entitled "POLYPHASE TRANSVERSE AND/OR COMMUTATED FLUX SYSTEMS", the contents of which are hereby incorporated by reference in their entirety.

Principles of the present disclosure may also suitably be combined with principles of extended magnets, overhung rotors, and/or stator tooth overlap in transverse flux machines and/or commutated flux machines as disclosed in U.S. patent application Ser. No. 12/772,958 filed on May 3, 2010, now U.S. Pat. No. 8,053,944 entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING", the contents of which are hereby incorporated by reference in their entirety.

Principles of the present disclosure may also suitably be combined with principles of utilization of transverse flux machines and/or commutated flux machines in electric bicycles as disclosed in U.S. patent application Ser. No. 12/772,959 filed on May 3, 2010, now U.S. Patent Application Publication No. 2011/0169381 entitled "TRANSVERSE AND/OR COMMUTATED FLUX SYSTEMS FOR ELECTRIC BICYCLES", the contents of which are hereby incorporated by reference in their entirety.

Principles of the present disclosure may also suitably be combined with principles of phase offset in transverse flux machines and/or commutated flux machines as disclosed in U.S. patent application Ser. No. 12/772,962 filed on May 3, 2010, now U.S. Patent Application Publication No. 2011/0169366 entitled "TRANSVERSE AND/OR COMMUTATED SYSTEMS HAVING PHASE OFFSET", the contents of which are hereby incorporated by reference in their entirety.

Principles of the present disclosure may also suitably be combined with principles of coils, including dual wound coils in transverse flux machines and/or commutated flux machines as disclosed in U.S. Patent Application Publication No. 2012-0119609 entitled "TRANSVERSE AND/OR COMMUTATED FLUX SYSTEM COIL CONCEPTS" having the same filing date as the present application, the contents of which are hereby incorporated by reference in their entirety.

Principles of the present disclosure may also suitably be combined with principles of laminations combined with powdered metal portions in transverse flux machines and/or commutated flux machines as disclosed in U.S. Patent Application Serial No. 2012-0119599 entitled "TRANSVERSE AND/OR COMMUTATED FLUX SYSTEMS HAVING LAMINATED AND POWDERED METAL PORTIONS," the contents of which are hereby incorporated by reference in their entirety.

Principles of the present disclosure may also suitably be combined with principles of isolated torque sensing systems as disclosed in U.S. Patent Application Publication No. 2012-0235519 entitled "ISOLATED TORQUE SENSOR", the contents of which are hereby incorporated by reference in their entirety.

Moreover, principles of the present disclosure may suitably be combined with any number of principles disclosed in any one of and/or all of the U.S. patents and/or patent applications incorporated by reference herein. Thus, for example, a particular transverse flux machine and/or commutated flux machine may incorporate use of segmented stator laminations, use of rainbow laminations, use of a dual wound coil, use of a lamination stack with powdered metal teeth, use of a sixth-phase offset, use of extended magnets, use of an overhung rotor, use of stator tooth overlap, use of a tape wound rotor, use of a multipath rotor, use of a partial stator, use of a polyphase design, use of a torque sensor, use of an adjustable Hall effect sensor system, and/or the like. All such combinations, permutations, and/or other interrelationships are considered to be within the scope of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

When the term "generally" is used with reference to the alignment or orientation of a part in or with reference to a direction, that means that the alignment or orientation has at least a component (sometimes called a vector component) in that direction. As one example, in the embodiments illustrated where the side laminations a have an L-shaped with an axial leg and a radial leg to create, together with other side laminations and optionally a back return, a rectangular space around the coil, it may be possible to create even more space by orienting the radial legs in a diverging manner (i.e., with an axial component) so that a trapezoidal space is created, thus allowing more coils material to be received. Indeed, the configuration could have those radial legs angled back toward one another (i.e., again with an axial component) in such that a hexagonal shape is created. Regardless of the specific shape created, the point is that the radial direction need not be perfect radial, deviations from true radial (or whatever direction is applicable) may be used. As another example, it may be possible to angle the side laminations, and particularly the radial legs thereof, in the circumferential direction to increase the compactness density of the machine. This angling may have some curvature, but the legs would still be regarded as being in the radial direction (in the case of a radial gap machine, or the axial direction for an axial gap machine) because the alignment/orientation has a component in that direction. In some embodiments, the alignment or orientation of a part may have its majority component in the defined direction (i.e., the largest vector component defining its directionality is in that direction), or be essentially in the defined direction.

What is claimed is:

1. An electrical machine comprising:
    a rotor for rotation about a rotational axis;
    a single air gap and face engaged stator assembly comprising:
    an electroconductive coil arranged circumferentially with respect to the rotational axis;
    a plurality of pairs of side lamination assemblies on opposing sides of said coil for conducting magnetic flux, the pairs of side lamination assemblies being arranged circumferentially with respect to the rotational axis;
    a plurality of pairs of switch lamination assemblies for conducting the magnetic flux, the pairs of switch lamination assemblies being arranged circumferentially with respect to the rotational axis and positioned adjacent to ends of the side lamination assemblies proximal the rotor; at least one tooth associated with each switch lamination assembly and proximal the rotor and between the coil and the rotor;
    at least one tooth associated with each switch lamination assembly and proximal the rotor for conducting the magnetic flux between the rotor and the switch lamination assembly;
    each switch lamination assembly comprising a first group of laminated materials extending generally circumferentially and generally in a radial direction with respect to the rotational axis for conducting the magnetic flux generally circumferentially and generally in the radial direction between the at least one tooth associated therewith and the adjacent side lamination assembly;
    each side lamination assembly comprising a second group of laminated materials extending generally axially and generally radially with respect to the rotational axis for conducting the magnetic flux generally axially and generally radially;
    wherein each of said second group of laminated materials has a first leg portion extending in the generally axial direction and adjacent the first group of laminated materials, and a second leg portion extending in the generally radial direction away from the first lag portion, the coil being disposed between the second leg portions of the second groups of laminated materials of each pair of side lamination assemblies;
    wherein a portion of said first leg portion is configured radially between the coil and the rotor;
    one or more back returns extending axially and coupling the side lamination assemblies of each pair thereof distal the rotor to conduct the magnetic flux therebetween;
    wherein the coil is disposed between and at least partially surrounded by the second groups of laminated materials of each pair of side lamination assemblies and the one or more back returns; and
    wherein the electrical machine is at least one of a transverse flux machine or a commutated flux machine.

2. The electrical machine of claim 1, wherein each first group of laminated materials has a wider portion adjacent the second group of laminated materials that is wider in the circumferential direction than a narrower portion adjacent the at least one tooth associated therewith for directing the magnetic flux between the at least one tooth and the second group of laminated materials.

3. The electrical machine of claim 1, wherein each second leg portion has a free radial end opposite the first leg portion, thus defining an L-shape for the second group of laminated materials.

4. The electrical machine of claim 1, wherein the first group of laminated materials is bonded to the second group of laminated materials.

5. The electrical machine of claim 2, wherein the narrower portion of each first group of laminated materials defines the at least one tooth associated with its switch lamination assembly.

6. The electrical machine of claim 1, wherein the first group of laminated materials comprises a cobalt-iron alloy, and wherein the second group of laminated materials comprises a nickel-iron alloy.

7. The electrical machine of claim 1, wherein the number of pairs of switch lamination assemblies and the number of pairs of side lamination assemblies are the same, and wherein a wider portion of each first group of laminated materials and the first leg portion of each second group of laminated materials have aligned surfaces facing each other of matching area dimension for conducting flux therebetween.

8. The electrical machine of claim 7, wherein the narrower portion of each first group of laminated materials defines the at least one tooth associated with its switch lamination assembly.

9. The electrical machine of claim 8, wherein the first group of laminated materials is bonded to the second group of laminated materials.

10. The electrical machine of claim 1, wherein the number of pairs of side lamination assemblies is greater than the number of pairs of switch lamination assemblies, and each switch lamination assembly conducts the magnetic flux between the at least one tooth associated therewith and multiple pairs of side lamination assemblies.

11. The electrical machine of claim 1, wherein the number of pairs of side lamination assemblies and the number of pairs of switch lamination assemblies are the same, and each switch lamination assembly conducts the magnetic flux between the at least one tooth associated therewith and one of the switch lamination assemblies.

12. The electrical machine of claim 1, wherein a single tooth is associated with each switch lamination assembly.

13. The electrical machine of claim 1, wherein multiple teeth are associated with each switch lamination assembly.

14. The electrical machine of claim 1, wherein the teeth and the switch lamination assemblies are positioned radially inward of the side lamination assemblies with the rotor received radially inside the stator assembly.

15. The electrical machine of claim 1, wherein the teeth and the switch lamination assemblies are positioned radially outward of the side lamination assemblies with the rotor received radially outside the stator assembly.

16. The electrical machine of claim 1, wherein the rotor comprises plurality of magnets and a plurality of flux concentrators interleaved with one another circumferentially.

17. The electrical machine of claim 16, wherein the magnets are arranged with their polarity orientations alternating circumferentially.

18. The electrical machine of claim 3, wherein the rotor comprises a plurality of magnets and a plurality of flux concentrators interleaved with one another circumferentially.

19. The electrical machine of claim 18, wherein the magnets are arranged with their polarity orientations alternating circumferentially.

20. The electrical machine of claim 7, wherein the rotor comprises a plurality of magnets and a plurality of flux concentrators interleaved with one another circumferentially.

21. The electrical machine of claim 20, wherein the magnets are arranged with their polarity orientations alternating circumferentially.

22. A single air gap and face engaged stator assembly for an electrical machine comprising a rotor for rotation about a rotational axis, the stator assembly comprising:
    an electroconductive coil arranged circumferentially with respect to the rotational axis;
    a plurality of pairs of side lamination assemblies on opposing sides of said coil for conducting magnetic flux, the pairs of side lamination assemblies being arranged circumferentially with respect to the rotational axis;
    a plurality of pairs of switch lamination assemblies for conducting the magnetic flux, the pairs of switch lamination assemblies being arranged circumferentially with respect to the rotational axis and positioned adjacent to ends of the side lamination assemblies proximal the rotor and between the coil and the rotor;
    at least one tooth associated with each switch lamination assembly and proximal the rotor for conducting the magnetic flux between the rotor and the switch lamination assembly;
    each switch lamination assembly comprising a first group of laminated materials extending generally circumferentially and generally in a radial direction with respect to the rotational axis for conducting the magnetic flux generally circumferentially and generally in the radial direction between the at least one tooth associated therewith and the adjacent side lamination assembly;
    each side lamination assembly comprising a second group of laminated materials extending generally axially and generally radially with respect to the rotational axis for conducting the magnetic flux generally axially and generally radially;
    wherein each of said second group of laminated materials has a first leg portion extending in the generally axial direction and adjacent the first group of laminated materials, and a second leg portion extending in the generally radial direction away from the first leg portion, the coil being disposed between the second leg portions of the second groups of laminated materials of each pair of side lamination assemblies;
    wherein a portion of said first leg portion is configured radially between the coil and the rotor;
    one or more back returns extending axially and coupling the side lamination assemblies of each pair thereof distal the rotor to conduct the magnetic flux therebetween; and
    wherein the coil is disposed between and at least partially surrounded by the second groups of laminated materials of each pair of side lamination assemblies and the one or more back returns.

23. The stator assembly of claim 22, wherein each first group of laminated materials has a wider portion adjacent the second group of laminated materials that is wider in the circumferential direction than a narrower portion adjacent the at least one tooth associated therewith for directing the magnetic flux between the at least one tooth and the second group of laminated materials.

24. The stator assembly of claim 22, wherein each second leg portion has a free radial end opposite the first leg portion, thus defining an L-shape for the second group of laminated materials.

25. The stator assembly of claim 22, wherein the first group of laminated materials is bonded to the second group of laminated materials.

26. The stator assembly of claim 23, wherein the narrower portion of each first group of laminated materials defines the at least one tooth associated with its switch lamination assembly.

27. The stator assembly of claim 22, wherein the first group of laminated materials comprises a cobalt-iron alloy, and wherein the second group of laminated materials comprises a nickel-iron alloy.

28. The stator assembly of claim 22, wherein the number of pairs of switch lamination assemblies and the number of pairs of side lamination assemblies are the same, and wherein a wider portion of each first group of laminated materials and the first leg portion of each second group of laminated materials have aligned surfaces facing each other of matching area dimension for conducting flux therebetween.

29. The stator assembly of claim 28, wherein the narrower portion of each first group of laminated materials defines the at least one tooth associated with its switch lamination assembly.

30. The stator assembly of claim 29, wherein the first group of laminated materials is bonded the second group of laminated materials.

31. The stator assembly of claim 22, wherein the number of pairs of side lamination assemblies is greater than the number of pairs of switch lamination assemblies, and each switch lamination assembly conducts the magnetic flux between the at least one tooth associated therewith and multiple pairs of side lamination assemblies.

32. The stator assembly of claim 22, wherein the number of pairs of side lamination assemblies and the number of pairs of switch lamination assemblies are the same, and each switch lamination assembly conducts the magnetic flux between the at least one tooth associated therewith and one of the switch lamination assemblies.

33. The stator assembly of claim 22, wherein a single tooth is associated with each switch lamination assembly.

34. The stator assembly of claim 22, wherein multiple teeth are associated with each switch lamination assembly.

35. The stator assembly of claim 22, wherein the teeth and the switch lamination assemblies are positioned radially inward of the side lamination assemblies with the rotor received radially inside the stator assembly.

36. The stator assembly of claim 22, wherein the teeth and the switch lamination assemblies are positioned radially outward of the side lamination assemblies with the rotor received radially outside the stator assembly.

\* \* \* \* \*